US012041874B2

(12) United States Patent
Xu et al.

(10) Patent No.: US 12,041,874 B2
(45) Date of Patent: Jul. 23, 2024

(54) BLADE ASSEMBLY FOR A LAWN MOWER

(71) Applicant: Nanjing Chervon Industry Co., Ltd., Nanjing (CN)

(72) Inventors: Haishen Xu, Nanjing (CN); Toshinari Yamaoka, Nanjing (CN); Jian Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/163,609

(22) Filed: Feb. 2, 2023

(65) Prior Publication Data

US 2023/0172102 A1    Jun. 8, 2023

Related U.S. Application Data

(63) Continuation of application No. 18/076,847, filed on Dec. 7, 2022, which is a continuation of application
(Continued)

(30) Foreign Application Priority Data

Sep. 27, 2018  (CN) .......................... 201821584956.0
Nov. 15, 2018  (CN) .......................... 201821889111.2
(Continued)

(51) Int. Cl.
*A01D 34/73*  (2006.01)
*A01D 34/68*  (2006.01)
(Continued)

(52) U.S. Cl.
CPC ....... *A01D 34/733* (2013.01); *A01D 34/6806* (2013.01); *A01D 34/685* (2013.01);
(Continued)

(58) Field of Classification Search
CPC .. A01D 2101/00; A01D 34/733; A01D 34/76; A01D 34/78; A01D 34/6806;
(Continued)

(56) References Cited

U.S. PATENT DOCUMENTS 2,517,405 A *  8/1950  Moss ..................... A01D 34/63
                                                      37/243
2,697,323 A    12/1954  Horn
(Continued)

FOREIGN PATENT DOCUMENTS

AU    2004205280 A1    9/2004
CN    1409943          4/2003
(Continued)

OTHER PUBLICATIONS

ISA/CN, Int. Search Report issued on PCT application No. PCT/CN2019/107650, dated Dec. 24, 2019, 3 pgs.
(Continued)

*Primary Examiner* — Adam J Behrens
(74) *Attorney, Agent, or Firm* — Greenberg Traurig, LLP

(57) ABSTRACT

A lawn mower includes a blade assembly configured to perform a cutting function. The blade assembly includes an upper blade mounted about a blade rotation axis and an upper blade proximal portion being substantially flat and including a first cutting edge. A lower blade is mounted in overlap with the upper blade about the blade rotation axis. The lower blade includes a lower blade proximal portion positioned outward from the lower blade mounting portion in a radial direction, a lower blade end portion positioned outward from the lower blade proximal portion and below the lower blade proximal portion, and a second cutting edge. A lower blade falling portion transitions from the lower blade proximal portion to the lower blade end portion.

9 Claims, 51 Drawing Sheets

Related U.S. Application Data

No. 17/863,038, filed on Jul. 12, 2022, now Pat. No. 11,937,545, which is a continuation of application No. 17/825,815, filed on May 26, 2022, now Pat. No. 11,917,939, which is a continuation of application No. 17/573,153, filed on Jan. 11, 2022, which is a continuation of application No. 17/236,239, filed on Apr. 21, 2021, now Pat. No. 11,246,260, which is a continuation of application No. 17/164,479, filed on Feb. 1, 2021, now Pat. No. 11,122,737, which is a continuation of application No. PCT/CN2019/107650, filed on Sep. 25, 2019.

(30) Foreign Application Priority Data

| Apr. 18, 2019 | (CN) | 201910312144.3 |
| Apr. 18, 2019 | (CN) | 201920533524.5 |
| Jun. 28, 2019 | (CN) | 201910576318.7 |
| Sep. 17, 2019 | (CN) | 201921545742.7 |

(51) Int. Cl.

| A01D 34/685 | (2006.01) |
| A01D 34/78 | (2006.01) |
| A01D 34/71 | (2006.01) |
| A01D 34/82 | (2006.01) |
| A01D 101/00 | (2006.01) |

(52) U.S. Cl.

CPC ............ *A01D 34/73* (2013.01); *A01D 34/78* (2013.01); *A01D 34/71* (2013.01); *A01D 34/82* (2013.01); *A01D 2101/00* (2013.01)

(58) Field of Classification Search

CPC ...... A01D 34/685; A01D 34/71; A01D 34/82; A01D 34/73

See application file for complete search history.

(56) References Cited

U.S. PATENT DOCUMENTS

| 2,760,327 | A | * | 8/1956 | Bovee | A01D 34/71 |
| | | | | | 56/255 |
| 3,044,241 | A | * | 7/1962 | Snider | A01D 34/733 |
| | | | | | 56/295 |
| 3,162,990 | A | * | 12/1964 | Cook | A01D 34/73 |
| | | | | | D15/17 |
| 3,192,692 | A | | 7/1965 | Arthur | |
| 3,485,022 | A | | 12/1969 | Freedlander | |
| 3,545,189 | A | | 12/1970 | Houle | |
| 3,564,824 | A | * | 2/1971 | Tygh, Jr. | A01D 34/73 |
| | | | | | 56/295 |
| 3,593,505 | A | * | 7/1971 | Mittelstadt | A01D 69/02 |
| | | | | | 56/17.5 |
| 3,601,960 | A | * | 8/1971 | Buechler | A01D 34/73 |
| | | | | | 56/320.2 |
| 3,823,367 | A | | 7/1974 | Kaye et al. | |
| 3,910,017 | A | | 10/1975 | Thorud | |
| 4,037,695 | A | | 7/1977 | Welck | |
| 4,114,353 | A | | 9/1978 | Ansbaugh et al. | |
| 4,254,607 | A | | 3/1981 | Moore | |
| 4,269,020 | A | | 5/1981 | Wolf | |
| 4,292,791 | A | | 10/1981 | Lalonde | |
| 4,375,148 | A | | 3/1983 | Beck | |
| 4,429,518 | A | | 2/1984 | Fedeli | |
| 4,532,708 | A | | 8/1985 | Mensing | |
| 4,617,788 | A | | 10/1986 | Sebastian | |
| 4,620,575 | A | | 11/1986 | Cuba et al. | |
| RE32,377 | E | | 3/1987 | Seyerle | |
| D289,524 | S | | 4/1987 | Andersson | |
| 4,696,153 | A | | 9/1987 | Boains, Jr. | |
| 4,712,364 | A | | 12/1987 | Oxley | |
| 4,771,593 | A | * | 9/1988 | Lee | A01D 34/733 |
| | | | | | 464/33 |
| 4,871,629 | A | | 10/1989 | Bunyea | |
| 4,878,338 | A | | 11/1989 | Aldred et al. | |
| 4,922,698 | A | | 5/1990 | Taylor | |
| 4,936,884 | A | * | 6/1990 | Campbell | A01D 34/4168 |
| | | | | | 30/356 |
| 5,019,113 | A | | 5/1991 | Burnell | |
| 5,094,065 | A | | 3/1992 | Azbell | |
| 5,136,899 | A | | 8/1992 | Hoch et al. | |
| 5,152,382 | A | | 10/1992 | Hoch et al. | |
| 5,163,273 | A | | 11/1992 | Wojtkowski et al. | |
| 5,199,251 | A | | 4/1993 | Rouse et al. | |
| 5,209,052 | A | | 5/1993 | Carroll | |
| 5,213,913 | A | | 5/1993 | Anthony, III et al. | |
| 5,224,870 | A | | 7/1993 | Weaver et al. | |
| 5,233,820 | A | | 8/1993 | Willsie | |
| 5,238,267 | A | | 8/1993 | Hutchison et al. | |
| 5,259,176 | A | * | 11/1993 | Kahamura | A01D 34/73 |
| | | | | | 56/255 |
| 5,271,212 | A | | 12/1993 | Anderson | |
| 5,298,821 | A | | 3/1994 | Michel | |
| 5,299,414 | A | | 4/1994 | Long | |
| 5,321,940 | A | | 6/1994 | Peterson | |
| 5,327,710 | A | | 7/1994 | Plamper | |
| 5,337,543 | A | | 8/1994 | Kitamura et al. | |
| 5,355,661 | A | | 10/1994 | Tomiyama | |
| 5,363,636 | A | | 11/1994 | Lamoureux | |
| 5,401,592 | A | | 3/1995 | Gilpin et al. | |
| D357,691 | S | | 4/1995 | Bryant | |
| 5,410,866 | A | | 5/1995 | Long | |
| 5,467,586 | A | | 11/1995 | Lin | |
| 5,473,871 | A | | 12/1995 | Fava et al. | |
| 5,501,068 | A | | 3/1996 | Martz | |
| 5,502,957 | A | | 4/1996 | Robertson | |
| 5,553,675 | A | | 9/1996 | Pitzen et al. | |
| 5,619,846 | A | | 4/1997 | Brown | |
| 5,626,979 | A | | 5/1997 | Mitsui et al. | |
| 5,649,750 | A | | 7/1997 | Ishii et al. | |
| 5,663,011 | A | | 9/1997 | Bunyea et al. | |
| 5,685,421 | A | | 11/1997 | Gilmore | |
| 5,713,189 | A | | 2/1998 | Toman | |
| 5,725,304 | A | | 3/1998 | Inai | |
| 5,726,541 | A | | 3/1998 | Glenn et al. | |
| 5,762,512 | A | | 6/1998 | Trant et al. | |
| 5,775,077 | A | | 7/1998 | Olmr | |
| 5,794,422 | A | | 8/1998 | Reimers et al. | |
| 5,848,520 | A | | 12/1998 | Arfstrom et al. | |
| 5,881,823 | A | | 3/1999 | Kabatnik et al. | |
| 5,887,669 | A | | 3/1999 | Ostler et al. | |
| 5,890,354 | A | * | 4/1999 | Bednar | A01D 34/005 |
| | | | | | 56/DIG. 17 |
| 5,894,717 | A | * | 4/1999 | Yamashita | A01D 34/005 |
| | | | | | 56/320.1 |
| 5,902,080 | A | | 5/1999 | Kopras | |
| 5,913,802 | A | | 6/1999 | Mullet et al. | |
| 5,934,053 | A | | 8/1999 | Fillman et al. | |
| 5,946,895 | A | * | 9/1999 | Martens | A01D 34/733 |
| | | | | | 56/DIG. 20 |
| 5,983,612 | A | | 11/1999 | Bauswell et al. | |
| 5,987,863 | A | | 11/1999 | Busboom et al. | |
| 6,026,634 | A | | 2/2000 | Peter et al. | |
| 6,057,608 | A | | 5/2000 | Bailey, Jr. et al. | |
| 6,093,056 | A | | 7/2000 | Donauer et al. | |
| 6,109,009 | A | | 8/2000 | Benson | |
| 6,139,359 | A | | 10/2000 | Fuhreck et al. | |
| 6,145,290 | A | * | 11/2000 | Sullivan | A01D 34/005 |
| | | | | | 56/255 |
| 6,152,247 | A | | 11/2000 | Sporrer et al. | |
| 6,168,881 | B1 | | 1/2001 | Fischer et al. | |
| 6,181,032 | B1 | | 1/2001 | Marshall et al. | |
| D440,981 | S | | 4/2001 | Burch | |
| 6,223,835 | B1 | | 5/2001 | Habedank et al. | |
| 6,237,698 | B1 | | 5/2001 | Carrier et al. | |
| 6,253,534 | B1 | | 7/2001 | Hunter et al. | |
| 6,283,235 | B1 | | 9/2001 | Sporrer et al. | |
| 6,304,058 | B2 | | 10/2001 | Watson et al. | |
| 6,347,502 | B1 | | 2/2002 | deVries | |
| 6,354,414 | B1 | | 3/2002 | Sueshige et al. | |

(56) References Cited

U.S. PATENT DOCUMENTS

| | | |
|---|---|---|
| 6,357,533 B1 | 3/2002 | Bucholz et al. |
| 6,367,235 B1 * | 4/2002 | Moynihan ............ A01D 34/733 56/DIG. 17 |
| 6,376,942 B1 | 4/2002 | Burger et al. |
| 6,390,225 B2 | 5/2002 | Velke et al. |
| 6,415,681 B1 | 7/2002 | Porter et al. |
| 6,434,917 B1 | 8/2002 | Bartel |
| 6,460,626 B2 | 10/2002 | Carrier |
| 6,461,088 B2 | 10/2002 | Potter et al. |
| 6,487,840 B1 | 12/2002 | Turner |
| 6,487,857 B1 | 12/2002 | Poplawski et al. |
| 6,502,949 B1 | 1/2003 | Horiyama et al. |
| 6,525,511 B2 | 3/2003 | Kubale et al. |
| 6,530,200 B1 | 3/2003 | Minoura et al. |
| 6,551,123 B1 | 4/2003 | Schaeffeier et al. |
| 6,560,952 B2 | 5/2003 | Velke et al. |
| 6,568,089 B1 | 5/2003 | Popik et al. |
| 6,581,703 B2 | 6/2003 | Hammonds |
| 6,591,593 B1 | 7/2003 | Brandon et al. |
| 6,591,711 B2 | 7/2003 | Porter et al. |
| 6,604,348 B2 | 8/2003 | Hunt |
| D482,700 S | 11/2003 | Lancaster |
| 6,655,119 B2 | 12/2003 | Hasei |
| 6,662,895 B1 | 12/2003 | Bednar |
| 6,672,058 B1 | 1/2004 | Langenfeld et al. |
| 6,681,877 B2 | 1/2004 | Ono et al. |
| 6,688,091 B1 | 2/2004 | Ishimori |
| 6,701,825 B1 | 3/2004 | Langenfeld |
| 6,708,805 B2 | 3/2004 | Samejima et al. |
| 6,715,284 B1 | 4/2004 | Poplawski et al. |
| 6,717,281 B1 | 4/2004 | Brandon et al. |
| 6,729,115 B2 | 5/2004 | Bartel |
| 6,729,413 B2 | 5/2004 | Turner et al. |
| 6,767,597 B2 | 7/2004 | Onishi et al. |
| 6,775,976 B1 | 8/2004 | Phanco et al. |
| 6,782,797 B1 | 8/2004 | Brandenburg et al. |
| 6,798,160 B2 | 9/2004 | Wakitani et al. |
| 6,810,589 B2 | 11/2004 | Lagaly et al. |
| 6,843,056 B1 | 1/2005 | Langenfeld et al. |
| 6,856,035 B2 | 2/2005 | Brandon et al. |
| 6,868,657 B2 | 3/2005 | Bauer et al. |
| 6,886,677 B2 | 5/2005 | Rupiper et al. |
| 6,945,133 B2 | 9/2005 | Rush et al. |
| 6,948,299 B2 | 9/2005 | Osborne |
| 6,957,531 B1 | 10/2005 | Phanco et al. |
| 6,963,796 B2 | 11/2005 | Larson et al. |
| 6,964,164 B1 | 11/2005 | Langenfeld |
| 6,968,687 B1 | 11/2005 | Poplawski et al. |
| 6,972,234 B1 | 12/2005 | Phanco et al. |
| 6,973,768 B2 | 12/2005 | Samejima et al. |
| 6,981,780 B2 | 1/2006 | Einav |
| 6,988,570 B2 | 1/2006 | Takeuchi |
| 7,017,327 B2 | 3/2006 | Hunt et al. |
| 7,047,736 B1 | 5/2006 | Langenfeld et al. |
| 7,051,499 B2 | 5/2006 | Goto et al. |
| 7,111,545 B1 | 9/2006 | Langenfeld |
| 7,121,092 B1 | 10/2006 | Phanco et al. |
| 7,127,041 B1 | 10/2006 | Houck et al. |
| 7,127,877 B2 * | 10/2006 | Curran .................. A01D 34/73 D15/17 |
| 7,127,889 B1 | 10/2006 | Bennett et al. |
| 7,165,639 B2 | 1/2007 | Delaney et al. |
| 7,194,850 B2 | 3/2007 | Asahara et al. |
| 7,213,662 B2 | 5/2007 | Crumly et al. |
| 7,225,617 B1 | 6/2007 | Langenfeld et al. |
| 7,226,387 B2 | 6/2007 | Thompson et al. |
| 7,231,994 B2 | 6/2007 | Buglione et al. |
| 7,270,200 B2 | 9/2007 | Goto et al. |
| 7,299,610 B2 | 11/2007 | Piontek |
| 7,308,790 B1 | 12/2007 | Bennett et al. |
| 7,325,388 B2 | 2/2008 | Wright et al. |
| 7,328,576 B1 | 2/2008 | Langenfeld et al. |
| 7,340,890 B2 | 3/2008 | Poplawski et al. |
| 7,353,651 B2 | 4/2008 | Adkins et al. |
| 7,383,683 B1 | 6/2008 | Rawski |
| 7,392,643 B2 | 7/2008 | Warashina et al. |
| 7,392,853 B2 | 7/2008 | Baran |
| D574,860 S | 8/2008 | Potts |
| 7,412,828 B1 | 8/2008 | Bennett et al. |
| 7,429,430 B2 | 9/2008 | Mooty et al. |
| 7,451,865 B2 | 11/2008 | Eavenson, Sr. et al. |
| 7,454,908 B1 | 11/2008 | Langenfeld et al. |
| 7,458,432 B2 | 12/2008 | Mayer et al. |
| 7,540,131 B2 | 6/2009 | Stover et al. |
| D598,475 S | 8/2009 | Roth |
| 7,578,116 B1 | 8/2009 | Howell |
| 7,590,768 B2 | 9/2009 | Gormley |
| 7,594,377 B1 | 9/2009 | Jansen et al. |
| 7,596,636 B2 | 9/2009 | Gormley |
| 7,610,975 B1 | 11/2009 | Gust et al. |
| 7,610,986 B2 | 11/2009 | Phashi |
| D609,251 S | 2/2010 | Roth |
| 7,661,486 B2 | 2/2010 | Turner et al. |
| 7,673,712 B2 | 2/2010 | Lida et al. |
| 7,686,108 B2 | 2/2010 | Piontek |
| 7,712,294 B2 | 2/2010 | Wright et al. |
| 7,721,517 B2 | 2/2010 | Hunt et al. |
| 7,731,398 B2 | 2/2010 | Probasco |
| 7,735,592 B2 | 2/2010 | Bellot et al. |
| 7,784,254 B2 * | 8/2010 | Bever .................. A01D 34/733 56/255 |
| 7,798,939 B2 | 9/2010 | Musat et al. |
| 7,810,964 B2 | 10/2010 | Probasco |
| 7,826,232 B2 | 11/2010 | Von Arx et al. |
| 7,841,176 B1 | 11/2010 | Langenfeld et al. |
| 7,870,711 B2 | 1/2011 | Koehn |
| 7,908,833 B2 | 3/2011 | Nicholson et al. |
| 7,918,305 B2 | 4/2011 | Scherbring et al. |
| 8,028,520 B1 | 10/2011 | Rawski |
| 8,028,776 B2 | 10/2011 | Bong et al. |
| 8,047,310 B2 | 11/2011 | Kallevig |
| 8,055,399 B2 | 11/2011 | Wyatt et al. |
| 8,056,653 B2 | 11/2011 | Hunt et al. |
| 8,100,204 B2 | 1/2012 | Dong et al. |
| 8,104,934 B2 | 1/2012 | Probasco |
| 8,149,587 B2 | 4/2012 | Baran et al. |
| 8,181,717 B2 | 5/2012 | Turner et al. |
| 8,191,342 B2 | 6/2012 | Shii et al. |
| 8,207,693 B2 | 6/2012 | Hauser et al. |
| 8,234,026 B2 | 7/2012 | Wyatt et al. |
| 8,235,559 B2 | 8/2012 | Probasco |
| 8,245,509 B1 | 8/2012 | Langenfeld et al. |
| 8,296,003 B2 | 10/2012 | Wyatt et al. |
| 8,312,937 B2 | 11/2012 | Turner et al. |
| 8,418,452 B1 | 4/2013 | Phanco et al. |
| 8,450,953 B2 | 5/2013 | Hauser et al. |
| 8,490,722 B2 | 7/2013 | Koga et al. |
| 8,544,570 B2 | 10/2013 | Ishii et al. |
| 8,548,694 B2 | 10/2013 | Wyatt et al. |
| D693,373 S | 11/2013 | Shiotsuki |
| 8,572,939 B2 | 11/2013 | Koike et al. |
| 8,573,324 B2 | 11/2013 | Turner et al. |
| 8,579,055 B2 | 11/2013 | Sasahara et al. |
| D694,782 S | 12/2013 | Roth |
| D696,301 S | 12/2013 | DeLeon |
| 8,657,041 B2 | 2/2014 | Ishii et al. |
| 8,668,033 B2 | 3/2014 | Koike et al. |
| 8,668,036 B2 | 3/2014 | Wyatt et al. |
| 8,689,551 B1 | 4/2014 | Phanco et al. |
| 8,783,391 B2 | 7/2014 | Porter et al. |
| D710,396 S | 8/2014 | Nie |
| 8,794,660 B1 | 8/2014 | Stover et al. |
| 8,800,279 B2 | 8/2014 | Kita et al. |
| 8,838,311 B2 | 9/2014 | Koike et al. |
| 8,844,658 B2 | 9/2014 | Wyatt et al. |
| 8,849,490 B2 | 9/2014 | Wyatt et al. |
| 8,850,782 B2 | 10/2014 | Haraqia et al. |
| 8,880,300 B2 | 11/2014 | Gamble et al. |
| 8,965,630 B2 | 2/2015 | Wyatt et al. |
| 9,002,585 B2 | 4/2015 | Porter et al. |
| 9,114,703 B1 | 8/2015 | Bennett et al. |
| 9,114,798 B1 | 8/2015 | Fox et al. |
| 9,194,473 B1 | 11/2015 | Hauser et al. |
| D745,061 S | 12/2015 | DeLeon |

(56) References Cited

U.S. PATENT DOCUMENTS

| | | |
|---|---|---|
| 9,248,737 B2 | 2/2016 | Iwaki et al. |
| 9,288,939 B2 | 3/2016 | Porter et al. |
| 9,301,443 B2 | 4/2016 | Hashima et al. |
| 9,307,695 B2 | 4/2016 | Nishihara |
| 9,308,817 B1 | 4/2016 | Phanco et al. |
| D755,858 S | 5/2016 | Brown |
| 9,381,639 B2 | 7/2016 | Wemer et al. |
| 9,403,435 B2 | 8/2016 | Bejcek |
| 9,408,343 B2 | 8/2016 | Wyatt et al. |
| 9,409,553 B2 | 8/2016 | Nakamura et al. |
| 9,409,578 B2 | 8/2016 | Wyatt et al. |
| 9,420,740 B2 | 8/2016 | Ishii et al. |
| 9,435,324 B2 | 9/2016 | Richardson et al. |
| 9,468,144 B2* | 10/2016 | Kurioka ............... A01D 34/826 |
| 9,480,200 B1* | 11/2016 | Patridge ............... A01D 34/66 |
| 9,492,919 B2 | 11/2016 | Roehm et al. |
| 9,499,199 B1 | 11/2016 | Laymon et al. |
| 9,538,699 B1 | 1/2017 | Bejcek et al. |
| 9,538,706 B2 | 1/2017 | Haun |
| 9,616,736 B2 | 4/2017 | Ito et al. |
| D786,310 S | 5/2017 | Southwell |
| 9,656,687 B2 | 5/2017 | Koike et al. |
| 9,699,964 B2 | 7/2017 | Roth |
| 9,706,706 B2 | 7/2017 | Barendrecht |
| 9,725,114 B1 | 8/2017 | Brown et al. |
| 9,725,115 B1 | 8/2017 | Hauser et al. |
| 9,731,760 B2 | 8/2017 | Ito |
| 9,750,183 B2* | 9/2017 | Haun ............... A01D 34/733 |
| 9,750,191 B2 | 9/2017 | Richardson et al. |
| 9,764,734 B1 | 9/2017 | Brown |
| 9,765,761 B1 | 9/2017 | Fox et al. |
| 9,765,870 B1 | 9/2017 | Fox et al. |
| D801,394 S | 10/2017 | Southwell |
| 9,820,441 B2 | 11/2017 | Heathcoat et al. |
| 9,839,179 B2 | 12/2017 | Stover et al. |
| 9,888,626 B2 | 2/2018 | Gilpatrick |
| 9,968,031 B2 | 5/2018 | Bejcek et al. |
| D837,266 S | 1/2019 | Wong |
| D837,267 S | 1/2019 | Wong |
| D837,268 S | 1/2019 | Burrows |
| D849,799 S | 5/2019 | Bollman |
| 10,285,328 B2* | 5/2019 | Kurioka ............... A01D 34/68 |
| 10,426,084 B2 | 10/2019 | Ito et al. |
| D873,302 S | 1/2020 | Southwell |
| D902,262 S | 11/2020 | Hoover |
| 11,122,737 B2 | 9/2021 | Xu et al. |
| 11,246,260 B2 | 2/2022 | Xu et al. |
| D949,206 S | 4/2022 | Cmich |
| 2001/0001170 A1 | 5/2001 | Velke et al. |
| 2002/0056263 A1* | 5/2002 | Schaedler ............... A01D 34/73  56/295 |
| 2003/0168272 A1 | 9/2003 | Ono et al. |
| 2003/0209000 A1 | 11/2003 | Mannon |
| 2003/0222607 A1 | 12/2003 | Simizu et al. |
| 2005/0016320 A1 | 1/2005 | Porter |
| 2006/0010844 A1 | 1/2006 | Angott |
| 2006/0042216 A1 | 3/2006 | Warashina et al. |
| 2006/0162310 A1 | 7/2006 | Dittmer |
| 2006/0168933 A1 | 8/2006 | Hill, Jr. |
| 2007/0074497 A1* | 4/2007 | Myers ............... A01D 34/73  56/295 |
| 2008/0072556 A1 | 3/2008 | Tegtmeier et al. |
| 2008/0234096 A1 | 9/2008 | Joshi et al. |
| 2009/0182470 A1 | 7/2009 | Garvey et al. |
| 2010/0043378 A1 | 2/2010 | Abernethy |
| 2010/0085745 A1 | 4/2010 | Kristiansen et al. |
| 2010/0117594 A1 | 5/2010 | Bizzontz |
| 2010/0139231 A1* | 6/2010 | Washburn, IV ......... A01D 34/73  56/295 |
| 2012/0228041 A1 | 9/2012 | Borinato |
| 2012/0233975 A1 | 9/2012 | Coussins |
| 2013/0008682 A1 | 1/2013 | Turner et al. |
| 2013/0104509 A1* | 5/2013 | Mackinnon ............ A01D 34/78  701/22 |
| 2013/0155657 A1 | 6/2013 | Wemer et al. |
| 2013/0327007 A1 | 12/2013 | Eavenson, Sr. |
| 2014/0100743 A1 | 4/2014 | Foster et al. |
| 2014/0182257 A1 | 7/2014 | von Rentzell |
| 2014/0196425 A1* | 7/2014 | Lewis ............... A01D 34/78  56/16.7 |
| 2015/0052869 A1* | 2/2015 | Roth ............... A01D 34/81  56/295 |
| 2015/0082763 A1 | 3/2015 | Nishihara |
| 2015/0173299 A1 | 6/2015 | Heathcoat et al. |
| 2015/0271997 A1 | 10/2015 | Kurioka et al. |
| 2015/0271998 A1* | 10/2015 | Kurioka ............... A01D 34/68  56/255 |
| 2016/0183451 A1 | 6/2016 | Conrad et al. |
| 2016/0242355 A1 | 8/2016 | Talaski |
| 2016/0288829 A1 | 10/2016 | Ito et al. |
| 2017/0020067 A1 | 1/2017 | Haun |
| 2017/0021861 A1 | 1/2017 | Ito et al. |
| 2017/0055443 A1 | 3/2017 | Fuji et al. |
| 2017/0105339 A1 | 4/2017 | Yang et al. |
| 2017/0120922 A1 | 5/2017 | Schaedler et al. |
| 2017/0245426 A1 | 8/2017 | Kuriyagawa et al. |
| 2017/0303469 A1 | 10/2017 | Schaedler et al. |
| 2018/0146616 A1 | 5/2018 | Fukano et al. |
| 2018/0152121 A1 | 5/2018 | Fukano et al. |
| 2018/0160620 A1 | 6/2018 | Wang et al. |
| 2018/0231238 A1 | 8/2018 | Burch et al. |
| 2019/0045707 A1* | 2/2019 | Patridge ............... A01D 34/66 |
| 2019/0200521 A1* | 7/2019 | Aboumrad ........... A01D 69/025 |
| 2019/0335654 A1 | 11/2019 | Ito |
| 2020/0000023 A1 | 1/2020 | Chung |
| 2020/0052558 A1* | 2/2020 | Kouda ............... A01D 34/78 |
| 2020/0100426 A1* | 4/2020 | Kurihara ............... A01D 34/63 |
| 2020/0253115 A1* | 8/2020 | Feng ............... A01D 34/733 |
| 2020/0404840 A1 | 12/2020 | Xu et al. |
| 2021/0289697 A1 | 9/2021 | Kurihara et al. |
| 2021/0321564 A1 | 10/2021 | Yamaoka et al. |
| 2023/0117891 A1* | 4/2023 | Broge ............... A01D 34/64  56/15.8 |

FOREIGN PATENT DOCUMENTS

| | | | |
|---|---|---|---|
| CN | 1802890 A | 7/2006 | |
| CN | 202145746 U | 2/2012 | |
| CN | 202145746 U * | 2/2012 | |
| CN | 102388720 A * | 3/2012 | ........... A01D 34/685 |
| CN | 102684235 A | 9/2012 | |
| CN | 102986361 A | 3/2013 | |
| CN | 202819008 U | 3/2013 | |
| CN | 203251656 U | 10/2013 | |
| CN | 203369100 U | 1/2014 | |
| CN | 203423971 U | 2/2014 | |
| CN | 103703918 A | 4/2014 | |
| CN | 104363749 A | 2/2015 | |
| CN | 104669226 | 6/2015 | |
| CN | 204681890 U | 10/2015 | |
| CN | 105075497 A | 11/2015 | |
| CN | 105082096 | 11/2015 | |
| CN | 204796177 U | 11/2015 | |
| CN | 205363843 U | 7/2016 | |
| CN | 205363844 U | 7/2016 | |
| CN | 205466090 U | 8/2016 | |
| CN | 205546539 U | 9/2016 | |
| CN | 106612971 | 5/2017 | |
| CN | 206323814 U | 7/2017 | |
| CN | 206353985 U | 7/2017 | |
| CN | 206423166 U | 8/2017 | |
| CN | 107302864 A | 10/2017 | |
| CN | 206855413 U | 1/2018 | |
| CN | 207139764 U | 3/2018 | |
| CN | 207240145 U | 4/2018 | |
| CN | 207269396 U | 4/2018 | |
| CN | 207340527 U | 5/2018 | |
| CN | 108207334 | 6/2018 | |
| CN | 108790946 | 11/2018 | |
| DE | 3019256 | 11/1981 | |
| DE | 3232895 A1 | 3/1984 | |
| DE | 4105557 A1 | 9/1992 | |
| DE | 9311901 U1 | 12/1993 | |

(56) References Cited

FOREIGN PATENT DOCUMENTS

| | | | | |
|---|---|---|---|---|
| DE | 9319361 | U1 | 2/1994 | |
| DE | 29513651 | U1 | 1/1997 | |
| DE | 20309420 | U1 | 9/2003 | |
| DE | 102006058958 | A1 * | 6/2008 | ............ A01D 34/73 |
| DE | 102006058958 | A1 | 6/2008 | |
| DE | 102012213047 | A1 | 1/2014 | |
| DE | 102012218601 | A1 | 4/2014 | |
| DE | 202017100938 | U1 | 3/2017 | |
| DE | 202017100938 | U1 * | 4/2017 | ........... A01D 34/005 |
| EP | 0499879 | A1 | 8/1992 | |
| EP | 0528478 | A1 | 2/1993 | |
| EP | 0898870 | A1 | 3/1999 | |
| EP | 0957526 | | 11/1999 | |
| EP | 0981944 | A1 | 3/2000 | |
| EP | 1348328 | | 10/2003 | |
| EP | 1447281 | A1 | 8/2004 | |
| EP | 1498018 | A1 | 1/2005 | |
| EP | 1498018 | A1 * | 1/2005 | ............. A01D 34/73 |
| EP | 2357107 | A1 | 8/2011 | |
| EP | 2798937 | | 11/2014 | |
| EP | 2798937 | A1 * | 11/2014 | ........... A01D 34/733 |
| EP | 3695702 | A1 | 8/2020 | |
| EP | 3695702 | A1 * | 8/2020 | ......... A01D 34/6818 |
| FR | 2756536 | A1 | 6/1998 | |
| FR | 2893222 | A1 | 5/2007 | |
| GB | 2037138 | A | 7/1980 | |
| GB | 2302202 | A | 1/1997 | |
| GB | 2332355 | A * | 6/1999 | ......... A01D 34/6806 |
| GB | 2332355 | A | 6/1999 | |
| JP | 2003180118 | | 7/2003 | |
| JP | 2015188337 | A | 11/2015 | |
| JP | 2018102234 | A | 7/2018 | |
| JP | 2018102235 | A | 7/2018 | |
| SU | 1743448 | A1 | 6/1992 | |
| WO | 2000032462 | A1 | 6/2000 | |
| WO | 2000038255 | A1 | 6/2000 | |
| WO | 2010048561 | A1 | 4/2010 | |
| WO | 2016/037184 | A1 | 3/2016 | |
| WO | 2017173944 | A1 | 10/2017 | |
| WO | 2017173945 | A1 | 10/2017 | |

OTHER PUBLICATIONS

Greenworks, Gree Bo electric brush cutter 80V, http://goods.jc001.cn/detail/4444528.html, 12 pages.
CIPO, office action issued on Canadian patent application 3,114,468, dated Jun. 21, 2021, 6 pages.
Australian Patent Office, examination report issued of Australian patent application No. 2019346954, dated Feb. 16, 2022, 3 pages.
EPO, extended European Search Report issued on European patent application No. 19866834.5, dated Jul. 22, 2021, 10 pgs.
Owner's manual for Model No. HRN216VKA Lawn Mower.
You Tube video—https://www.youtube.com/watch?v=iORCGT_K7mc.
U.S. Patent and Trademark Office, Non-Final Office Action issued in U.S. Appl. No. 29/865,321, dated Nov. 25, 2022, 15 pages.
U.S. Patent and Trademark Office, Non-Final Office Action issued in U.S. Appl. No. 17/825,815, dated Jul. 25, 2022, 13 pgs.
U.S. Patent and Trademark Office, Non-Final Office Action issued in U.S. Appl. No. 17/863,038, dated Nov. 29, 2022, 21 pgs.
U.S. Patent and Trademark Office, Final Office Action issued in U.S. Appl. No. 17/825,815, dated Nov. 15, 2022, 39 pgs.
U.S. Patent and Trademark Office, Non-Final Office Action issued in U.S. Appl. No. 29/865,427, dated Nov. 25, 2022, nine (9) pages.
U.S. Patent and Trademark Office, Non-Final Office Action issued in U.S. Appl. No. 17/825,815, dated Jul. 14, 2023, 12 pages.
U.S. Patent and Trademark Office, Final Office Action issued in U.S. Appl. No. 18/076,847, dated Jul. 17, 2023, 10 pages.
U.S. Patent and Trademark Office, Non-Final Office Action issued in U.S. Appl. No. 18/076,847, dated Mar. 23, 2023, 11 pages.
U.S. Patent and Trademark Office, Final Office Action issued in U.S. Appl. No. 17/863,038, dated Apr. 4, 2023, 10 pages.

* cited by examiner

BLADE ASSEMBLY FOR A LAWN MOWER

RELATED APPLICATION INFORMATION

This application is a continuation of U.S. patent application Ser. No. 18/076,847, filed Dec. 7, 2022, which is a continuation of U.S. patent application Ser. No. 17/863,038, filed Jul. 12, 2022, which is a continuation of U.S. patent application Ser. No. 17/825,815 filed May 26, 2022, which is a continuation of U.S. patent application Ser. No. 17/573,153 filed Jan. 11, 2022, which is a continuation of U.S. patent application Ser. No. 17/236,239, now U.S. Pat. No. 11,246,260, filed Apr. 21, 2021, which is a continuation of U.S. patent application Ser. No. 17/164,479, now U.S. Pat. No. 11,122,737, filed Feb. 1, 2021, which application is a continuation of International Application Number PCT/CN2019/107650, filed on Sep. 25, 2019, through which this application also claims the benefit of Chinese Patent Application No. 201821584956.0, filed on Sep. 27, 2018, Chinese Patent Application No. 201821889111.2, filed on Nov. 15, 2018, Chinese Patent Application No. 201920533524.5, filed on Apr. 18, 2019, Chinese Patent Application No. 201910312144.3, filed on Apr. 18, 2019, Chinese Patent Application No. 201910576318.7, filed on Jun. 28, 2019, and Chinese Patent Application No. 201921545742.7, filed on Sep. 17, 2019, each of which is incorporated herein by reference in its entirety.

BACKGROUND

As a basic operation of lawn trimming, mowing requires the use of simple and efficient mowing machinery to complete the mowing task with guaranteed quality and quantity. Lawn mowers have been widely used in the trimming of various kinds of lawns. As the functional element of the lawn mower, the structural design of the blade greatly affects the cutting performance of the lawn mower.

Lawn mowers can be divided into engine-driven and motor-driven by energy source. Among them, the motor-driven lawn mower generally uses battery packs as an energy source, which has the advantages of less noise and pollution. However, considering the load problem, the motor-driven lawn mower in the related art has an unreasonable blade structure, which results in a large load on the motor and a low cutting efficiency.

SUMMARY

The present application provides a blade assembly for a lawn mower with a smaller motor load and higher cutting efficiency.

An example provides a lawn mower, including: a blade assembly configured to perform a cutting function; a deck formed with an accommodation space for accommodating at least a portion of the blade assembly; a motor configured to drive the blade assembly to rotate about a rotation axis; and a battery pack configured to provide power source for the motor. The blade assembly includes: a first cutting portion configured to cut grass; and a second cutting portion configured to cut grass; wherein in the direction parallel to the rotation axis, the second cutting portion is located below the first cutting portion. The battery pack includes a battery pack housing and battery cells provided in the battery pack housing. The maximum length of a line connecting any two points of the projection of the blade assembly in a plane perpendicular to the rotation axis and the projection of the rotation axis in the plane is the rotation diameter of the blade assembly. The product of the rotation diameter D (mm), the number N of battery cells included in the battery pack, and the mass M (g) of the blade assembly is greater than or equal to $3.5 \times 10^5$ (mm·g) and less than or equal to $7.3 \times 10^7$ (mm·g).

BRIEF DESCRIPTION OF THE DRAWINGS

FIG. 16 is a plan view from another angle of the second blade of the blade assembly in

FIG. 13;

DETAILED DESCRIPTION

Example 1

Figure 1:
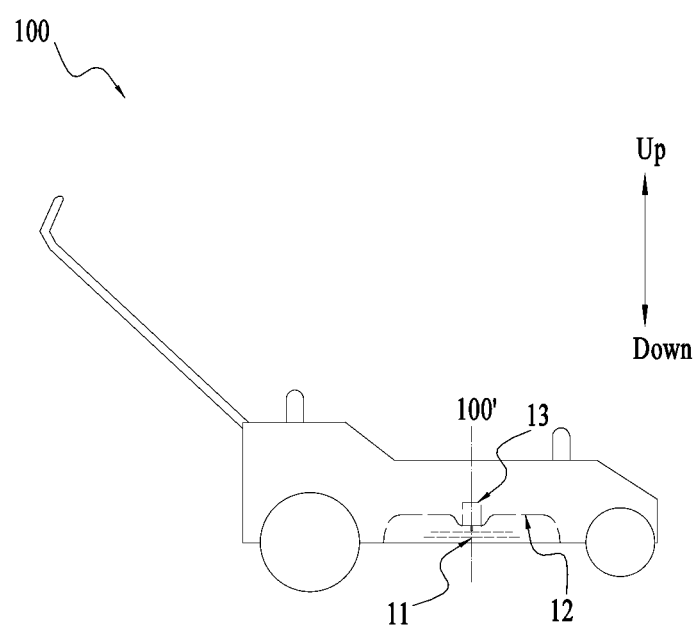
FIG. 1 is a schematic diagram of a lawn mower provided as Example 1.

FIG. 1 is a schematic diagram of a lawn mower 100 provided in Example 1 of the present application. Depending on the operation mode of the user, the lawn mower 100 in the present application may be either a hand-push lawn mower or a riding lawn mower. This example uses a hand-push lawn mower driven by a motor as an example for description. All "assembly" in this application refer to a combination including at least one component or part, which realizes a specific function through interaction or coordination. For the convenience of explaining the technical solution of the present application, the up-down direction is defined as shown in FIG. 1.

Figure 2:
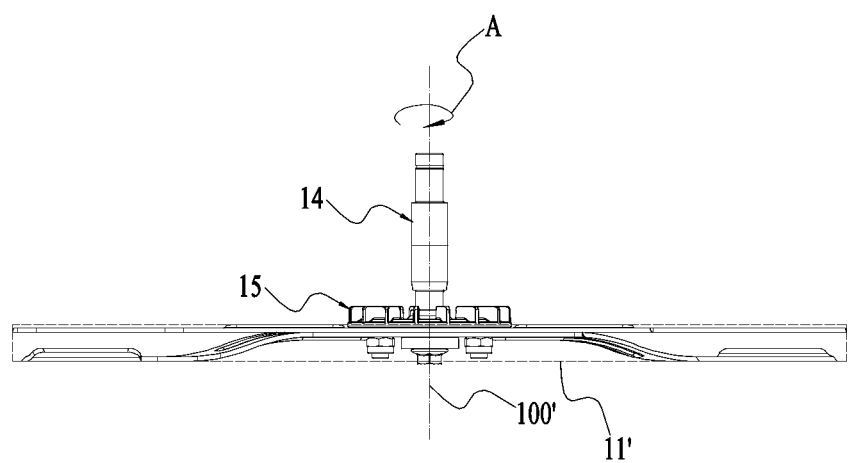
FIG. 2 is a plan view of a partial structure of the lawn mower of FIG. 1.
Figure 3:
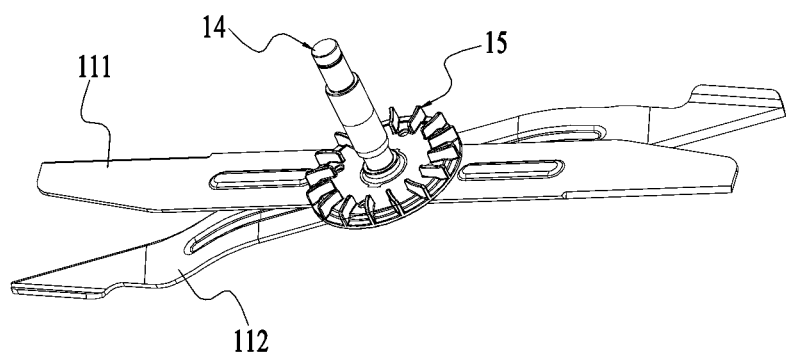
FIG. 3 is a perspective view of a partial structure of the lawn mower of FIG. 1.

As shown in FIGS. 1-3, the lawn mower 100 includes a blade assembly 11, a deck 12, a motor 13, and a battery pack. The blade assembly 11 is configured to perform the cutting function of the lawn mower 100; the deck 12 is formed with an accommodation space for accommodating at least part of the blade assembly 11; in this example, the blade assembly 11 is located inside the accommodation space; the motor 13 drives the blade assembly 11 to rotate about the rotation axis 100', and the motor 13 is located above the deck 12 and forms a coaxial rotation with the blade assembly 11 about the rotation axis 100'. In an example, the motor 13 includes a motor shaft, and the lawn mower 100 further includes a drive shaft 14 that drives the blade assembly 11 to rotate. The drive shaft 14 may be a motor shaft, and a transmission mechanism may be provided between the motor 13 and the blade assembly 11 so that the motor 13 and the drive shaft 14 form a non-coaxial rotation. The battery pack provides a power source for the motor 13. The lawn mower 100 also includes a fan 15 connected to the drive shaft 14; the fan 15 rotates about an axis that is parallel or coincident with the rotation axis 100'.

When the motor 13 is started to drive the blade assembly 11 to rotate about the rotation axis 100' and the tip linear velocity of the blade assembly 11 is greater than or equal to 40 m/s and less than or equal to 100 m/s, the working time of the lawn mower 100 with 100 WH energy consumption of the battery pack is defined as the hectowatt-hour battery life of the lawn mower 100, and the hectowatt-hour battery life of the lawn mower 100 is greater than or equal 4 min and less than or equal to 30 min; in one example, the hectowatt-hour battery life of the lawn mower 100 is greater than or equal to 5 min and less than or equal to 20 min; in other examples, the hectowatt-hour battery life of the lawn mower 100 is greater than or equal to 6 min and less than or equal to 15 min. In this example, the hectowatt-hour battery life of the lawn mower 100 is about 12 min. Since the lawn mower 100 of the present example has the blade assembly 100 with better structure design, smaller load and higher cutting efficiency, during operation the lawn mower 100 has a hectowatt-hour battery life in the above range, such that the lawn mower 100 has a good cutting performance. The battery pack here only refers to the battery pack that supplies power to the motor 13 to drive the blade assembly 11 to rotate.

In addition, when the motor 13 drives the blade assembly 11 to rotate about the rotation axis 100' at no load, the working time of the lawn mower 100 with 100 WH energy consumption of the battery pack is defined as the no-load battery life of the lawn mower 100, and the no-load battery life of the lawn mower 100 is greater than or equal to 9 min and less than or equal to 35 min; in one example, the no-load battery life of the lawn mower 100 is greater than or equal to 12 min and less than or equal to 33 is min; in other examples, the no-load battery life of the lawn mower 100 is greater than or equal to 18 min and less than or equal to 30 min. In this example, the no-load battery life of the lawn mower 100 is about 22 min. Since the lawn mower 100 of the present example has the blade assembly with better structure design, smaller load and higher cutting efficiency, as well as reasonable no-load condition settings, during operation the lawn mower 100 has a no-load battery life in the above range, such that the lawn mower 100 has a good cutting performance.

As shown in FIGS. 2-5, the blade assembly 11 includes a first blade 111 and a second blade 112, and the first blade 111 and the second blade 112 are respectively formed with a first cutting portion 111a and a second cutting portion 112a that are configured to cut grass. When the entirety constructed by the first blade 111 and second blade 112 rotate about the rotation axis 100', the first cutting portion 111a and the second cutting portion 112a performs mowing. In this example, the cutting portions refer to a structure having a cutting function to cut vegetation; the cutting portion may be a common cutting portion or a cutting structure different from the cutting portion. A cutting portion refers to an integrally formed or continuous structure.

In a direction parallel to the rotation axis 100', the second cutting portion 112a is located below, but not limited to directly under, the first cutting portion 111a; or the second cutting portion 112a and the first cutting portion 111a are at least partially within the same plane. In this example, the first blade 111 and the second blade 112 are two blades formed separately. The first blade 111 is located above the second blade 112 relative to the ground in a direction parallel to the rotation axis 100'. The first blade 111 and the second blade 112 rotate synchronously. As shown by the arrows in FIG. 2, the first blade 111 and the second blade 112 rotate coaxially and synchronously along the rotation direction A about the rotation axis 100'.

The lawn mower 100 also includes a control system configured to control the operation of the motor 13. When the lawn mower 100 has no load, the sum of the input power of the motor 13, the input power of the control system, and the input power of the blade assembly 11 is the no-load input power of the lawn mower 100; the no-load input power is greater than or equal to 100 W and less than or equal to 380 W, in this example, the no-load input power is greater than or equal to 200 W and less than or equal to 300 W.

In one example, no-load means that the blade assembly 11 of the lawn mower 100 rotates at a predetermined speed under atmospheric pressure, and the blade assembly 11 has no external load.

The volume of the smallest cylinder 11' surrounding the first blade 111 and the second blade 112 is defined as the sweep volume of the blade assembly 11. When the blade assembly 11 rotate about the rotation axis 100', the first cutting portion 111a and the second cutting portion 112a are both located in the space surrounded by the smallest cylinder 11'. As shown in FIG. 2, the rectangle indicated by the dotted line is a plan view of the cylinder 11' that surrounds the first blade 111 and the second blade 112 in this example. The sweep volume of the blade assembly 11 is the volume of the cylinder 11', and the volume of the cylinder 11' is about the volume of the cylinder 11' with the rotation diameter D of the blade assembly 11 as the diameter (referring to FIG. 4), and the maximum height of the blade assembly 11 in the direction parallel or coincident with the rotation axis 100' as the height. The rotation diameter D of the blade assembly 11 is the maximum length of the line connecting any two points of the projection of the blade assembly 11 in a plane perpendicular to the rotation axis 100' and the projection of the rotation axis 100' in the plane. In this example, since the first blade 111 and the second blade 112 are both perpendicular to the rotation axis 100', and the first blade 111 and the second blade 112 are coaxially mounted to the drive shaft 14; the first blade 111 is located directly above the second blade 112. The sweep volume of the blade assembly 11 is about the volume of the cylinder 11' with the maximum distance from any point on the blade assembly 11 to the rotation axis 100' as the radius, and the maximum sum of the heights of the first blade 111 and the second blade 112 parallel to the rotation axis 100' as the height. In one example, the heights of the first blade 111 and the second blade 112 are respectively the maximum dimensions of the first blade 111 and the second blade 112 in the direction parallel to the rotation axis 100' when the blade assembly 11 is mounted to the drive shaft 14.

In this example, the sweep volume of the blade assembly 11 is greater than or equal to 400 cm$^3$ and less than or equal to 8000 cm$^3$. When the sweep volume of the blade assembly 11 is kept within this range, the lawn mower 100 has a relatively small load, in other words, when the sweep volume of the blade assembly 11 is kept within this range, the lawn mower 100 has a relatively small load while the double blades guarantee the cutting performance of the lawn mower 100, thereby enabling the lawn mower 100 to have a high cutting efficiency. In this example, the sweep volume of the blade assembly 11 is greater than or equal to 600 cm$^3$ and less than or equal to 6800 cm$^3$. In one example, the sweep volume of the blade assembly 11 is greater than or equal to 1000 cm$^3$ and less than or equal to 5000 cm$^3$.

The structure of the blade assembly is not limited to the structure in this example. In an example, the blade assembly may include only one blade; both the first cutting portion and the second cutting portion are provided on the blade. In the direction of the rotation axis, the second cutting portion is located below, but not limited to directly below, the first cutting portion; the first cutting portion and the second cutting portion may be integrally formed or connected with other structures to form a complete blade. For example, the blade assembly may include a blade body, and the first cutting portion and the second cutting portion are respectively disposed on a plurality of fins extending from the blade body, and the plurality of fins and the blade body may be fixedly connected or integrally formed or detachably connected.

Figure 4:
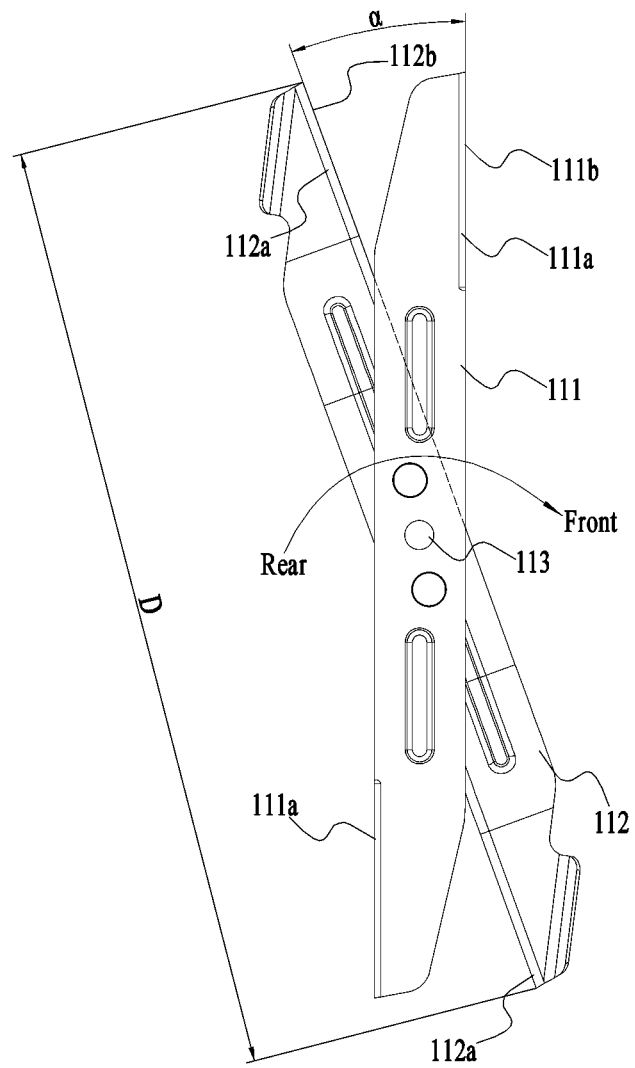
FIG. 4 is a plan view of a partial structure of a blade assembly of the lawn mower of FIG. 1.

As shown in FIG. 4, the phase angle α formed by the first cutting portion 111a and the second cutting portion 112a is greater than or equal to 0 and less than 90 degrees. The phase angle α is the angle between the straight lines on which the projections of the blade edge 111b of the first cutting portion 111a and the blade edge 112b of the second cutting portion 112a in a plane perpendicular to the rotation axis 100' are located. The edge 111b of the first cutting portion 111a is the front most side of the first cutting portion 111a, that is, the side that first contacts the vegetation when the first blade 111 rotates in the rotation direction A about the rotation axis 100'; Likewise, the edge of the second cutting portion 112a is the front most side of the second cutting portion 112a, that is, the side that first contacts the vegetation when the second blade 112 rotates in the rotation direction A about the rotation axis 100'. When the phase angle of the first cutting portion 111a and the second cutting portion 112a is within the above range, the first cutting portion 111a and the second cutting portion 112a as a whole have higher cutting efficiency. In an example, the phase angle α formed by the first cutting portion 111a and the second cutting portion 112a is greater than or equal to 10 degrees and less than or equal to 60 degrees. In this example, the phase angle α between the first cutting portion 111a and the second cutting portion 112a is about 20 degrees.

The first blade 111 includes at least one first cutting portion 111a, and the first cutting portion 111a may be regarded as a continuous cutting portion formed on the first blade 111. In an example, the first blade 111 and the second blade 112 respectively include at least two first cutting portions 111a and at least two second cutting portions 112a. In this example, the first blade 111 is formed with two first cutting portion 111a, the two first cutting portions 111a are respectively provided on two ends of the first blade 111, and are both disposed on the front side of the rotation direction A, that is, the side that first contacts the vegetation when the first blade 111 rotates in the rotation direction A about the rotation axis 100'; the two first cutting portions 111a are center symmetrical about the rotation axis 100'. Similarly, the second blade 112 also includes at least one second cutting portion 112a, in the present example the second blade 112 is formed with two second cutting portions 112a, the two second cutting portions 112a are respectively provided on two ends of the second blade 112, and are both located on the front side of the rotation direction A, that is, the side that first contacts the vegetation when the second blade 112 rotates in the rotation direction A about the rotation axis 100'; the two second cutting portions 112a are center symmetrical about the rotation axis 100'.

The sum of the number of the first cutting portions 111a formed by the first blade 111 and the number (unit: piece) of the second cutting portions 112a formed by the second blade 112 is defined as the number of cutting portions of the blade assembly 11. In the blade assembly 11 of the present example, the ratio of the sweep volume to the number of cutting portions of the blade assembly 11 is greater than or equal to 50 cm$^3$ and less than or equal to 4000 cm$^3$. In one example, the ratio of the sweep volume to the number of cutting portions of the blade assembly 11 is greater than or equal to 75 cm$^3$ and less than or equal to 3400 cm$^3$. In one example, structurally discontinuous first cutting portions 111a are regarded as a plurality of different first cutting portions 111a, and the number of first cutting portions 111a is the number of discontinuous first cutting portions 111a provided on the first blade 111; similarly, structurally discontinuous second cutting portions 112a are regarded as a plurality of different second cutting portions 112a, and the number of second cutting portions 112a is the number of discontinuous second cutting portions 112a provided on the second blade 112. In this example, the ratio of the sweep volume to the number of cutting portions of the blade assembly 11 is about 1700 cm$^3$. The greater the number of cutting portions, the better the cutting performance of the lawn mower 100, but the greater the number of cutting portions, the greater the sweep volume requirement of the blade assembly 11, as well as the load of the lawn mower 100. In this example, by optimizing the structure of the blade assembly 11, the ratio of the sweep volume to the number of cutting portions of the blade assembly 11 is kept within the above-mentioned optimal range, thereby ensuring that the lawnmower 100 maintains an optimal cutting performance under a small load.

Figure 5:
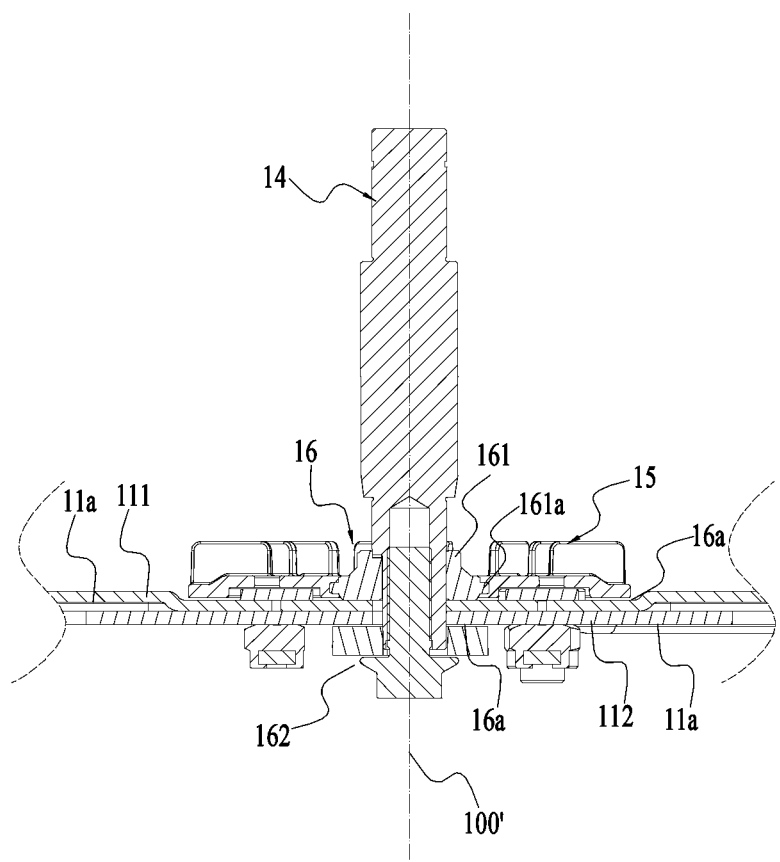
FIG. 5 is a cross-sectional view of a partial structure of the lawn mower of FIG. 1, wherein a mounting assembly is in a first mounting state.

As shown in FIG. 5, the lawn mower 100 further includes a mounting assembly 16, the mounting assembly 16 has a first mounting state in which the blade assembly 11 is mounted to the drive shaft 14 so that the blade assembly 11 rotates with the drive shaft 14 and a second mounting state in which one of the first blade 111 and the second blade 112 is removed and only the other one of the first cutting portion 111a and the second cutting portion 112a is mounted to perform the cutting function.

In this example, as shown in FIGS. 5-8, since the first cutting portion 111a and the second cutting portion 112a are respectively provided on the separately formed first blade 111 and second blade 112, therefore, the mounting assembly 16 has a first mounting state in which the blade assembly 11 is mounted to the drive shaft 14 so that the blade assembly 11 rotates with the drive shaft 14 and a second mounting state in which one of the first blade 111 and the second blade 112 is removed and only the other one of the first blade 111 and the second blade 112 is mounted to perform the cutting function. That is to say, the mounting assembly 16 can mount the blade assembly 11 including the first blade 111 and the second blade 112 to the drive shaft 14 in the first mounting state, and can also mount the blade assembly 11 including only one of the first blade 111 and the second blade 112 to the drive shaft 14 in the second mounting state. Considering the diversity of usage conditions, the mounting assembly 16 in this example has multiple mounting states to provide better adaptability, allowing the user to reduce or increase the number of blades based on their specific needs without having to replace the entire mounting assembly 16 and blade assembly 11, thereby enhancing mowing practicability.

In an example, the mounting assembly 16 has a first mounting state in which a first type of blade assembly including the first cutting portion and the second cutting portion is mounted to the drive shaft, and the mounting assembly also has a second mounting state in which the first type of blade assembly is removed and a second type of blade assembly including only one cutting portion is mounted to the drive shaft. Based on the structure that the first cutting portion and the second cutting portion are respectively provided on the first blade and the second blade, that is to say, the mounting assembly has a first mounting state in which a first type of blade assembly including the first blade and the second blade is mounted to the drive shaft. The mounting assembly also has a second mounting state in which the first type of blade assembly is removed and a second type of blade assembly including only one blade is mounted to the drive shaft. In other words, the mounting assembly 16 can not only independently install one or both of the first blade and the second blade, but also independently install other blades that do not belong to the first blade and the second blade.

In an example, the lawn mower includes a first type of blade assembly that performs the cutting function. The first type of blade assembly includes a first blade, and the first blade is formed with a first cutting portion that is configured to cut grass. The mounting assembly has a first mounting state in which the first type of blade assembly is mounted to the drive shaft so that the blade assembly rotates with the drive shaft; the mounting assembly also has a second type in which the first type of blade assembly is removed and a second type of blade assembly including two cutting portions is mounted to the drive shaft to perform the cutting function; wherein, the two cutting portions of the second type of blade assembly are respectively located on the upper and lower sides in the direction of the rotation axis. That is to say, the mounting assembly causes the lawn mower to switch from the first type of blade assembly with one cutting portion to the second type of blade assembly with two cutting portions; the two cutting portions are respectively located on the upper and lower sides in the direction of the rotation axis. In an example, the second type of blade assembly may include the first cutting portion of the first type of blade assembly, or may not include the first cutting portion of the first type of blade assembly but is otherwise formed second type of blade assembly totally different from the first type of blade assembly. If the second type of blade assembly includes the first cutting portion of the first type of blade assembly, the position of the first cutting portion relative to the drive shaft may be the same or may be changed. For example, the first type of blade assembly includes the first blade provided with the first cutting portion, the second type of blade assembly adds a second blade provided with a second cutting portion in addition to the first type of blade assembly, and the second blade is mounted to the lower side or the upper side of the first blade in the direction of the rotation axis through the mounting assembly.

In an example, the lawn mower includes a blade assembly and a lawn mower body. The lawn mower body includes a deck, a motor, and a battery pack. The motor is mounted to the deck, and the battery pack supplies power to the motor. The blade assembly includes a first type of blade assembly and a second type of blade assembly, and the motor drives the first type of blade assembly or the second type of blade assembly to rotate about a rotation axis; the first type of blade assembly includes a first blade, and the first blade is formed with a first cutting portion for cutting grass; the second type of blade assembly includes a first blade and a second blade, the first blade is formed with a first cutting portion for cutting grass; the second blade is formed with a second cutting portion for cutting grass; wherein, in the direction of the rotation axis, the second cutting portion is located below the first cutting portion; the body of the lawn mower can be adapted to the first type of blade assembly or the second type of blade assembly. The body of the lawn mower can be adapted to mount the second type of blade assembly after the first type of blade assembly is removed, or can be adapted to mount the first type of blade assembly when the second type of blade assembly is removed.

Figure 6:
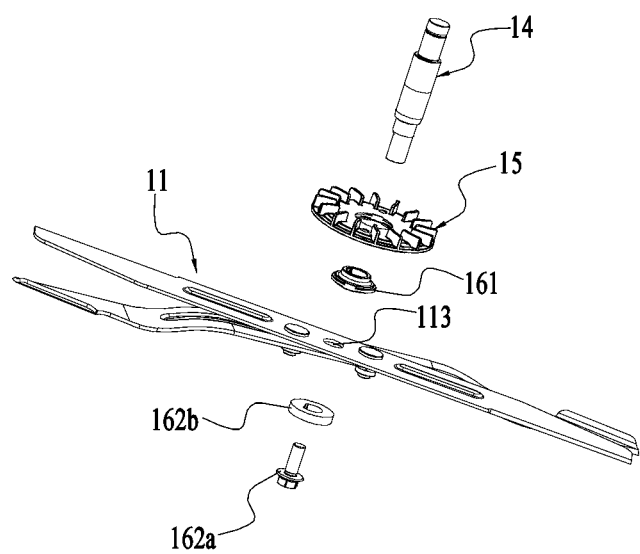
FIG. 6 is an exploded view of a partial structure of the lawn mower of FIG. 1.

The blade assembly 11 in the present example is driven by friction. The mounting assembly 16 includes a drive member 161; the drive member 161 is configured to drive the blade assembly 11 to rotate about the rotation axis 100'; the drive member 161 is connected to the drive shaft 14 and is driven by the shaft 14 is, and the drive member 161 and the blade assembly 11 realize transmission through static friction. In one example, as shown in FIGS. 5-6, the drive member 161 is a flange, and the flange and the drive shaft 14 form a fixed connection in the radial direction, and the blade assembly 11 is in surface contact with the flange in a plane perpendicular to the rotation axis 100'. The mounting assembly 16 further includes a clamping assembly 162; the clamping assembly 162 is configured to push the blade assembly 11 along the direction of the rotation axis 100' to the surface of the drive member 161; the clamping assembly 162 is mounted to the drive shaft 14 and forms a fixed and detachable connection with the drive shaft 14 in the direction along the rotation axis 100'. In an example, the drive shaft 14 and the flange form a flat fit, and the clamping assembly 162 includes a bolt 162a and a first washer 162b. The flange, the blade assembly 11, the first washer 162b, and the bolt 162a form a close fit from top to bottom along the rotation axis 100', wherein the flange, the blade assembly 11, and the first washer 162b embrace around the drive shaft 14, while the bolt 162a is inserted into the drive shaft 14 and forms a screw connection with the drive shaft 14.

As shown in FIG. 5, when the mounting assembly 16 is in the first mounting state, the bottom surface of the drive member 161 is in close contact with the upper surface of the blade assembly 11. The first washer 162b and the drive shaft 14 also form a flat fit.

Figure 7:
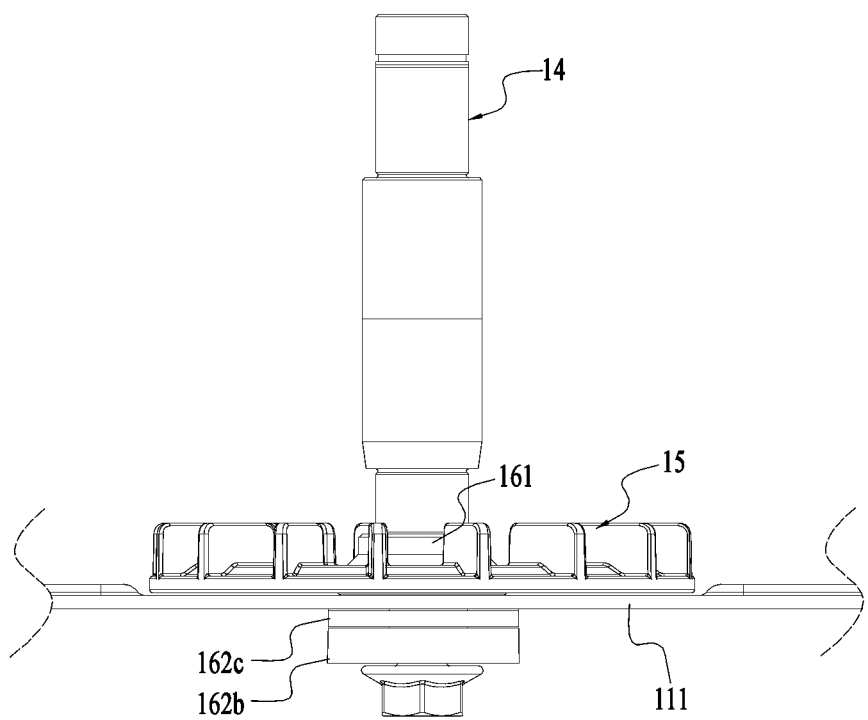
FIG. 7 is a schematic view of a partial structure of the lawn mower provided in Example 1, wherein the mounting assembly is in a second mounting state.
Figure 8:
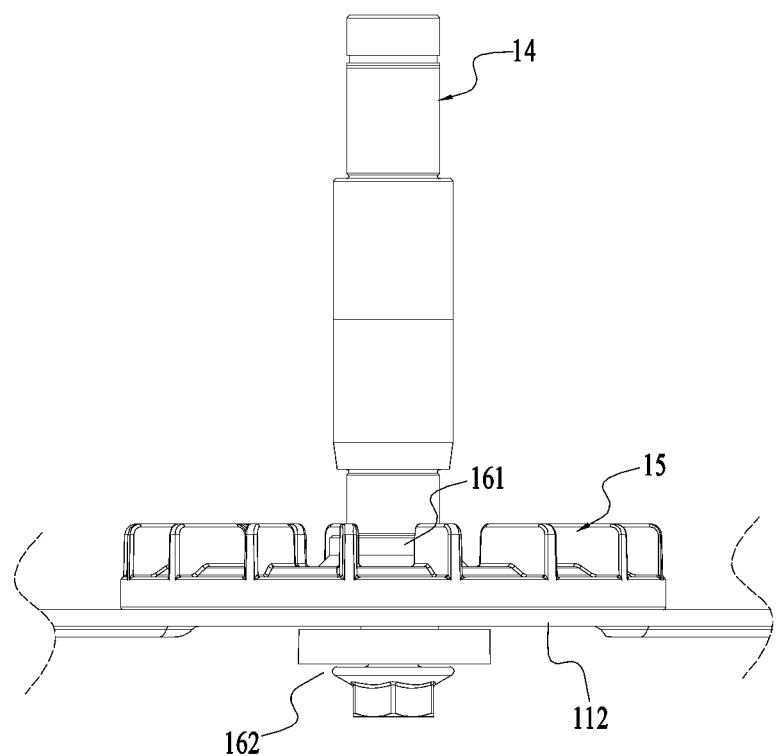
FIG. 8 is a schematic diagram of a partial structure of the lawn mower provided in Example 1, wherein the mounting assembly is in the second mounting state.

As shown in FIGS. 7-8, the mounting assembly 16 is in the second mounting state. In FIG. 7, only the first blade 111 is mounted to the drive shaft 14 through the mounting assembly 16. In this example, a second washer 162c is added to fix the position of the first blade 111 relative to the drive shaft 14 along the direction of the rotation axis 100'. As shown in FIG. 8, the mounting assembly 16 also includes a fan 15; the fan 15 is fixedly connected to the drive member 161 and embraces around the outside of the drive member 16, forming a coaxial connection with the drive member 161. The fan 15 is driven by the drive member 161, and the drive member 161 is formed with a drive portion 161a (as shown in FIG. 5) for driving the fan 15, the drive portion 161a protrudes from the drive member 161 in the radial direction, and the fan 15 has a groove to tightly engage with the drive portion 161a. In the direction of the rotation axis 100', the lower surface of the fan 15 is located below the lower surface of the drive member 161. When only the first blade 111 or the second blade 112 is mounted to the drive shaft 14, the fan 15 makes surface contact with the blade assembly 11, the lower surface of the fan 15 pushes against the upper surface of the blade assembly 11, and the fan 15 and the blade assembly 11 form a friction drive. In an example, the connection between the mounting assembly 16 and the blade assembly 11 can adopt both connection methods in the above two examples at the same time, that is, the mounting assembly 16 presses the first blade 111 or the second blade 112 through the clamping assembly 162, and the clamping assembly 162 includes the fan 15 and the second washer 162c.

In an example, the structure of the mounting assembly 16 and the connection method between the mounting assembly 16 and blade assembly 11 are not limited to the above examples, e.g., when the mounting assembly 16 is in the second mounting state, replace the first washer 162b with a second washer 162c that is thicker than the first washer 162b. Simple adjustments or replacements made on the basis of the mounting assembly 16 of the present application for switching the mounting state should be considered within the scope of protection of the present application. The mounting assembly 16 may include a plurality of part or components; the mounting assembly 16 may include different sets of parts or components when the mounting assembly 16 is in the first mounting state and the second mounting state, respectively.

The drive member 161 and the blade assembly 11 make surface contact in a plane perpendicular to the rotation axis 100'; the contact area of the drive member 161 and the blade assembly 11 is greater than or equal to 100 mm$^2$ and less than or equal to 1000 mm$^2$. In an example, the contact area of the drive member 161 and the blade assembly 11 is greater than or equal to 300 mm$^2$ and less than or equal to 500 mm$^2$. In this example, the contact area between the flange and the blade assembly 11 is approximately 432 mm$^2$, and the contact area between the lower surface of the flange and the upper surface of the blade assembly 11 is approximately 432 mm$^2$. Correspondingly, when the mounting assembly 16 is in the second mounting state and the fan 15 and the blade assembly 11 form a friction drive, the fan 15 and the blade assembly 11 make surface contact in a plane perpendicular to the rotation axis 100'; the contact area between the fan 15 and the blade assembly 11 is greater than or equal to 100 mm$^2$ and less than or equal to 1000 mm$^2$.

As shown in FIGS. 4-6 and FIG. 9, the blade assembly 11 is formed with at least one mounting hole 113 that engages with the drive shaft 14. In this example, when the blade assembly 11 forms an integral unit that moves together, the blade assembly 11 only has a mounting hole 113 that engages with the drive shaft 14 to facilitate user installation. The mounting hole 113 is located approximately at the center of the blade assembly 11, and the blade assembly 11 is center symmetrical about the center of the mounting hole 113, making the blade assembly 11 more stable when rotating about the rotation axis 100', and avoiding the generation of eccentric torques. In an example, the first blade 111 and the second blade 112 are respectively formed with a first mounting hole 113a and a second mounting hole 113b. When the blade assembly 11 is mounted to the drive shaft 14, the first mounting hole 113a and the second mounting holes 113b overlap in the up-down direction along the rotation axis 100'. In an example, the blade assembly 11 may be formed with a plurality of mounting holes 113, and the mounting assembly 16 includes a plurality of connecting shafts that engage with the mounting holes 113 accordingly, and the connecting shafts are connected to the drive shaft 14.

As shown in FIG. 5, the mounting assembly 16 is in contact with the blade assembly 11 to form at least one mounting surface 16a that is substantially perpendicular to the rotation axis 100'; the blade assembly 11 is formed with at least one cutting surface 11a that is perpendicular to the rotation axis 100'; at least one mounting surface 16a is located above the cutting surface 11a in the direction of the rotation axis 100'. In this example, the flange of the mounting assembly 16 or the fan 15 and the first washer 162b make surface contact with the blade assembly 11 and form two mounting surfaces 16a perpendicular to the rotation axis 100'. When the blade assembly 11 includes the first blade 111 or the second blade 112, the first blade 111 or the second blade 112 rotates about the rotation axis 100' to form a cutting surface 11a, the plane where the cutting surface 11a is located is the plane where the edge 111b of the first cutting portion 111a or the edge 112b of the second cutting portion 112a is located. When the blade assembly 11 includes the first blade 111 and the second blade 112, the first blade 111 and the second blade 112 rotate about the rotation axis 100' to form two parallel upper and lower cutting surfaces 11a, and the plane where the two upper and lower cutting surfaces 11a are located are the planes where the edge 111b of the first cutting portion 111a and the edge 112b of the second cutting portion 112a are respectively located. In this example, one mounting surface 16a is located above the two cutting surfaces 11a along the direction of the rotation axis 100' to avoid installing the mounting assembly 16 below the cutting surface 11a. In this example, the drive member 161 that drives the blade assembly 11 to rotate is located above the cutting surface 11a.

Figure 9:
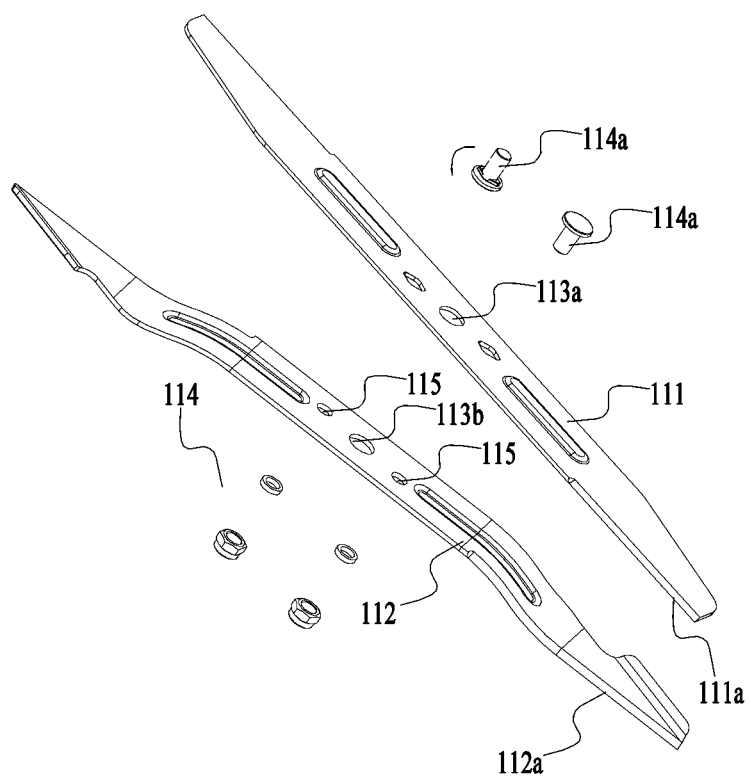
FIG. 9 is an exploded view of a blade assembly of the lawn mower of FIG. 1.

As shown in FIG. 9, the blade assembly 11 further includes a connecting assembly 114. The connecting assembly 114 connects the second blade 112 to the first blade 111 so that the blade assembly 11 forms a unit that can move together when not mounted to the drive shaft 14. After the connecting assembly 114 connects the second blade 112 to the first blade 111, the second cutting portion 112a and the first cutting portion 111a are located at different axial positions along the rotation axis 100'. That is to say, when the first blade 111 and the second blade 112 are not integrally formed, the first blade 111 and the second blade 112 are connected as a whole through the connecting assembly 114, and when not mounted to the drive shaft 14, the first blade 111 and the second blade 112 may be fixedly connected or movably connected, that is, the first blade 111 may move relative to the second blade 112. When the blade assembly 11 is mounted to the drive shaft 14 and performs cutting as a whole, the first blade 111 is fixed relative to the second blade 112. At the same time, the connecting assembly 114 determines the relative position of the first cutting portion 111a and the second cutting portion 112a in the direction of the rotation axis 100'. In an example, the first cutting portion 111a is located above the second cutting portion 112a. In this example, the first blade 111 is located above the second blade 112. The connecting assembly 114 enables the user to disassemble and assemble the blade assembly 11 for ease of operation, while at the same time, fixes the relative axial positions of the first cutting portion 111a and the second cutting portion 112a to prevent the user from repositioning the two cutting portions axially during assembly and installing the first blade 111 and the second blade 112 reversely or incorrectly, which plays a foolproof role.

When the connecting assembly 114 connects the second blade 112 to the first blade 111, the second blade 112 is fixed within a predetermined angle range relative to the first blade 111. In an example, the predetermined angle range is greater than or equal to 0 degrees and less than or equal to 20 degrees. In this example, the predetermined angle range is greater than or equal to 5 degrees and less than or equal to 10 degrees. That is to say, the connecting assembly 114 connects the first blade 111 and the second blade 112 so that the first blade 111 and the second blade 112 form a fixed connection or a movable connection in the rotation axial direction, and when the first blade 111 and the second blade 112 form a movable connection in the axial direction, the first blade 111 can rotate relative to the second blade 112 with a rotation angle greater than or equal to 0 degrees and less than or equal to 10 degrees. The first blade 111 and the second blade 112 form a detachable connection through the connecting assembly 114 for ease of maintenance or replacement of the blade assembly 11 later.

In this example, the connecting assembly 114 is a common fastener, such as a bolt and a nut or a screw and a nut. The blade assembly 11 is formed with at least one positioning portion 115 connected to the connecting assembly 114; the positioning portion 115 can define the range of the phase angle of the first blade 111 relative to the second blade 112, and the connecting assembly 114 is mounted to the positioning portion 115. In this example, the positioning portion 115 is a positioning hole, and positioning holes are formed on both the first blade 111 and the second blade 112. The number of positioning portions 115 is not limited. In this example, the number of positioning portions 115 is greater than or equal to two. In an example, the first blade 111 is formed with two diamond holes symmetrical about the rotation axis 100', and the second blade 112 is formed with two round holes symmetrical about the rotation axis 100', the diamond holes engage with the diamond-shaped protrusions on the head of the bolts, the round holes engage with the studs of the bolts, and the bolts are locked with the nuts, so that the first blade 111 and the second blade 112 are fixedly connected with a fixed phase angle in the circumferential direction and a fixed relative position in the axial direction. In an example, the positioning hole may also be square or waist or other shaped; the engagement manner between the positioning hole on the first blade 111 and the positioning hole on the second blade 112 and the connecting assembly 114 is not limited herein.

The connecting assembly 114 includes an engaging portion 114a that engages with the positioning portion 115. In this example, the positioning portion 115 is a positioning hole, the engaging portion 114a is a bolt, and is a screw of the bolt, which engage with the positioning hole to form a shaft hole fit. The connecting assembly 114 further includes an axial fixing portion that fixes the position of the first blade 111 relative to the second blade 112 in a direction parallel to the rotation axis 100', and the axial fixing portion is a bolt and nut. In an example, the axial fixing portion may be a magnetic element mounted to the first blade 111 and the second blade 112, and the axial position of the first blade 111 relative to the second blade 112 is fixed by magnetic attraction. The specific structures of the engaging portion 114a and the axial fixing portion are not limited to the above.

In an example, the engaging portion of the connecting assembly is provided on a mounting member such as a fan or a flange, and forms a fixed connection or is integrally formed with the mounting member such as a fan and a flange. For example, a drive portion is formed at the lower end of the fan, and the drive portion is configured to mount and position the blade assembly. In one example, the connecting assembly further includes a clamping member that axially clamps the blade assembly, and the clamping member is connected to the blade assembly and makes surface contact with the blade assembly. In this case, the blade assembly can form either a friction transmission or a mechanical position transmission such as a flat position transmission with the drive shaft.

Figure 10:
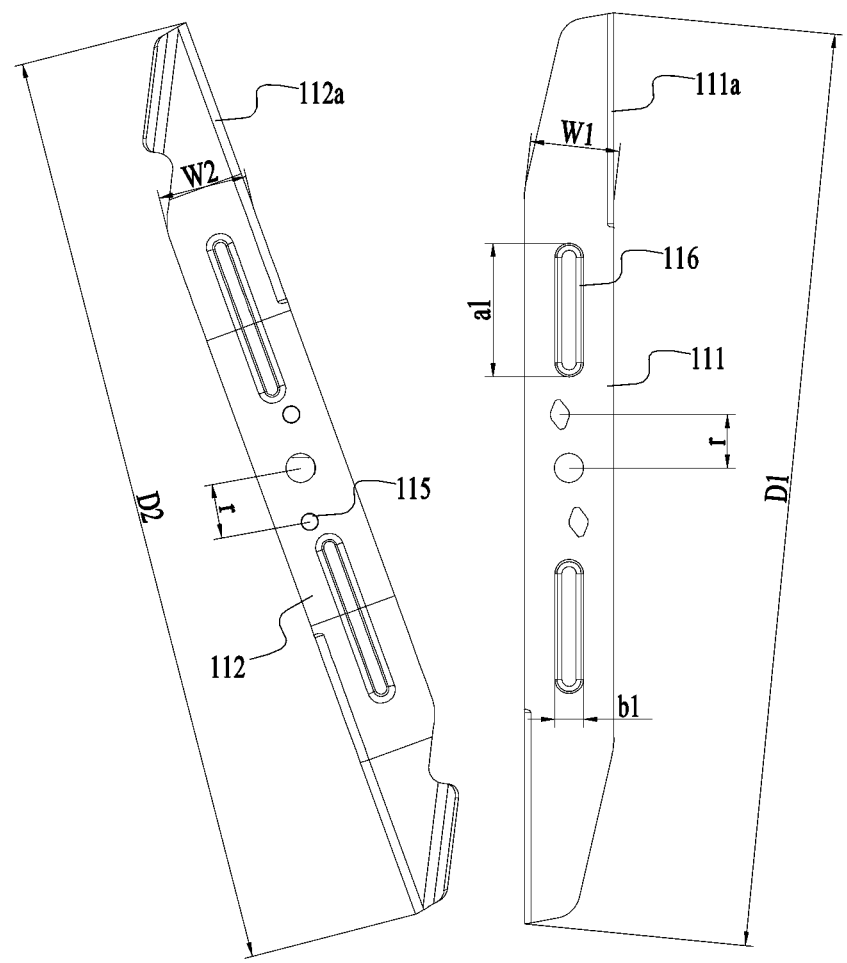
FIG. 10 is a schematic diagram of a first blade and a second blade of the lawn mower of FIG. 1.

As shown in FIGS. 4, 5, and 10, the positioning portion 115 generally has a geometric center. The distance from the geometric center to the rotation axis 100' is the positioning radius r, and the positioning radius r is greater than or equal to 0 mm and less than or equal to 50 mm. In one example, the positioning radius r of the positioning portion 115 is greater than or equal to the radius of the drive shaft 14 and less than or equal to 50 mm; in this example, the positioning radius r of the positioning portion 115 is about 30 mm. When the positioning radius r of the positioning portion 115 is 0 mm, that is, the geometric center of the positioning portion 115 coincides with the rotation axis 100'. In one example, a radial groove is formed on the drive shaft 14, and the groove can accommodate the positioning portion 115. The positioning portion 115 is provided outside the drive shaft 14, that is, the positioning radius r of the positioning portion 115 is greater than or equal to the radius of the drive shaft 14. For a regularly shaped positioning portion 115, the geometric center is uniquely determined; for an irregularly shaped positioning portion 115, a point at the center of the positioning portion 115 may be roughly determined to be the geometric center. In one example, the ratio of the rotation diameter D of the blade assembly 11 to the positioning radius r of the positioning portion 115 is greater than or equal to 5 and less than or equal to 25. When the position of the positioning unit 115 is in the above range, the positioning effect of the positioning unit 115 is better. The rotation diameter D is greater than or equal to 200 mm and less than or equal to 700 mm.

In an example, the positioning hole may be other positioning holes with incomplete positioning effects, such as oval holes. These positioning holes can restrict to a predetermined degree but cannot completely restrict the rotation of the first blade 111 relative to the second blade 112, such that the blade assembly 11 has a predetermined adjustment space when encountering obstacles, thereby enhancing the service life of the blade assembly 11.

The maximum length of the line connecting any two points of the projection of the first blade 111 in a plane perpendicular to the rotation axis 100' in the direction perpendicular to the rotation diameter D1 of the first blade 111 is the width W1 of the first blade 111. The ratio of the rotation diameter D1 of the first blade 111 to the width W1 of the first blade 111 is equal to or greater than 5 and less than or equal to 13. The maximum length of the line connecting any two points of the projection of the second blade 112 in a plane perpendicular to the rotation axis 100' in the direction perpendicular to the rotation diameter D2 of the second blade 112 is the width W2 of the second blade 112. The ratio of the rotation diameter D2 of the second blade 112 to the width W2 of the second blade 112 is equal to or greater than 5 and less than or equal to 13. In this example, the rotation diameter D1 of the first blade 111 is approximately 511 mm, the width W1 of the first blade 111 is approximately 51 mm, and the rotation diameter D2 of the second blade 112 is approximately equal to the rotation diameter D1 of the first blade 111. The width W2 of the second blade 112 is approximately equal to the width W1 of the first blade 111.

As shown in FIGS. 9 and 10, at least one reinforcement rib 116 is respectively formed on the surfaces of the first blade 111 and the second blade 112. In this example, the first blade 111 and the second blade 112 are respectively formed with two reinforcement ribs 116. The two reinforcement ribs 116 on the surface of the first blade 111 protrude upward and extend along the length of the first cutting portion 111a, and are symmetrical about the rotation axis 100'; the two reinforcement ribs 116 on the surface of the second blade 112 protrude downward and extend along the length of the second cutting portion 112a, and are symmetrical about the rotation axis 100'. The shape of the reinforcement rib 116 is a long stripe. The ratio of the rotation diameter D1 of the first blade 111 to the length al of a single reinforcement rib 116 is greater than or equal to 2.5 and less than or equal to 10; the ratio of the rotation diameter D1 of the first blade 111 to the total length of the plurality of the reinforcement ribs 116 is greater than or equal to 1.3 and less than or equal to 5; the ratio of the width W1 of the first blade 111 to the width b1 of a single reinforcement rib 116 is greater than or equal to 2 and less than or equal to 5. Similarly, the ratio of the rotation diameter D2 of the second blade 112 to the length al of a single reinforcement rib 116 is greater than or equal to 2.5 and less than or equal to 10; the ratio of the rotation diameter D2 of the second blade 112 to the total length of the plurality of the reinforcement ribs 116 is greater than or equal to 1.3 and less than or equal to 5; the ratio of the width W2 of the second blade 112 to the width b 1 of a single reinforcement rib 116 is greater than or equal to 2 and less than or equal to 5. In one example, the length al of the reinforcement rib 116 refers to the maximum dimension of the projection of the reinforcement rib 116 in a plane perpendicular to the rotation axis 100' in the extending direction of the reinforcement rib 116; the width b 1 of the reinforcement rib 116 refers to the maximum dimension of the projection of the reinforcement rib 116 in a plane perpendicular to the rotation axis 100' in the direction perpendicular to the extending direction of the reinforcement rib 116. In the extending direction of the first blade 111 or the second blade 112 and in the direction perpendicular to the extending direction of the first blade 111 or the second blade 112, the reinforcement ribs 116 are distributed in the middle of the first blade 111 and the second blade 112 to improve the strength of the first blade 111 or the second blade 112. In other examples, the number, position, and specific shape of the reinforcement rib 116 are not limited thereto.

In this example, the first blade 111 substantially extends along the direction of the first straight line; the second blade 112 substantially extends along the direction of the first curve. Since the first blade 111 is disposed above the second blade 112 in the direction of the rotation axis 100', and at the same time the first curve is at least partially curved downward, a sufficient accommodation space is formed between the first blade 111 and the second blade 112. In an example, the first blade 111 extends substantially in the direction of the second curve; the second blade 112 extends substantially in the direction of the third curve, that is, the first blade 111 and the second blade 112 extend along the curve respectively. The second curve and the third curve are two different curves differing in at least part of their curvatures, so that a sufficient accommodation space is formed between the first blade 111 and the second blade 112.

The length of the projection of the first cutting portion 111a in a plane perpendicular to the rotation axis 100' is greater than or equal to 10 mm and less than or equal to 600 mm; the length of the projection of the second cutting portion 112a in a plane perpendicular to the rotation axis 100' is greater than or equal to 10 mm and less than or equal to 600 mm. In an example, the length of the projection of the first cutting portion 111a in a plane perpendicular to the rotation axis 100' refers to the length of the projection of the edge 111b of the first cutting portion 111a in a plane perpendicular to the rotation axis 100'. When the first blade 111 includes a plurality of the first cutting portions 111a, the length of the projection of the first cutting portion 111a in a plane perpendicular to the rotation axis 100' is the sum of the length of the projection of the edges 111b of the plurality of the first cutting portions 111a in a plane perpendicular to the axis 100'. Similarly, the length of the projection of the second cutting portion 112a in a plane perpendicular to the rotation axis 100' refers to the length of the projection of the edge 112b of the second cutting portion 112a in a plane perpendicular to the rotation axis 100'. When the second blade 112 includes a plurality of the second cutting portions 112a, the length of the projection of the second cutting portion 112a in a plane perpendicular to the rotation axis 100' is the sum of the length of the projection of the edges 112b of the plurality of the second cutting portions 1112a in a plane perpendicular to the rotation axis 100'. Both the length of the projection of the first cutting portion 111a in a plane perpendicular to the rotation axis 100' and the length of the projection of the second cutting portion 112a in a plane perpendicular to the rotation axis 100' are greater than or equal to 10 mm and less than or equal to 600 mm. In an example, the length of the projection of the first cutting portion 111a in a plane perpendicular to the rotation axis 100' and the length of the projection of the second cutting portion 112a in a plane perpendicular to the rotation axis 100' are greater than or equal to 20 mm and less than or equal to 400 mm. In this example, the length of the projection of the first cutting portion 111a in a plane perpendicular to the rotation axis 100' is about 236 mm. In one example, the length of the projection of the first cutting portion 111a in a plane perpendicular to the rotation axis 100' and the length of the projection of the second cutting portion 112a in a plane perpendicular to the rotation axis 100' are substantially equal.

The mass of the blade assembly 11 is greater than or equal to 0.35 kg and less than or equal to 1.8 kg. When the mass of the blade assembly 11 is within this value range, the lawn mower 100 has a relatively small load and relatively high work efficiency. When the first blade 111 and the second blade 112 is separately formed and the mass of the first blade 111 is less than or equal to the mass of the second blade 112, the ratio of the mass of the first blade 111 to the mass of the second blade 112 is greater than or equal to 0.5 and less than or equal to 1. In an example, when the first blade 111 and the second blade 112 are separately formed and the mass of the second blade 112 is less than or equal to the mass of the first blade 111, the ratio of the mass of the second blade 112 to the mass of the first blade 111 is greater than or equal to 0.5 and less than or equal to 1.

The battery pack includes a battery pack housing and battery cells. The battery cells are disposed in the battery pack housing. The number of battery cells included in the battery pack is N and the unit is piece. The mass of the blade assembly 11 is M and the unit is kilogram. The maximum length of a line connecting any two points of the projection of the blade assembly 11 in a plane perpendicular to the rotation axis 100' and the projection of the rotation axis 100' in the plane is the rotation diameter D of the blade assembly 11; and the unit is millimetre. The product of the rotation diameter D (mm) of the blade assembly 11, the number of battery cells N and mass M (g) of the blade assembly 11 is greater than or equal to $3.5 \times 10^5$ and less than or equal to $7.3 \times 10^7$. In one example, the product of the rotation diameter D (mm) of the blade assembly 11, the number of battery cells N and mass M (g) of the blade assembly 11 is greater than or equal to $7 \times 10^5$ (mm·g) and less than or equal to $3.6 \times 10^7$ (mm·g). In one example, the product of the rotation diameter D (mm) of the blade assembly 11, the number of battery cells N and mass M (g) of the blade assembly 11 is greater than or equal to $1.4 \times 10^6$ (mm·g) and less than or equal to $1.8 \times 10^7$ (mm·g). When the product of the rotation diameter D (mm) of the blade assembly 11, the number of battery cells N and mass M (g) of the blade assembly 11 is in the above numerical range, the lawn mower 100 has a relatively small load and relatively high work efficiency. In this example, the mass M of the blade assembly 11 refers to the total mass of the blade assembly 11 including the first blade 111 and the second blade 112. When the lawn mower 100 includes multiple battery packs, the number N of battery cells here refers to the total number of battery cells included in all battery packs. In this example, the rotation diameter D of the blade assembly 11 is about 508 mm, and the number N of battery cells contained in the battery pack is equal to 10. In one example, the number N of battery cells refers to the number of battery cells included in the battery pack that powers the motor 13 that drives the blade assembly 11. If the lawn mower 100 is a self-propelled lawn mower, generally it also includes a self-propelled motor that drives the wheels to rotate. In this case, the motor 13 should not include the self-propelled motor. That is to say, the battery packs here do not include the battery pack that powers the self-propelled motor.

In one example, the larger value of the rotation diameter D1 of the first blade 111 and the rotation diameter D2 of the second blade 112 is defined as the lateral dimension of the blade assembly 11. The battery pack contains the number N of battery cells, and the mass of the blade assembly 11 is M (g). The product of the lateral dimension (mm) of the blade assembly 11, the number N of battery cells, and the mass M (g) of the blade assembly 11 is greater than or equal to $3.5 \times 10^5$ (mm·g) and less than or equal to $7.3 \times 10^7$ (mm·g). In one example, the product of the lateral dimension (mm) of the blade assembly 11, the number N of battery cells, and the mass M (g) of the blade assembly 11 is greater than or equal to $7 \times 10^5$ (mm·g) and less than or equal to $3.6 \times 10^7$ (mm·g). In one example, the product of the lateral dimension (mm) of the blade assembly 11, the number N of battery cells, and the mass M (g) of the blade assembly 11 is greater than or equal to $3.6 \times 10^7$ (mm·g) and less than or equal to $1.8 \times 10^7$ (mm·g).

The output torque of the motor 13 is greater than or equal to 0 and less than or equal to 10 Nm; in one example, the output torque of the motor 13 is greater than or equal to 3 Nm and less than or equal to 8 Nm; in this example, the output torque of the motor 13 is about 4 Nm. When the output torque of the motor 13 is in the above numerical range, the lawn mower 100 has higher cutting efficiency or cutting capacity.

In this example, the rotational inertia of the blade assembly 11 is greater than or equal to 8000 kg·mm² and less than or equal to 23000 kg·mm²; in one example, the rotational inertia of the blade assembly 11 is greater than or equal to 15000 kg·mm² and less than or equal to 20000 kg·mm².

In addition, under certain working conditions, the lawn mower 100 not only needs to cut the vegetation, but also needs to chop up the vegetation clippings into finer pieces, or to collect the vegetation clippings into a collecting device.

By adopting the structural design of the blade assembly 11 described above, the lawn mower 100 also has a better ability to chop up grass or discharge grass. The lawn mower 100 is also provided with a collecting device for collecting the vegetation clippings. The collecting device is connected to the deck 12. In an example, the deck 12 is formed with a discharge chute; the collecting device is connected to the discharge chute to let the vegetation clippings enter the collecting device from the deck 12. When the blade assembly 11 rotates at a tip linear velocity greater than or equal to 40 m/s and less than or equal to 100 m/s, the average air velocity at the discharge chute is greater than or equal to 3 m/s and less than or equal to 25 m/s. In an example, when the blade assembly 11 rotates at a tip linear velocity greater than or equal to 40 m/s and less than or equal to 100 m/s, the average air velocity at the discharge chute is greater than or equal to 5 m/s and less than or equal to 15 m/s. When the average air velocity at the discharge chute is in the above numerical range, the grass chopping ability and the grass discharging ability of the lawn mower 100 can be improved.

In this example, the linear velocity of the tip of the blade assembly 11 refers to the linear velocity of the point on the blade assembly 11 with the largest distance to the axis of rotation 100' when the blade assembly 11 rotates around the axis of rotation 100'.

Example 2

Figure 11:
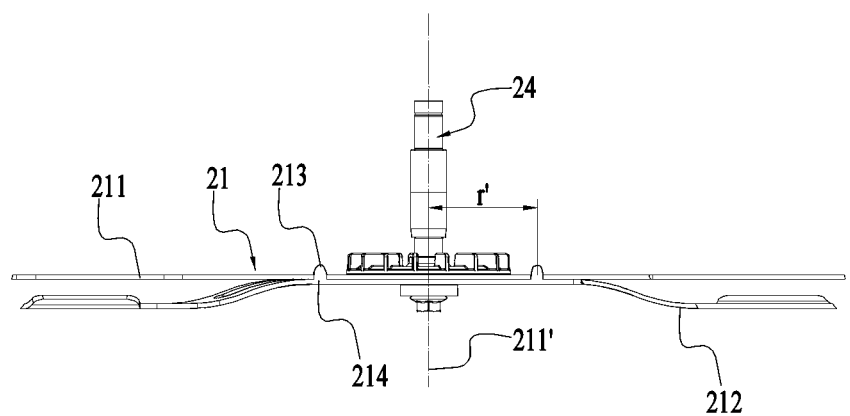
FIG. 11 is a schematic diagram of a partial structure of a lawn mower provided in Example 2.

FIG. 11 is a schematic diagram of the blade assembly 21 of the lawn mower provided in Example 2 of the present application mounted to the drive shaft 24. The difference between this example and the first example is that the blade assembly 21 in this example does not include a connecting assembly, and the blade assembly 21 has a positioning portion 213 and a engaging portion 214 to define the phase angle range between the first blade 211 and the second blade 212, whereas the remaining structure of the lawn mower of this example is the same as that of Example 1. One of the first blade 211 and the second blade 212 is formed with a positioning portion 213, and the other one is formed with a engaging portion 214 to engage with the positioning portion 213; when the positioning portion 213 and the engaging portion 214 engage with each other, the second blade 212 is fixed or can rotate within a predetermined angle range relative to the first blade 211 in the circumferential direction around the rotation axis 211'. That is to say, without the connecting assembly, the position of the second blade 212 relative to the first blade 211 in the circumferential direction around the rotation axis 211' can be defined by the positioning portion 213 and the engaging portion 214 only. In this example, the first blade 211 and the second blade 212 are respectively provided with an engaging portion 214 and a positioning portion 213. The positioning portion 213 is a projection provided on the second blade 212 and protruding above the upper surface of the second blade 212; the engaging portion 214 is a through hole provided on the first blade 211. When the first blade 211 and the second blade 212 are mounted to the drive shaft 24, the projection passes through the through hole and engages with the through hole, thereby achieving the positioning of the first blade 211 relative to the second blade 212 in the circumferential direction around the rotation axis 211'. The positioning portion 213 may be a regular three-dimensional structure such as a cylindrical shape or other irregular shapes. The engaging portion 214 may be a through hole with a circular cross section or other through holes that can engage with the positioning portion 213.

In an example, the specific structures of the positioning portion 213 and the engaging portion 214 are not limited to the above projections and through holes. For example, the positioning portion 213 may be a projection protruding from the second blade 212, and the engaging portion 214 may be an accommodating portion protruding upward on the surface of the first blade 211; the accommodating portion can accommodate at least part of the positioning portion 213 or engage with the positioning portion 213, so as to realize the positioning of the first blade 211 relative to the second blade 212.

The number of the positioning portion 213 and the engaging portion 214 is not limited. In an example, the number of the positioning portion 213 and the engaging portion 214 are even and the positioning portion 213 and the engaging portion 214 are respectively arranged symmetrically about the rotation axis 211' to put uniform force on the first blade 211 and the second blade 212, so that the position of the first blade 211 relative to the second blade 212 is more stable.

Similar to Example 1, the positioning portion 213 according to the present example generally has a geometric center; the distance from this geometric center to the rotation axis 211' is the positioning radius r'; the radius r' of the positioning portion 213 is greater than or equal to 0 mm and less than or equal to 50 mm. In one example, the positioning radius r' of the positioning portion 213 is greater than or equal to the radius of the drive shaft 24 and less than or equal to 50 mm; in this example, the positioning radius r' of the positioning portion 213 is about 30 mm. When the positioning radius r' is 0 mm, that is, the geometric center of the positioning portion 213 coincide with the rotation axis 211'. In one example, a radial groove is made on the drive shaft 24 to accommodate the positioning portion 213. The positioning portion 213 is provided outside the drive shaft 24, that is, the positioning radius r' of the positioning portion 213 is greater than or equal to the radius of the drive shaft 24. For a regularly shaped positioning portion 213, the geometric center is uniquely determined; for an irregularly shaped positioning portion 213, a point at the center of the positioning portion 213 may be roughly determined to be the geometric center. The maximum length of a line connecting any two points of the projection of the blade assembly 21 in a plane perpendicular to the rotation axis 211' and the projection of the rotation axis 211' in the plane is the rotation diameter of the blade assembly 21. The rotation diameter is greater than or equal to 200 mm and less than or equal to 700 mm. In one example, the rotation diameter is greater than or equal to 250 mm and less than or equal to 560 mm. In an example, the ratio of the rotation diameter of the blade assembly 21 to the positioning radius r' of the positioning portion 213 is greater than or equal to 5 and less than or equal to 25. When the position of the positioning portion 213 is within the above range, the positioning effect of the positioning portion 213 is better. Correspondingly, the engaging portion 214 also has a geometric center, and the distance from the geometric center to the rotation axis 211' is the positioning radius of the engaging portion 214; the positioning radius of the engaging portion 214 is greater than or equal to 0 and less than or equal to 50 mm; in one example, the positioning radius of the engaging portion 214 is greater than or equal to the radius of the drive shaft 24 and less than or equal to 50 mm.

Example 3

Figure 12:
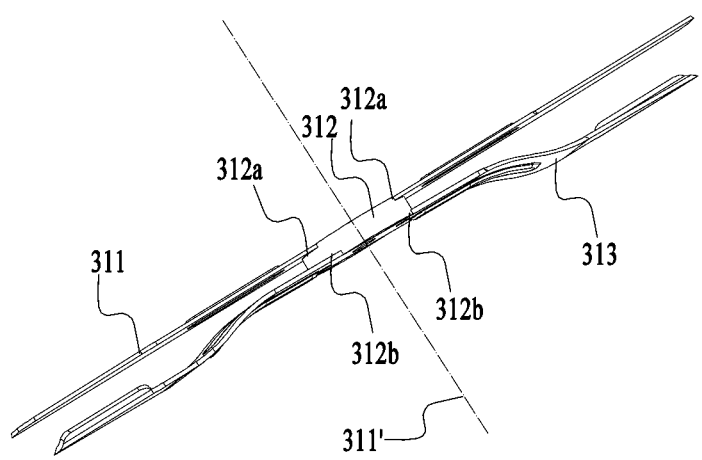
FIG. 12 is a schematic diagram of a blade assembly and a connecting assembly of a lawn mower provided in Example 3.
Figure 13:
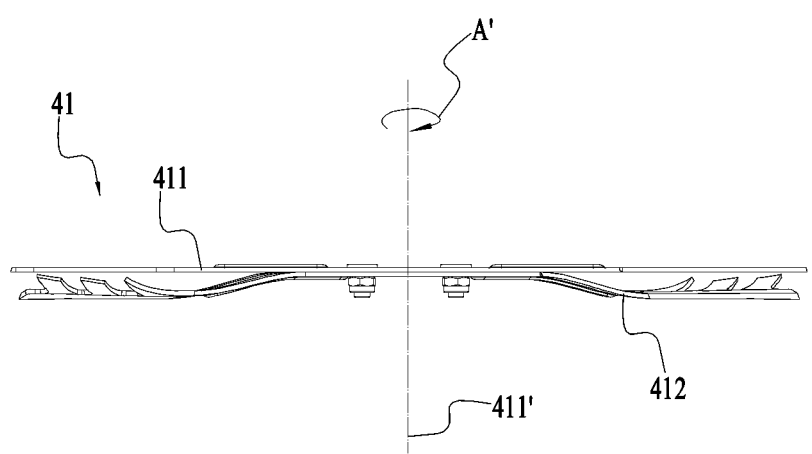
FIG. 13 is a schematic diagram of a blade assembly of a lawn mower provided in Example 4.
Figure 14:
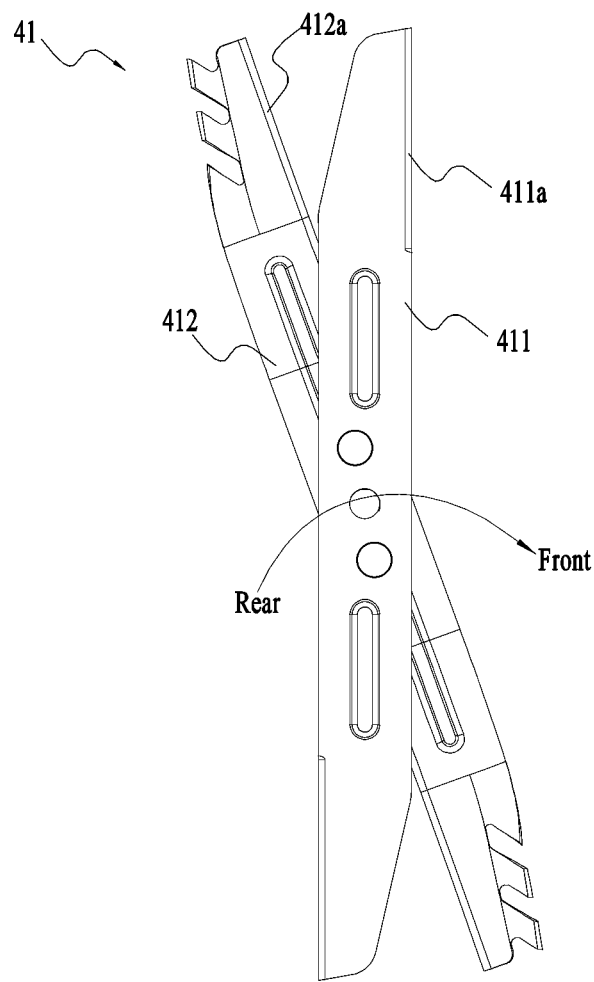
FIG. 14 is a plan view of the blade assembly in FIG. 13.
Figure 15:
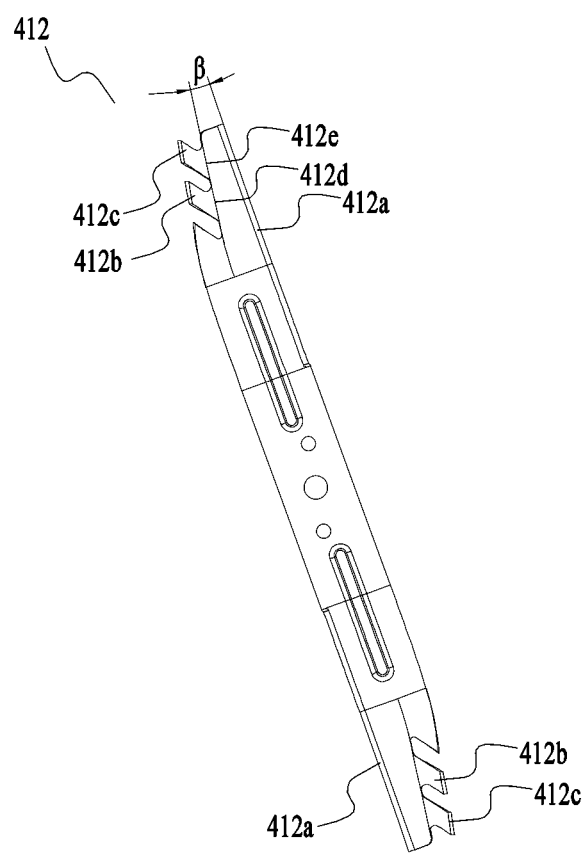
FIG. 15 is a plan view of a second blade of the blade assembly in FIG. 13.
Figure 16:
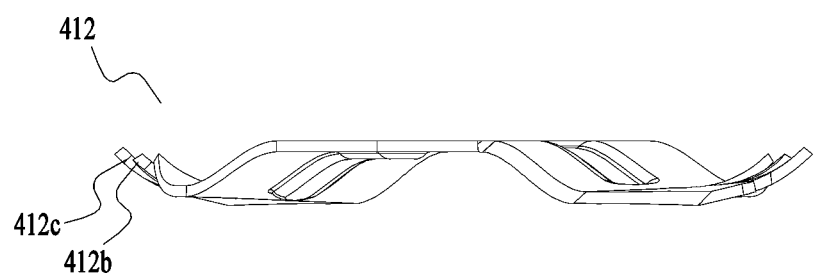

FIG. 12 is a schematic diagram of a blade assembly and a connection assembly of a lawn mower provided in Example 3 of the present application. The difference from Example 1 and Example 2 lies in the structure of the connecting assembly and the connection method between the connecting assembly and the blade assembly, whereas other similarities can be applied to this example. The lawn mower includes a connecting assembly 312; the connecting assembly 312 is formed with a first connection portion 312a that connects the first blade 311 and a second connection portion 312b that connects the second blade 313; the second blade 313, relative to the first blade 311, is fixed or can rotate within a predetermined angle range in the circumferential direction around the rotation axis 311'. That is to say, the first blade 311 and the second blade 313 are fixed or can rotate within a predetermined angle range in the circumferential direction around the rotation axis 311' through the connecting assembly 312, and the first blade 311 and the second blade 313 themselves do not constitute a connection. In this example, the connecting assembly 312 is a flange, but it is not limited to a flange. The connecting assembly 312 forms a fixed connection with the first blade 311 and the second blade 313 respectively in the up-down direction to make the first blade 311 and the second blade 313 construct a fixed phase angle. The connection of the connecting assembly 312 to the first blade 311 and the second blade 313 may also be movable, so that the second blade 313 can rotate within a predetermined angle range relative to the first blade 311 in the circumferential direction around the rotation axis 311'.

Example 4

FIGS. 13-16 are schematic views of a blade assembly 41 of a lawnmower provided in Example 4 of the present application. Similarly, the blade assembly 41 rotates about the rotation axis 411'. The blade assembly 41 in this example differs from the lawn mower in Example 1 only in the structure of the second blade 412 of the blade assembly 41. Similarities to Example 1 can be applied to this example. In the direction parallel to the rotation axis 411', the second cutting portion 412a is located below the first cutting portion 411a; in the circumferential direction around the rotation axis 411', the first cutting portion 411a is provided in front of the second cutting portion 412a; second cutting portion 412a is disposed on the front edge of the second blade 412. In an example, the front side in the circumferential direction around the rotation axis 411' refers to the side that first contacts the vegetation when the blade assembly 41 rotates along the rotation axis 411' in the first direction A'. The first cutting portion 411a contacts the vegetation prior to the second cutting portion 412a; and the second cutting portion 412a is provided on the edge of the second blade 412 that first contacts the vegetation. In this example, two first cutting portions 411a are respectively disposed on the front sides of both ends of the first blade 411, and the two first cutting portions 411a are center symmetrical about the rotation axis 411'; two second cutting portions 412a are respectively disposed on the front sides of both ends of the second blade 412, and the two second cutting portions 412a are center symmetrical about the rotation axis 411', and the blade assembly 41 as a whole is also center symmetrical about the rotation axis 411'.

The rear side of the second blade 412 is also formed with a first guide portion 412b and a second guide portion 412c that guide the upward movement of the airflow, that is, the second blade 412 is formed with a first guide portion 412b and a second guide portion 412c on the side opposite to the second cutting portion 412a in the circumferential direction of the rotation axis 411'. The first guide portion 412b and the second guide portion 412c are configured to guide the air flow upward. Here, the first guide portion 412b and the second guide portion 412c refer to two at least partially separated entities. In this example, the first guide portion 412b and the second guide portion 412c are integrally formed with the second blade 412; the first guide portion 412b and the second guide portion 412c extend substantially along the direction perpendicular to the longitudinal direction of the second blade 412 and are sequentially arranged along the longitudinal direction of the second blade 412. In one example, the first guide portion 412b and the second guide portion 412c may be respectively formed separately from the second blade 412 and fixedly connected to the second blade 412.

Each second cutting portion 412a corresponds to a first guide portion 412b and a second guide portion 412c. The first guide portion 412b and the second guide portion 412c are disposed at the rear side of the same end of the second cutting portion 412a. In this example, since the second blade 412 is provided with two second cutting portions 412a, two first guide portions 412b and two second guide portions 412c are formed, the two first guide portions 412b and the two second guide portions 412c are center symmetrical about the rotation axis 411'.

The first guide portion 412b is curved upward along the first curved surface, and the second guide portion 412c is curved upward along the second curved surface different from the first curved surface. In an example, at least part of the first guide portion 412b and at least part of the second guide portion 412c have different curvatures. The first guide portion 412b and the second guide portion 412c may each have a fixed curvature, or the curvatures of the first guide portion 412b and the second guide portion 412c may change according to a predetermined rule or change irregularly, which is not limited herein. In this example, the first guide portion 412b and the second guide portion 412c each have varying curvatures. In one example, the curvature radius at any point of the first guide portion 412b and the second guide portion 412c is equal to or greater than 0 and less than or equal to 100 mm. In this example, the curvature radius at any point of the first guide portion 412b and the second guide portion 412c is equal to or greater than 0 mm and less than or equal to 60 mm.

The second blade 412 includes at least a first guide portion 412b and a second guide portion 412c. In this example, the second blade 412 is further provided with a third guide portion. In an example, the second blade 412 may further be provided with a plurality of guide portions such as a fourth guide portion, and the plurality of guide portions are sequentially arranged along the extension direction of the second blade 412.

The first guide portion 412b and the second guide portion 412c are both curved up from the end of the second blade 412, the portion where the first guide portion 412b starts to turn up is the first root portion 412d, and the portion where the second guide portion 412c starts to turn up is the second root portion 412e. The first root portion 412d and the second root portion 412e are approximately on the same straight line, and this straight line intersects the extension line of the blade edge of the second cutting portion 412a obliquely, and the intersection angle θ formed by the straight line and the extension line of the cutting edge of the cutting portion 412a is greater than or equal to 0 and less than or equal to 40 degrees. In an example, the intersection angle formed by the straight line and the extension line of the cutting edge of the second cutting portion 412a is greater than or equal to 0 and less than or equal to 15 degrees. In this example, the intersection angle formed by the straight line and the extension line of the second cutting portion 412a is about 6.9 degrees.

The outside of the first guide portion 412b and the outside of the second guide portion 412c extend substantially along the same straight line, and the straight line obliquely intersects the extension line of the second cutting portion 412a. The outside of the first guide portion 412b refers to the edge opposed to the first root 412d, and the outside of the second guide portion 412c refers to the edge opposed to the second root 412e. In this example, the extending direction of the outside of the first guide portion 412b and the outside of the second guide portion 412c is substantially parallel to the straight line where the first root portion 412d and the second root portion 412e are located.

In this example, a cutting portion opening is further formed on the outside of the first guide portion 412b and the outside of the second guide portion 412c. The cutting portion opening can further cut vegetation and improve the grass chopping ability of the lawn mower. In an example, the cutting portion opening on the first guide portion 412b and the second guide portion 412c is not necessarily a common cutting portion structure, as long as it has predefined cutting capabilities.

Example 5

Figure 17:
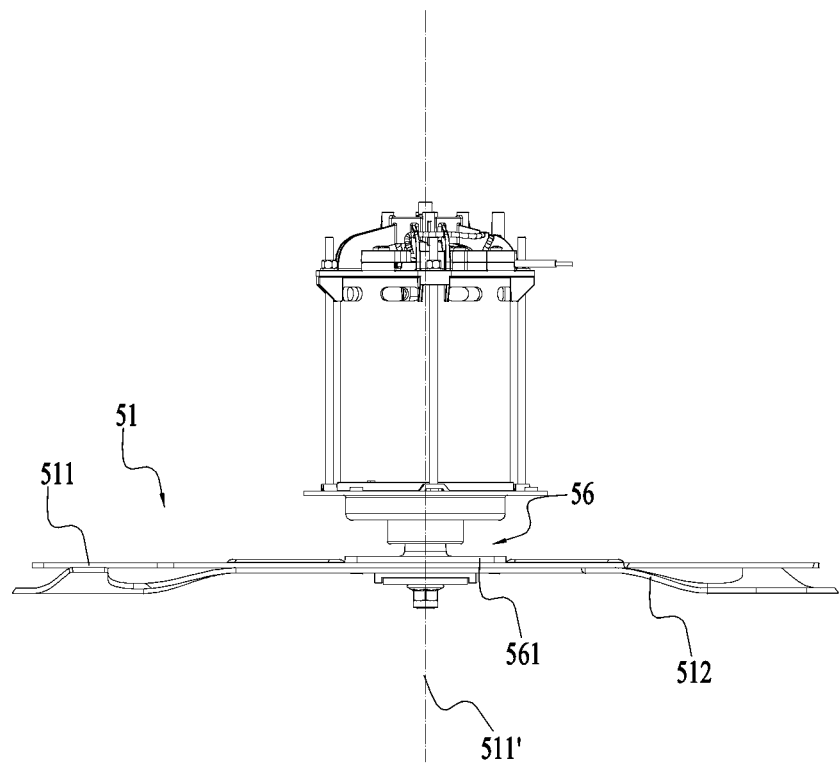
FIG. 17 is a schematic diagram of a partial structure of a lawn mower provided in Example 5.

FIG. 17 is a schematic diagram of part of the structure of the lawn mower provided in Example 5 of the present application. This example differs from Example 1 in the structure of the blade assembly 51 and the mounting assembly 56, whereas similarities to Example 1 can be applied to this example.

Figure 18:
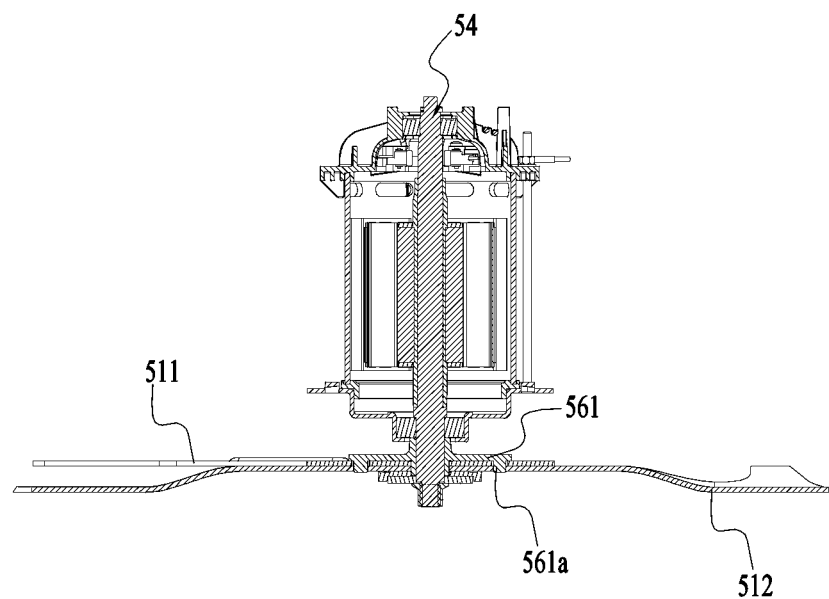
FIG. 18 is a cross-sectional view of the structure in FIG. 17.
Figure 19:
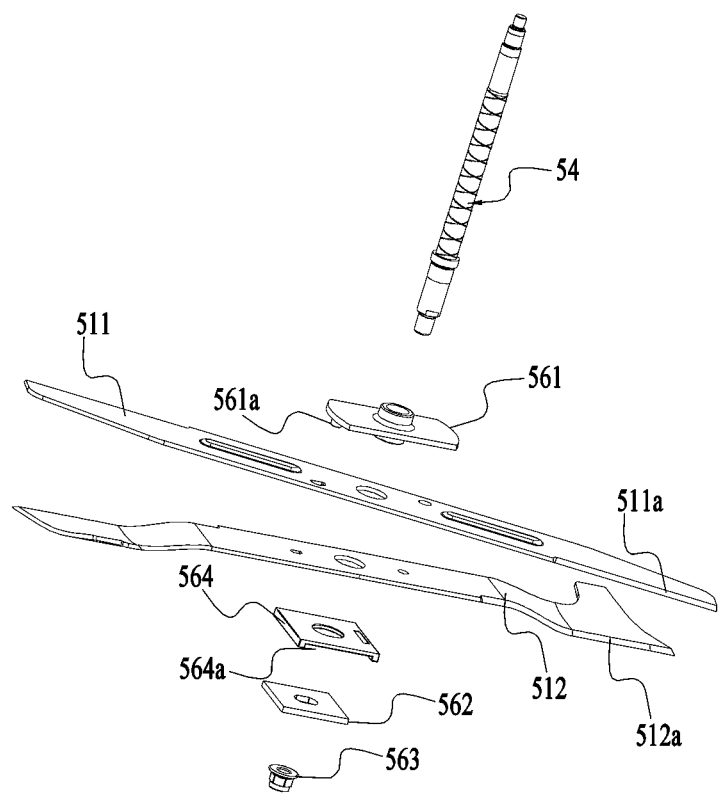
FIG. 19 is an exploded view of the partial structure of the lawn mower of FIG. 17.

As shown in FIGS. 17-19, the motor drives the blade assembly 51 to rotate about the rotation axis 511'; the blade assembly 51 includes a first cutting portion 511a and a second cutting portion 512a configured to cut vegetation; wherein in the direction parallel to the rotation axis 511', the second cutting portion 512a is located below the first cutting portion 511a; in this example, the blade assembly 51 includes a first blade 511 and a second blade 512, and the first cutting portion 511a is disposed on the first blade 511, the second cutting portion 512a is disposed on the second blade 512, and the first blade 511 is mounted above the second blade 512 in the direction of the rotation axis 511'. The mounting assembly 56 includes a drive member 561, the drive member 561 is configured to drive the blade assembly 51 to rotate about the rotation axis 511'; the blade assembly 51 is detachably connected to the drive member 561. In an example, the drive member 561 is connected to the drive shaft 54 and rotates synchronously with the drive shaft 54. The drive member 561 and the drive shaft 54 form a fixed connection along the circumferential direction of the rotation axis 511', such as a flat connection or a threaded connection.

In this example, the mounting assembly 56 further includes a drive portion 561a, the drive portion 561a is fixedly connected to the drive member 561 or integrally moulded with the drive member 561; the drive portion 561a is connected to the blade assembly 51 so that blade assembly 51 forms a fixed connection along the circumferential direction of the rotation axis 511' relative to the drive member 561 or the blade assembly 51 rotates within a predetermined angle range relative to the drive member 561 along the circumferential direction of the rotation axis 511'. In an example, the drive portion 561a is respectively connected to the first blade 511 and the second blade 512, and drive the first blade 511 and the second blade 512 are to rotate synchronously with the drive portion 561a. There is no limitation on the position where the drive portion 561a is provided and the number of drive portions 561a. In this example, the number of drive portions 561a is two, and the two drive portions 561a are respectively disposed on two sides of the rotation axis 511', and the first blade 511 and the second blade 512 are stacked together in the direction of the rotation axis 511' with at least partial contact. Both of the two drive portions 561a are connected to the first blade 511 and the second blade 512; the first blade 511 and the second blade 512 are formed with positioning holes engaging with the two drive portions 561a; one of the drive portion 561a is substantially cylindrical and forms a rotational connection with the first blade 511 and the second blade 512; the other drive portion 561a forms a flat connection with the first blade 511 and the second blade 512. In other examples, only one drive portion 561a may be provided; the drive portion 561a and the blade assembly 51 form a flat connection. Alternatively, two cylindrical drive portions 561a may be provided to connect to the blade assembly 51.

The mounting assembly 56 further includes a clamping assembly 562 and a fastening assembly 563; the clamping assembly 562 is configured to clamp the blade assembly 51 along the rotation axis 511', and the blade assembly 51 is disposed between the drive member 561 and the clamping assembly 562 in a direction parallel to the rotation axis 511'; the fastening assembly 563 is set to fix the position of the blade assembly 51 relative to the drive member 561 in the direction parallel to the rotation axis 511; the fastening assembly 563 is removably connected to the drive shaft 54. In this example, the clamping assembly 562 may be one or more metal shims and is at least partially in contact with the blade assembly 51; the fastening assembly 563 may be a nut, screw, or bolt, etc. The fastening assembly 563 is connected to the drive shaft 54 and pushes against the clamping assembly 562. In this example, the drive shaft 54 passes through the blade assembly 51 and the clamping assembly 562; the fastening assembly 563 and the drive shaft 54 form a threaded connection. In an example, when the fastening assembly 563 includes a bolt or a screw, etc., there may be a fastening assembly 563 passing through at least one of the blade assembly 51 and the clamping assembly 562. The fastening assembly 563 and the drive shaft 54 form a fixed and detachable connection.

The mounting assembly 56 further includes an insulating member 564; the insulating member 564 is configured to achieve the insulation between the blade assembly 51 and the drive shaft 54; the insulating member 564 is made of insulating materials; the insulating member 564 is provided between the clamping unit 562 and the blade assembly 51 in the direction of the rotation axis 511'; the first blade 511 and the second blade 512 are both disposed between the drive member 561 and the insulating member 564. In this example, the insulating member 564 is in surface contact with the blade assembly 51 and the clamping assembly 562. A groove 564a is formed at the bottom of the insulating member 564 in the direction of the rotation axis 511', and the clamping assembly 562 is embedded in the groove 564a. The drive shaft 54 or the fastening assembly 563 passes through the insulating member 564.

In this example, the lawn mower does not include a connecting assembly that connects the first blade 511 and the second blade 512 as a whole before installation. That is to say, the first blade 511 and the second blade 512 are two independently formed and independently mounted blades, which are respectively mounted to the drive shaft 54 and constituted by the mounting assembly 56. In this example, the blade assembly 51 is connected through the drive portion 561a so that the phase angle between the first blade 511 and the second blade 512 is substantially unchanged.

Example 6

Figure 20:
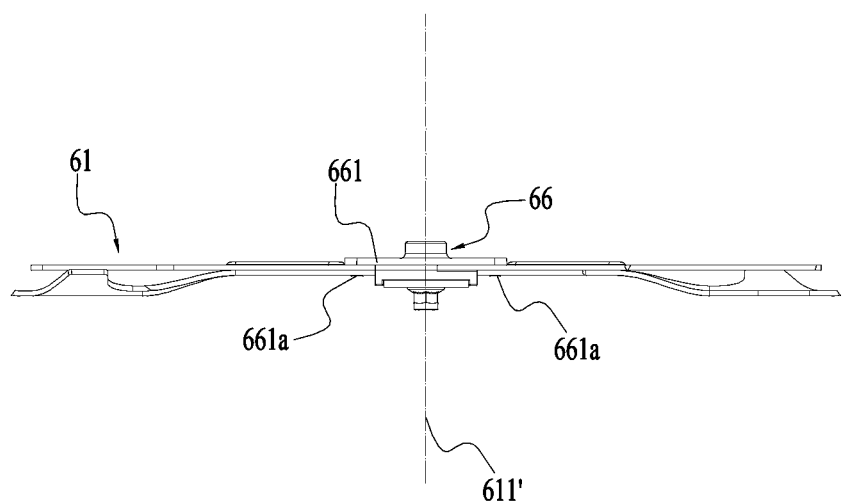
FIG. 20 is a schematic diagram of a partial structure of a lawn mower provided in Example 6.

FIG. 20 is a schematic diagram of a part of the structure of the lawn mower provided in Example 6 of the present application. The difference between this example and Example 5 is the structure of the mounting assembly 66, whereas the similarities to Example 5 can be applied to this example.

Figure 21:
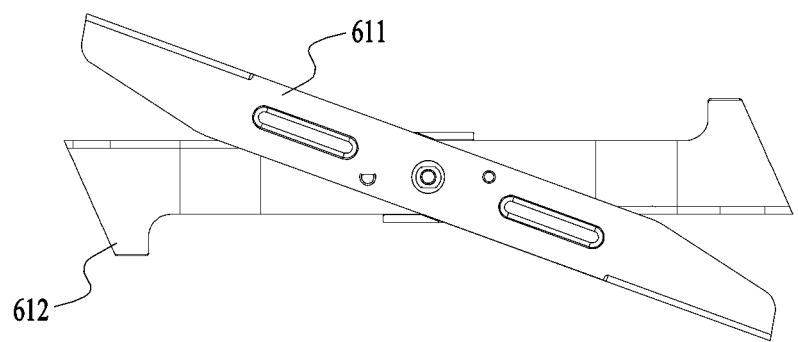
FIG. 21 is a plan view of a blade assembly and a mounting assembly of the lawn mower provided in Example 6.
Figure 22:
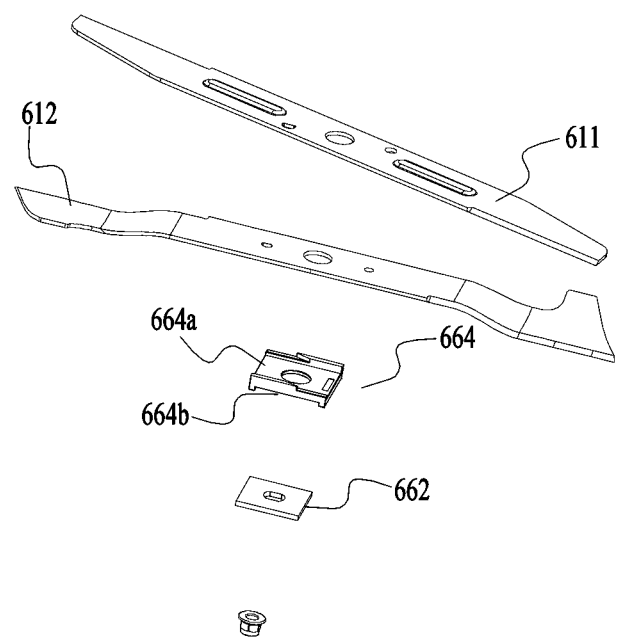
FIG. 22 is an exploded view of the partial structure of the lawn mower of FIG. 20.

As shown in FIGS. 20-22, the mounting assembly 66 in this example differs from the mounting assembly 56 in Example 5 in the structure of the insulating member 664. In this example, in the direction of the rotation axis 611', two grooves, an upper groove 664a and a lower groove 664b, are provided above and below the insulating member 664; and the first blade 611 and the second blade 612 are provided in the upper groove 664a; the clamping assembly 662 is disposed in the lower groove 664b. The shape of the upper groove 664a fits the blade assembly 61 so that the first blade 611 and the second blade 612 form a predetermined phase angle along the rotation axis 611'. As in Example 5, the drive member 661 is provided with a drive portion 661a (referring to FIG. 20). In this example, the design of the insulating member 664 not only better realizes the insulation between the blade assembly 61 and the drive shaft, but also helps the blade assembly 61 maintain a fixed phase angle to prevent slippage; at the same time, it is beneficial for the drive member 661 to drive the blade assembly 61 more efficiently.

Example 7

Figure 23:
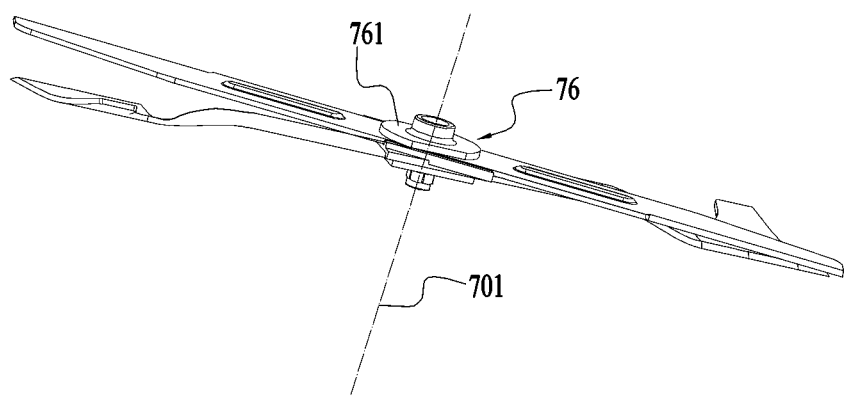
FIG. 23 is a schematic diagram of a partial structure of a lawn mower provided in Example 7.

FIG. 23 is a schematic diagram showing a part of the structure of the lawn mower provided in Example 7 of the present application. The difference between this example and Example 6 lies in the structure of the mounting assembly 76; similarities to Example 6 can be applied to this example.

Figure 24:
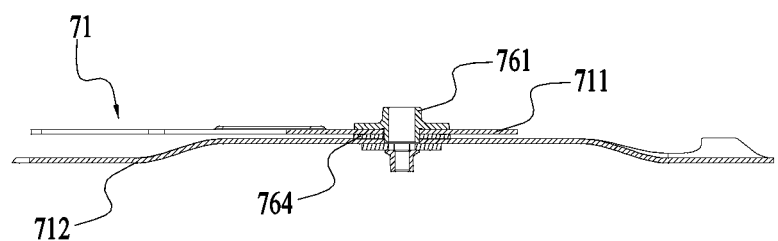
FIG. 24 is a cross-sectional view of the structure in FIG. 23.
Figure 25:
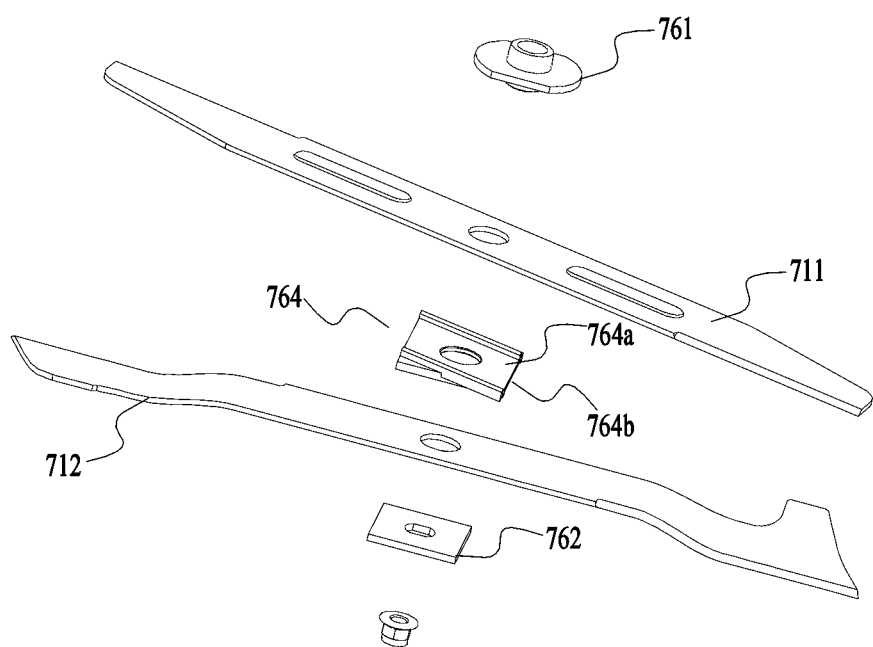
FIG. 25 is an exploded view of the structure in FIG. 23.

As shown in FIGS. 23-25, the mounting assembly 76 in this example differs from the mounting assembly 66 in Example 6 in the structure of the drive member 761 and the insulating member 764. In this example, the drive member 761 drives the blade assembly 71 by friction. The drive member 761 and the blade assembly 71 form at least partial contact through the clamping assembly and the fastening assembly. In this example, the drive member 761 and the blade assembly 71 are in surface contact and are pressed against each other, and a positive pressure in the direction of the rotation axis 701 is formed between the drive member 761 and the blade assembly 71. When the drive shaft drives the drive member 761 to rotate about the rotation axis 701, the blade assembly 71 rotates about the rotation axis 701 under the frictional force along the circumferential direction of the rotation axis 701. That is to say, there is no need to provide a drive portion for driving the blade assembly 71 on the drive member 761, and there is no need to provide a positioning hole on the blade assembly 71 to engage with the drive portion. The drive member 761 drives the first blade 711 by friction, and the first blade 711 drives the second blade 712 by driving the insulating member 764. The insulating member 764 is disposed between the first blade 711 and the second blade 712; the insulating member 764 is also formed with an upper groove 764a and a lower groove 764b; the first blade 711 is disposed in the upper groove 764a, and the second blade 712 is disposed in the lower groove 764b. That is to say, the first blade 711 is disposed between the drive member 761 and the insulating member 764; the second blade 712 is disposed between the insulating member 764 and the clamping assembly 762. In an example, the upper groove 764a and the lower groove 764b are fitted to the edges of the first blade 711 and the second blade 712 respectively to make the first blade 711 and the second blade 712 to form a phase angle of the predetermined range. The clamping assembly 762 is pressed to the second blade 712. In this example, the clamping assembly 762 is attached to the lower surface of the second blade 712.

Example 8

Figure 26:
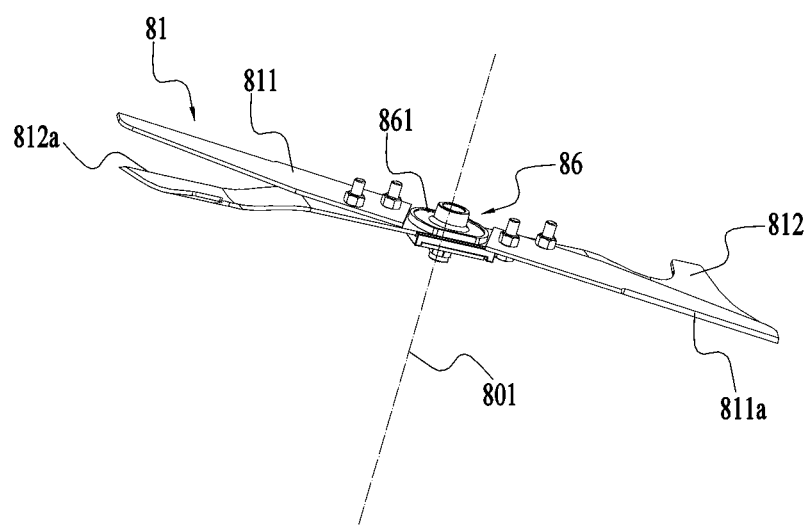
FIG. 26 is a schematic diagram of a partial structure of a lawn mower provided in Example 8.

FIG. 26 is a schematic diagram of a part of the structure of the lawn mower provided in Example 8 of the present application. This example differs from Example 5 in the structure of the blade assembly 81 and the mounting assembly 86. Similarities to Example 5 can be applied to this example. The blade assembly 81 includes at least two separately formed first blades 811 and an integrally formed second blade 812. In this example, the number of first blades 811 is two and each of the first blades 811 is provided a first cutting portion 811a; the second blade 812 is provided with a second cutting portion 812a. In the direction of the rotation axis 801, the first blades 811 are located above the second blade 812. The two first blades 811 are respectively located on both sides of the rotation axis 801 and are fixedly connected to the second blade 812. In an example, the first blade 811 is detachably connected to the second blade 812. In other examples, the first blade 811 is an integrally formed blade, and the second blade 812 is a plurality of separately formed blades, each being fixedly connected to the first blade 811. A first cutting portion 811a and a second cutting portion 812a are respectively provided on the first blade 811 and the second blade 812. In an example, the first blade 811 and the second blade 812 are integrally formed, but the first cutting portion 811a and the second cutting portion 812a are respectively provided on the first blade 811 and the second blade 812. That is to say, the blade assembly 81 is a one-piece blade, but is provided with a plurality of first cutting portions 811a and second cutting portions 812a distributed up and down along the direction of the rotation axis 801.

In this example, the drive member 861 is provided with a drive portion, and the blade assembly 81 is provided with a positioning hole that engages with the drive portion. The drive portion 861 drives the blade assembly 81 to rotate through the drive portion. In an example, the drive portion is connected to the first blade 811. The shape and number of drive portion is not limited. In one example, the drive member 861 is not provided with a drive portion; instead, the drive member 861 is pressed to the blade assembly 81 and drives the blade assembly 81 to rotate about the rotation axis 801 by friction.

Example 9

Figure 27:
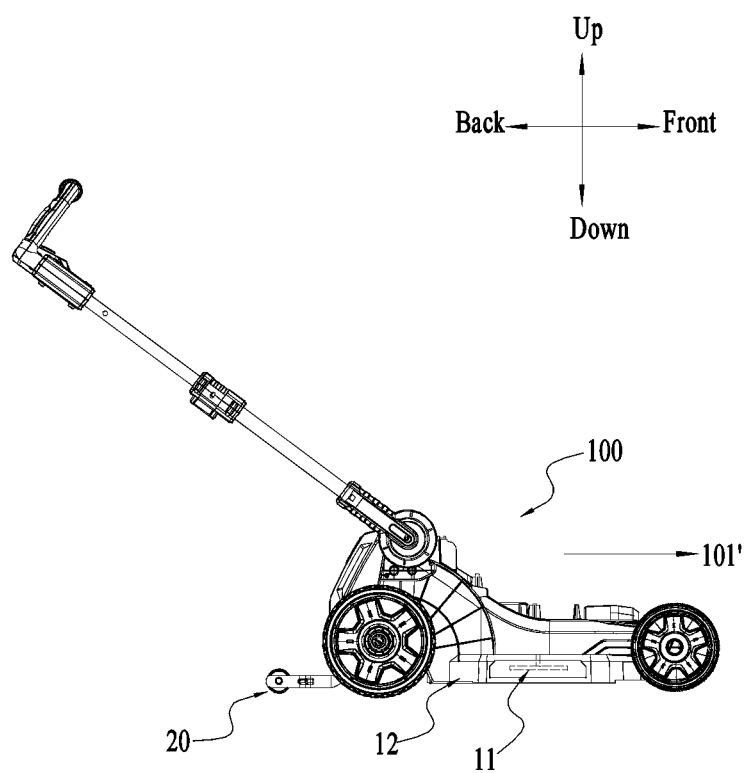
FIG. 27 is a schematic diagram of a lawn mower connected with a grass pressing assembly provided in Example 9.

FIG. 27 is a schematic diagram of a lawn mower 100 connected with a grass pressing assembly 20 according to Example 9, wherein the lawn mower 100 according to the present example is the same as the lawn mower of Example 1, except that only the lawn mower 100 in this example is connected with a grass pressing assembly 20. The lawn mower 100 includes a blade assembly 11 and a deck 12. The blade assembly 11 is configured to perform the cutting function of the lawn mower 100; the deck 12 is formed with an accommodation space for accommodating at least part of the blade assembly 11. In this example, the blade assembly 11 is totally located inside the accommodation space. The lawn mower 100 has a travelling direction 101' when travelling along a straight line on the ground. In this example, the travelling direction 101' is parallel to the front-rear direction. All usages of "assembly" in this application refer to a combination including at least one component or part, which realizes a specific function through interaction or coordination. The lawn mower 100 in the present application may be either a hand-push lawn mower or a riding lawn mower. For the convenience of explaining the technical solution of the present application, the up-down direction and the front-rear direction are defined as shown in FIG. 27.

As shown in FIGS. 27-30, the grass pressing assembly 20 is connected to the lawn mower 100. In one example, the grass pressing assembly 20 is detachably connected to the rear end of the lawn mower 100. The grass pressing assembly 20 is configured to compact the lawn, and the grass pressing assembly 20 serves as an accessory for the user to selectively assemble according to specific needs. The lawn mower 100 includes a mounting shaft 17; the mounting shaft 17 is perpendicular to the travelling direction 101'; the grass pressing assembly 20 is rotatably connected to the mounting shaft 17 so that the grass pressing assembly 20 can rotate about the mounting shaft 17. The mounting shaft 17 here may be a shaft body of the lawn mower 100, or may be a wheel shaft of the wheels, or may be another shaft body. That is to say, the grass pressing assembly 20 can be detachably connected to the mounting shaft 17, and there is no need to add another installation structure for mounting the grass pressing assembly 20 to the lawn mower 100, bringing the advantage of convenient installation. For any type of lawn mower 100, as long as it has an existing shaft body, the grass pressing assembly 20 in this example can be installed on the lawn mower 100, which has the advantage of strong adaptability.

Figure 28:
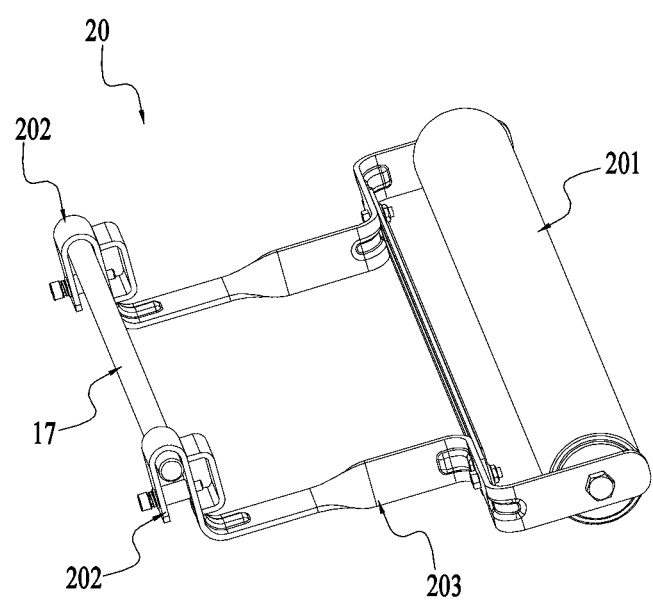
FIG. 28 is a perspective view of the grass pressing assembly in FIG. 27.

As shown in FIG. 28, the grass pressing assembly 20 includes a drum 201, a connecting portion 202, and a supporting portion 203. Wherein, the drum 201 has a predetermined weight so that the drum 201 always applies pressure to the ground, and the pressure is large enough to compact the lawn. That is to say, the grass pressing assembly 20 in this example mainly applies pressure to the lawn by the weight of the drum 201. The connecting portion 202 and the mounting shaft 17 form a rotatable connection, that is, the connecting portion 202 can rotate about the mounting shaft 17. In this example, the connecting portion 202 is generally hook-shaped with openings in the circumferential direction. After the connecting portion 202 is hooked to the mounting shaft 17, the connecting portion 202 is sealed in the circumferential direction by fasteners such as screws or bolts so that the mounting shaft 17 cannot be separated from the connecting portion 202 in the radial direction.

Figure 29:
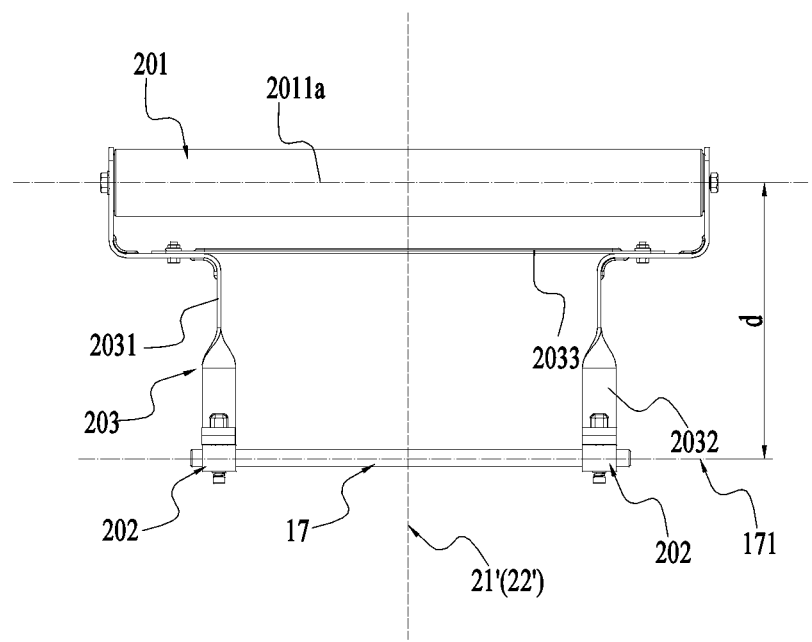
FIG. 29 is a plan view of the grass pressing assembly in FIG. 27.

As shown in FIG. 29, the supporting portion 203 connects the drum 201 and the connecting portion 202. The supporting portion 203 and the connecting portion 201 may be formed integrally or separately. The supporting portion 203 includes a first support arm 2031 and a second support arm 2032. The drum 201 has a length direction. The first support arm 2031 and the second support arm 2032 extend at least partially along the direction perpendicular to the length direction of the drum 201. The length direction of the drum 201 is parallel to the axis 171 of the mounting shaft 17.

In this example, the first support arm 2031 connects the first end of the drum 201 and the connecting portion 202, and the second support arm 2032 connects the second end of the drum 201 and the connecting portion 202. The supporting portion 203 further includes a third support arm 2033, and the third support arm 2033 is fixedly connected to the first support arm 2031 and second support arms 2032 to increase the overall strength and rigidity of the supporting portion 203. The third support arm 2033 extends in a direction parallel to the mounting shaft 17, and the two ends of the third support arm 2033 are respectively connected to the first support arm 2031 and the second support arm 2032.

The drum 201 has a mid-division plane 21' perpendicular to the length direction, and the drum 201 is symmetrical about the mid-division plane 21'; the supporting portion 203 has a symmetry plane 22'. The supporting portion 203 is symmetrical about the symmetry plane 22'. The symmetry plane 22' is parallel or coincides with the mid-division plane 21'. When the connecting portion 202 is mounted to the middle position of the mounting shaft 17, the symmetry plane 22' coincides with the mid-division plane 21'. In other examples, the connecting portion 202 may be installed at any position in the axial direction of the mounting shaft 17.

Figure 30:
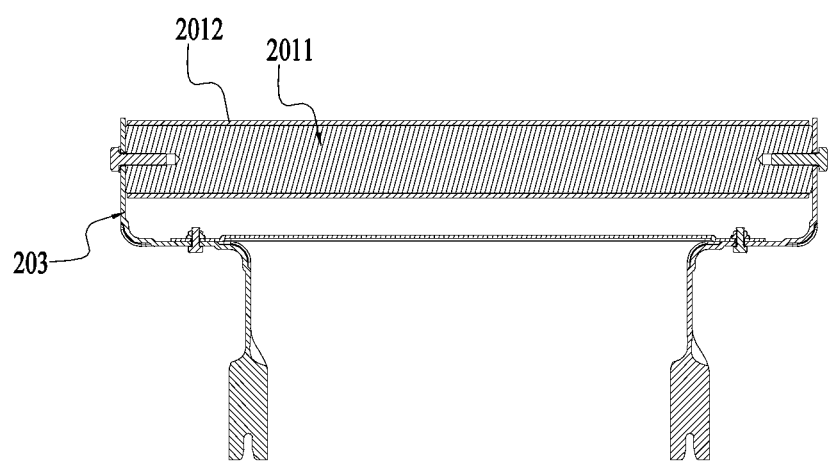
FIG. 30 is a cross-sectional view of the grass pressing assembly in FIG. 27.

As shown in FIG. 30, the drum 201 includes a central shaft 2011 and a cylindrical portion 2012. The central shaft 2011 extends along the length direction of the drum 201; the cylindrical portion 2012 rotates around the central shaft 2011, and the cylindrical portion 2012 is basically a hollow cylindrical shape; both the central shaft 2011 and the cylindrical portion 2012 are made of metal. The central shaft 2011 and the supporting portion 203 are connected together by screws, and the central shaft 2011 and the screw form a threaded connection, that is, the central shaft 2011 and the supporting portion 203 constitute a fixed connection, and the cylindrical portion 2012 can rotate relative to the central shaft 2011. In an example, the screw can be replaced with a bolt fixedly connected to the supporting portion 203 so that the central shaft 2011 can rotate about the bolt; in other words, the screw and the central shaft 2011 constitute a rotational connection, and the central shaft 2011 can rotate relative to the screw.

In this example, the lawn mower 100 includes an adjustment assembly for adjusting the height of the deck 12 from the ground, and the grass pressing assembly 20 is connected to a shaft body on the adjustment assembly. The adjustment assembly in this example is mainly composed of a linkage mechanism. When the user adjusts the height of the deck 12 from the ground, the height of the adjustment assembly from the ground also changes. That is to say, the height of the mounting shaft 17 from the ground is variable. In this example, the mounting shaft 17 is parallel to the ground. The distance d from the axis 171 of the mounting shaft 17 to the axis 2011a of the central shaft 2011 of the drum 201 is long enough so that regardless of the height of the mounting shaft 17 from the ground, the drum 201 still contacts the ground and is supported by the ground. That is, the distance d between the axis 2011a of the central shaft 2011 and the axis 171 of the mounting shaft 17 is greater than the maximum distance between the axis 171 of the mounting shaft 17 and the ground.

Example 10

Figure 31:
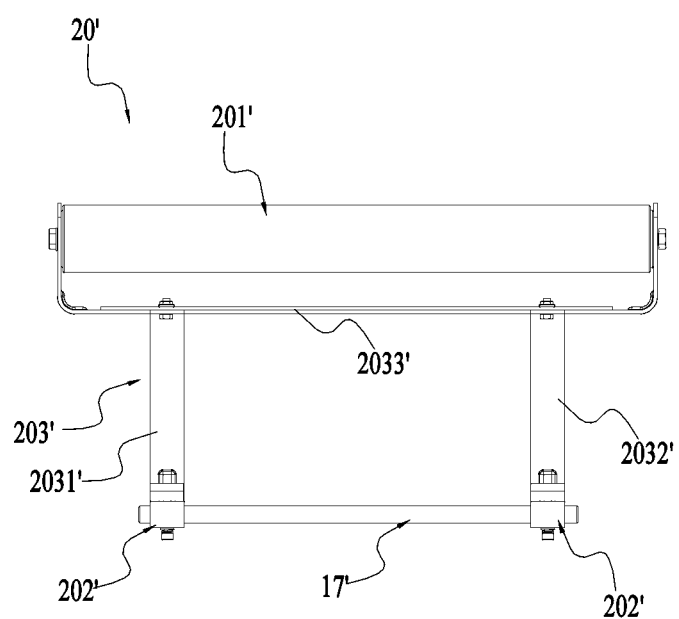
FIG. 31 is a schematic diagram of a grass pressing assembly connected to a lawn mower provided in Example 10.

FIG. 31 is a schematic diagram of the grass pressing assembly 20' provided by Example 10 of the present application. Compared with Example 9, the difference only lies in the structure of the supporting portion 203', so only the supporting portion 203' will be described below. The supporting portion 203' includes a first support arm 2031', a second support arm 2032', and a third support arm 2033'. The two ends of the third support arm 2033' are respectively connected to the two ends of the drum 201'; the two ends of the first support arm 2031' are respectively connected to the third support arm 2033' and the connecting portion 202', and the two ends of the second support arm 2032' are respectively connected to the third support arm 2033' and the connecting portion 202'. Among them, the connection of the first support arm 2031' and the second support arm 2032' are fixed connections, including welded connection or threaded connection. The two ends of the third support arm 2033' extend approximately in a direction perpendicular to the mounting axis 17', the middle part of the third support arm 2033' extends approximately in a direction parallel to the mounting axis 17', the first support arm 2031' and the second support arm 2032' extend in a direction perpendicular to the mounting axis 17'.

Example 11

Figure 32:
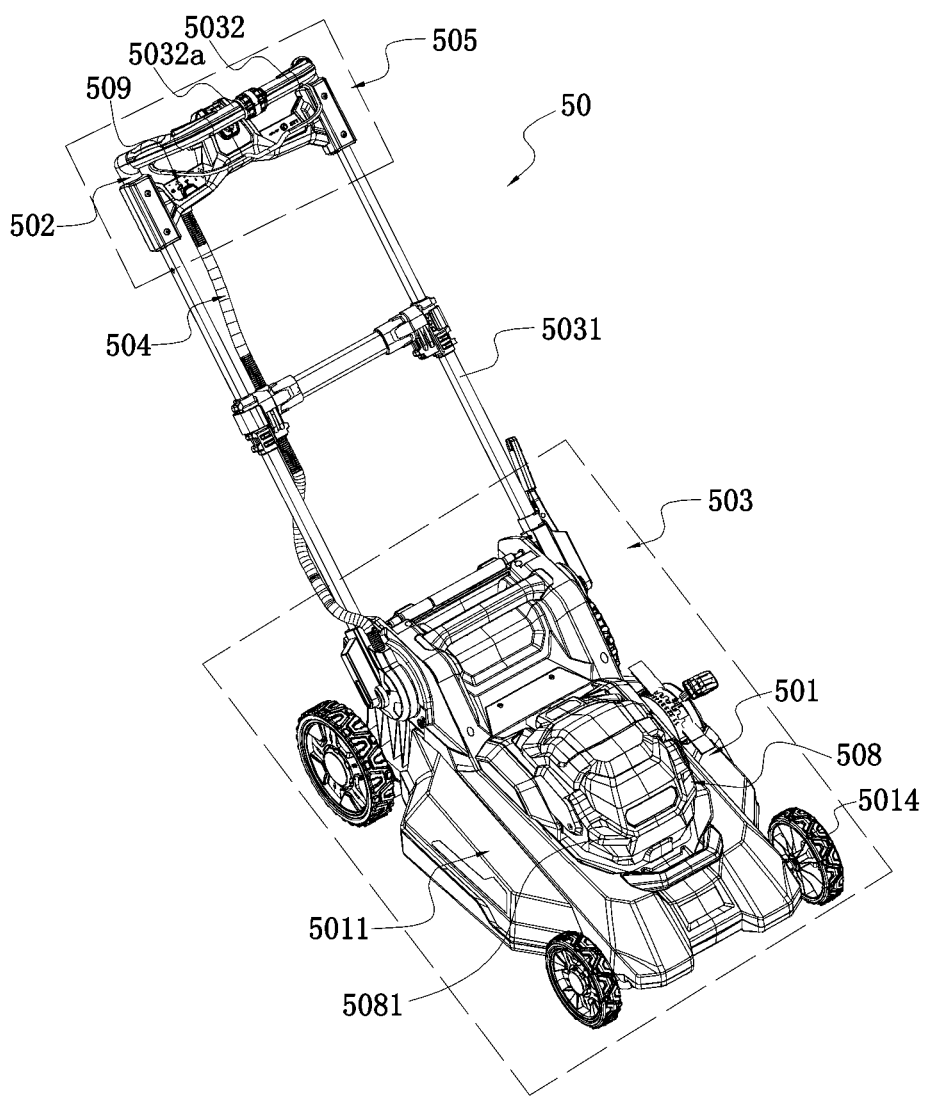
FIG. 32 is a perspective view of a lawn mower provided in Example 11.
Figure 33:
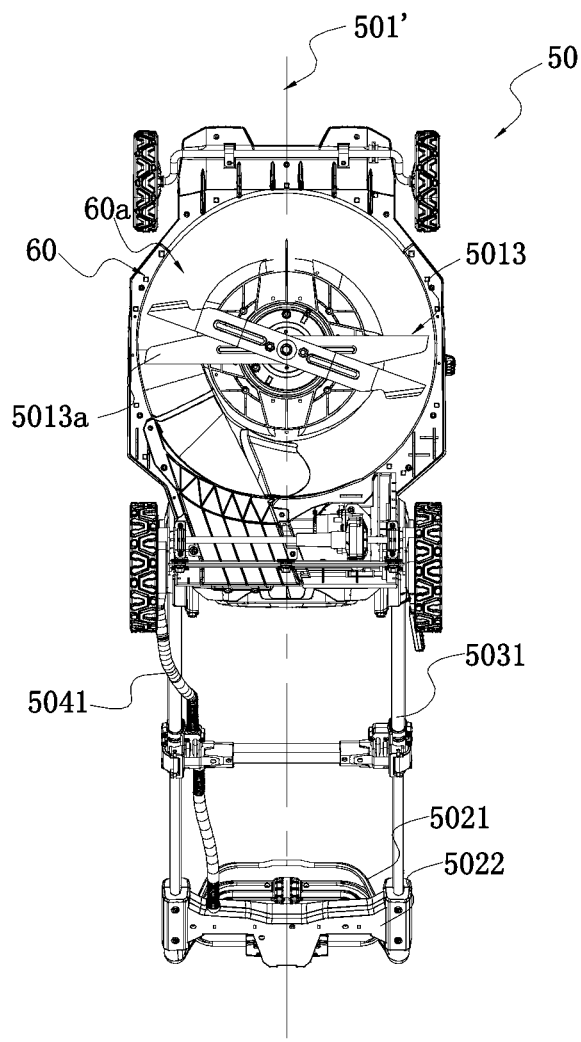
FIG. 33 is a bottom view of the lawn mower of FIG. 32.
Figure 34:
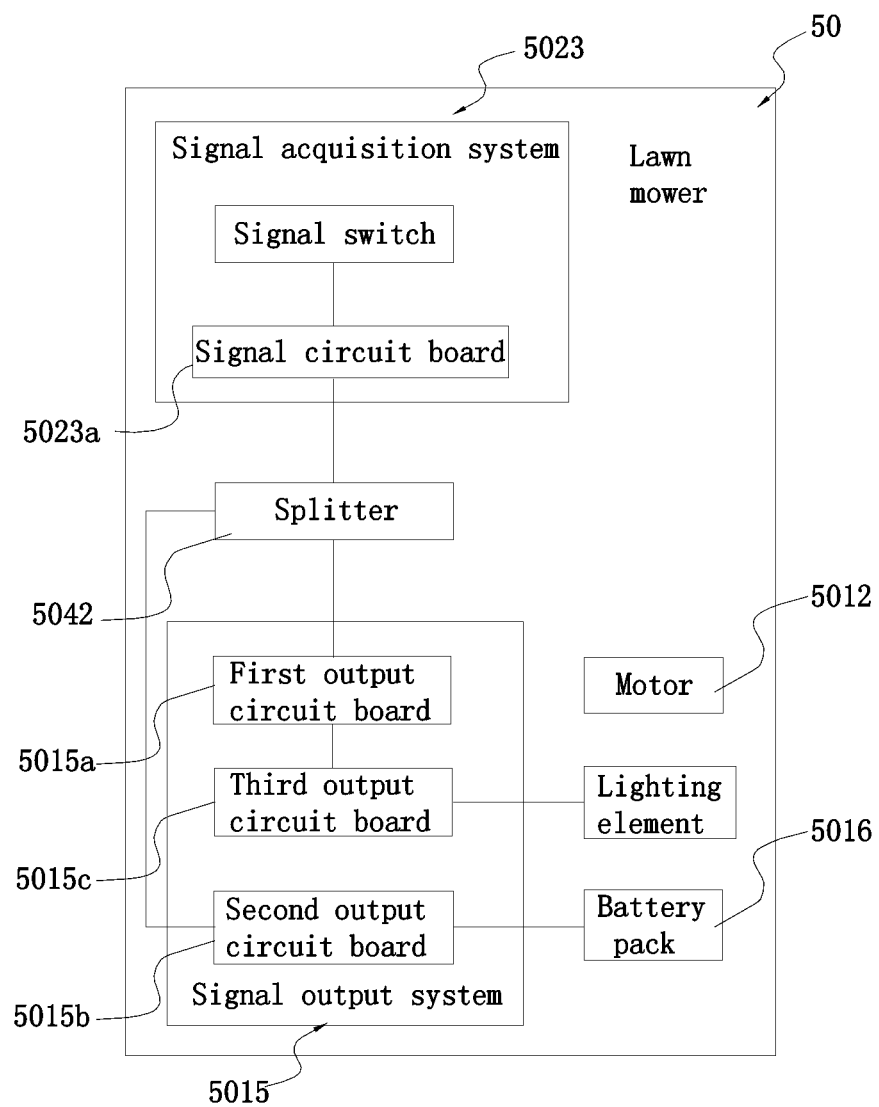
FIG. 34 is a circuit diagram of the lawn mower of FIG. 32.
Figure 35:
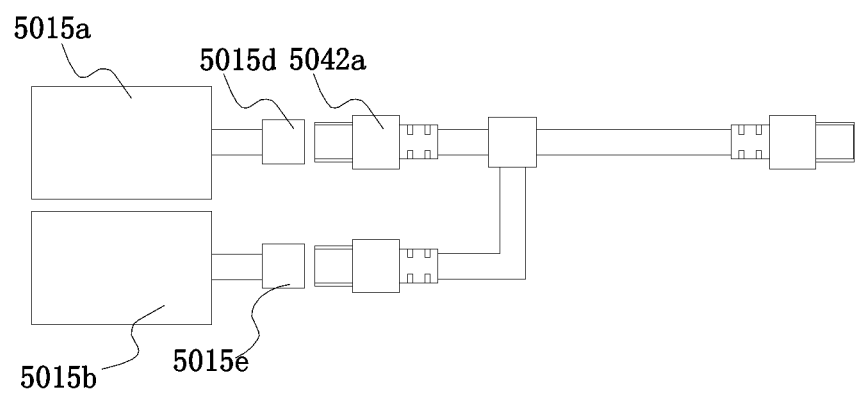
FIG. 35 is a schematic diagram of the connection of a first signal line of the lawn mower of FIG. 32 to a first output circuit board and a second output circuit board.

FIG. 32 is a schematic diagram of a lawn mower 50 provided in Example 11 of the present application. Compared with Example 1, the difference mainly lies in the structure and position arrangement of the lighting assembly. The following mainly introduces the lighting assembly 508. As shown in FIGS. 32-34, the lawn mower 50 includes a main body 501 and an operating device 502. The main body 501 includes a main body housing 5011, a prime mover, and a working assembly 5013, wherein the working assembly 5013 includes working elements that perform the tool functions of garden tools. For the lawn mower 50, the working element is a cutting element arranged for mowing, further, is a blade assembly 5013a. The main body housing 5011 is configured to install a prime mover and a working element that outputs power. For the lawn mower 50, the main body housing 5011 may include a deck 60. The prime mover is configured to output power to the working element to drive the movement of the working element. In this example, the prime mover is a motor 5012 capable of driving the blade assembly 5013a to rotate. The operating device 502 is configured for user operation to control the main body 501, and the operating device 502 includes an operating element for user operation, the operating element being a trigger 5021. As a hand-push power tool, the lawn mower 50 also includes a connecting rod assembly, which is connected to the main body 501 and the operating device 502. The lawn mower 50 further includes a pair of walking wheels 5014. The walking wheels 5014 drive the lawn mower 50 to walk on the ground. The two walking wheels 5014 are symmetrically disposed on both sides of the first plane 501'.

The connecting rod assembly includes a pair of connecting rods 5031, and the connecting rod 5031 connects the main body 501 and the operating device 502. The two connecting rods 5031 are arranged symmetrically on both sides of the first plane 501'. In the present example, the area at the end of the connecting rod assembly 503 where the operating device 502 is provided is defined as the operating area 505, the area at the end of the connecting rod assembly 503 where the main body 501 is provided is defined as the work area 503, the operating device 502 is located in the operating area 505, the main body 501 is located in the work area 503. The connecting rod assembly further includes an armrest 5032; the armrest 5032 is configured for a user standing in an operation position to hold and push the lawn mower 50. The armrest 5032 connects the two connecting rods 5031 and is located at the end of the connecting rods 5031 away from the main body 501.

As shown in FIGS. 32-35, a signal acquisition system 5023 is also provided in the operating area 505. The signal acquisition system 5023 is connected to the operating device 502 to receive input information of the operating device 502. A signal output system 5015 is also provided in the working area 503, and the signal output system 5015 is configured to control the output of the working assembly 5013. The operating device 502 further includes a console 5022; the console 5022 connects the two connecting rods 5031; the console 5022 is located between the armrest 5032 and the main body 501. The trigger 5021 and the console 5022 constitute a rotational connection. The user can rotate the trigger 5021 so that the trigger 5021 fits to the armrest 5032. The user's hand simultaneously holds the trigger 5021 and the armrest 5032. The signal acquisition system 5023 is arranged in a space surrounded by the console 5022. The signal output system 5015 is arranged in a space surrounded by the main body housing 5011.

The lawn mower 50 further includes a signal line assembly 504; the signal line assembly 504 is connected to the signal output system 5015 and the signal acquisition system 5023 so that the signal output system 5015 and the signal acquisition system 5023 constitute a communication connection. In this way, after the signal acquisition system 5023 collects the signals output by the operating device 502, the signal line assembly 504 transmits the information to the signal output system 5015. The signal output system 5015 controls the working assembly 5013 to perform the corresponding function in a corresponding state.

The signal acquisition system 5023 includes a signal circuit board 5023a, and the signal output system 5015 includes a first output circuit board 5015a. The first output circuit board 5015a is connected to the motor 5012. The signal circuit board 5023a is configured to install or connect a signal switch, which is controlled by the operating element. The first output circuit board 5015a sends signals to the working elements, electronic switches, circuit boards, etc. in the working area 503. The signal line assembly 504 comprises a first signal line 5041; the first signal line 5041 is connected to the first output circuit board 5015a and the signal circuit board 5023a in order to achieve the communication between the first output circuit board 5015a and the signal circuit board 5023a.

Garden tools in related technologies connect multiple electronic components through power lines and electronic switches. The power loss is large, the cost of cables is high, and the wiring is complicated, resulting in chaos in the internal structure of the machine. In this example, the first signal line 5041 is used to connect the signal circuit board 5023a and the first output circuit board 5015a, and a bus signal line can realize the connection between multiple electronic components. Therefore, regarding the lawn mower 50 of this example, the power loss is low, the cost of the cable is low, and the wiring is simple, so that the internal structure of the machine is simple. Moreover, because there are few cables inside the lawn mower 50, the cable arrangement is simple, the stability of the lawnmower 50 is good, it is not easy to be damaged, and maintenance is relatively convenient.

In this example, the signal acquisition system 5023 is only provided with one signal circuit board 5023a. In other examples, the signal acquisition system 5023 also includes multiple signal circuit boards 5023a, and the multiple signal circuit boards 5023a are communicatively connected through signal lines.

The lawn mower 50 further comprises a power supply; the power supply is a battery pack 5016; the battery pack 5016 is configured to power the motor 5012; the battery pack 5016 and the motor 5012 are both mounted on the main body 501. The signal output system 5015 further includes a second output circuit board 5015b, and the second output circuit board 5015b is disposed in the main body housing 5011. The second output circuit board 5015b and the battery pack 5016 constitute a communication connection. The first signal line 5041 is also connected to a splitter 5042, which is connected to two output terminals 5042a, which are respectively connected to the first output circuit board 5015a and the second output circuit board 5015b (referring to FIG. 34 and FIG. 35). Thus, the first output circuit board 5015a is communicatively connected to the first signal circuit board 5023a through the first signal line 5041, and the second output circuit board 5015b is communicatively connected to the first signal circuit board 5023a through the first signal line 5041.

In this example, the working assembly 5013 further includes other functional elements that implement additional functions of the lawn mower 50, and the functional elements may be, for example, a lighting element 5081 or a self-propelled motor. In this example, the lighting element 5081 is an example of the functional elements. The lawn mower 50 also includes a third output circuit board 5015c that controls the lighting element 5081, and the third output circuit board 5015c is connected to the first output circuit board 5015a.

The first output circuit board 5015a is also installed or connected with a first access terminal 5015d, and the first access terminal 5015d is configured to receive a signal output by the first signal line 5041. The second output circuit board 5015b is also installed or connected with a second access terminal 5015e, which is configured to receive the signal output by the first signal line 5041. The first access terminal 5015d is connected to one of the two output terminals 5042a connected to the splitter 5042, and the second access terminal 5015e is connected to the other one of the two output terminals 5042a connected to the splitter 5042. The two output terminals 5042a are provided with USB female sockets, and the first access terminal 5015d and the second access terminal 5015e are provided with USB male sockets. In one example, the USB female socket is a TYPE-C female socket, and the USB male socket is a TYPE-C male socket. In this way, the signal line assembly 504 has good versatility, is convenient for maintenance, and can improve the stability of the lawn mower 50. In other examples, the output terminal 5042a may be provided with a USB male socket, and the first access terminal 5015d and the second access terminal 5015e may be provided with a USB female socket.

Example 12

Figure 36:
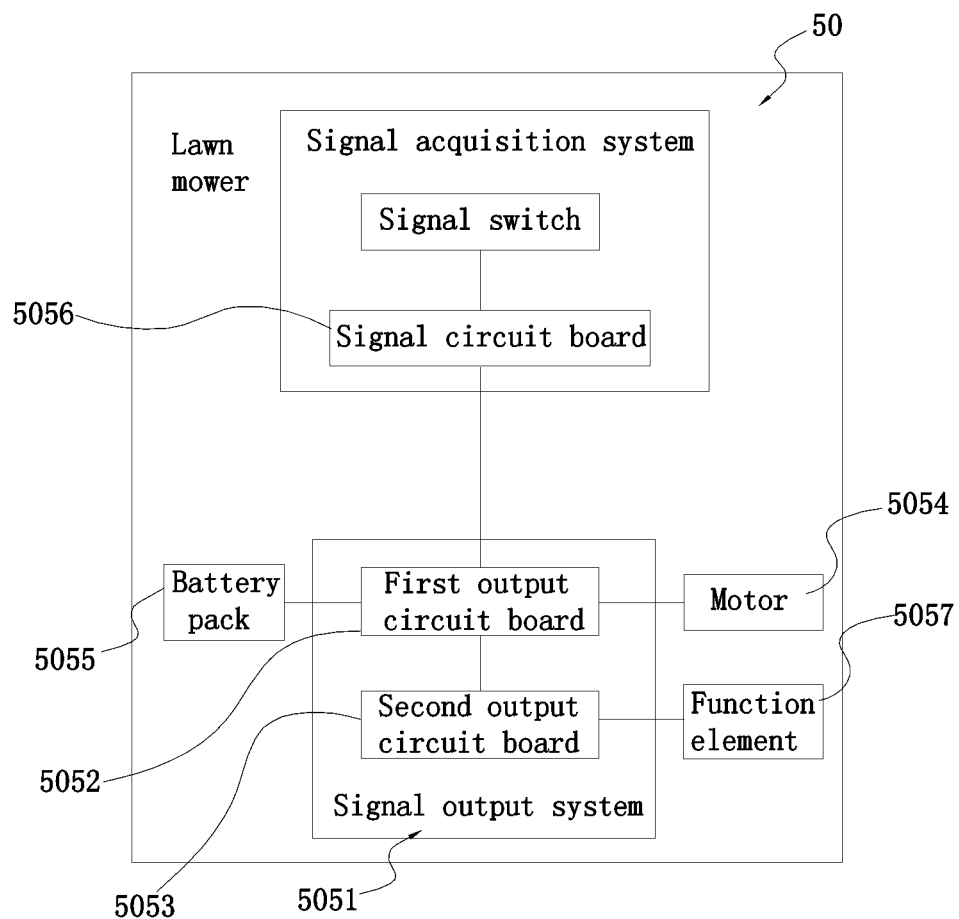
FIG. 36 is a circuit diagram of a lawn mower provided in Example 12.

FIG. 36 is a schematic diagram of a lawn mower 50 provided in Example 12. The signal output system 5051 of the lawn mower 505 includes a first output circuit board 5052 and a second output circuit board 5053. The motor 5054 and the battery pack 5055 are both connected to the first output circuit board 5052, and the signal circuit board 5056 and the first output circuit board 5052 are connected by a signal line. The second output circuit board 5053 is connected to the functional element 5057 which is configured to realize other functions of the lawn mower 505.

Figure 37:
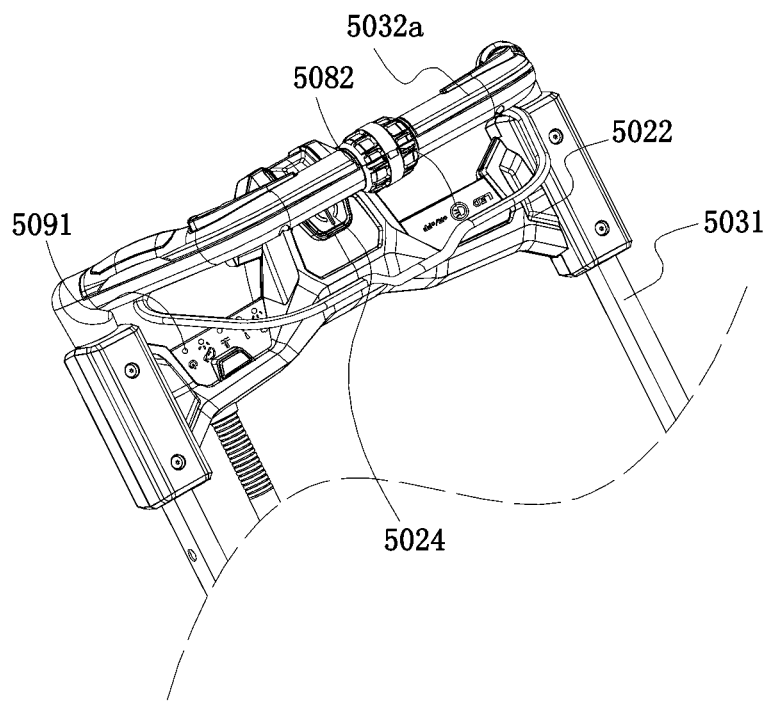
FIG. 37 is a schematic diagram of a partial structure of the lawn mower of FIG. 32.

As shown in FIG. 32 and FIG. 37, the lawn mower 50 further includes a lighting assembly 508 and a status display assembly 509. Lighting assembly 508 includes a lighting switch 5082 and a lighting element 5081 as shown in FIG. 32. The lighting element 5081 is disposed in the working area 503 to illuminate the region on the front side of the lawn mower 50 so as to facilitate the user working in poor lighting conditions. The lighting element 5081 is provided on the main body 501, further, the lighting element 5081 is provided on the main body housing 5011. The lighting switch 5082 is provided for user operation to control whether the lighting element 5081 is turned on. The status display assembly 509 includes a status indicator light 5091. The status indicator light 5091 can display the working status of the lawn mower 50. The status indicator light 5091 can also display whether the lawn mower 50 is activated. Among them, the lighting switch 5082 and the status indicator light 5091 are both located in the operating area 505. In this way, when the user stands on the rear side of the operating device 502, the user can conveniently operate the lighting switch 5082 to light up the lighting element 5081. Especially during the operation of the lawn mower 50, the user does not need to release the trigger 5021 and come to the side or the front of the lawn mower 50 to activate the lighting element 5081. Therefore, the user can conveniently operate the lighting switch 5082 at any time during the operation of the lawn mower 50, which improves the operational convenience. Moreover, the user can easily observe the display state of the status display assembly 509, without leaving the operating area.

The lighting switch 5082 and the status indicator light 5091 are both provided on the console 5022; also, the lighting switch 5082 and the status indicator light 5091 are located between the trigger 5021 and the main body 501, thereby facilitating user operations.

As shown in FIGS. 33, 36, and 37, a safety switch 5024 is also provided in the middle of the console 5022. The safety switch 5024 and the trigger 5021 constitute a switch group for starting the motor 5054. When one of the safety switch 5024 and the trigger 5021 is not activated, the lawn mower 50 is not started. After the safety switch 5024 is activated, the user activates the trigger 5021. If the safety switch 5024 is not activated, the motor 5054 does not start when the user activates the trigger 5021. Among them, the lighting switch 5082 and the status indicator light 5091 are respectively located on both sides of the safety switch 5024, therefore, the structure layout on the console 5022 is more reasonable, and it is more convenient for the user to operate the lawn mower 50.

In this example, the lighting switch 5082 and the status indicator light 5091 are also disposed on both sides of the first plane 501', which facilitates the user to operate the lighting switch 5082 and to observe the display status of the status indicator light 5091. In other examples, the lighting switch 5082 may also be provided on the armrest 5032 or near the armrest 5032, so long as the user can operate the lighting switch 5082 when standing on the rear side of the lawn mower 50 without leaving the operating area 505.

The armrest 5032 includes a cross bar 5032a; the cross bar 5032a is for the user to grip and the cross bar 5032a extends in a direction perpendicular to the connecting rod 5031. The minimum distance between the lighting switch 5082 and the cross bar 5032a is greater than or equal to 0 cm and less than or equal to 30 cm. In this way, the user can extend the arm to operate the light switch 5082 when holding the cross bar 5032a.

In one example, the lighting switch 5082 is a membrane switch, which takes up little space and has a low manufacturing cost. The lighting switch 5082 is also provided with an LED lamp for the user to easily observe whether the lighting switch 5082 is triggered in a relatively bright environment.

In this example, the number of status indicator lights 5091 is five, and the five status indicator lights 5091 are respectively: working status indicator light, working shape indicator light, temperature status indicator light, load status indicator light and power status indicator light. The working status indicator light indicates whether the lawn mower 50 is started, so whether the lawn mower 50 has been damaged is determined by the display status of the working status display light. The working shape indicator light shows the folding state of the lawn mower 50 or the telescopic state of the connecting rod assembly 503 of the lawn mower 50. The temperature status display light indicates whether the temperature of the battery pack 5055 or the motor 5054 exceeds a predetermined threshold. The load status indicator light indicates whether the lawn mower 50 is in an overload state. The power status indicator light displays the remaining power of the battery pack 5055, or whether the remaining power of the battery pack 5055 is lower than a predetermined threshold.

Figure 38:
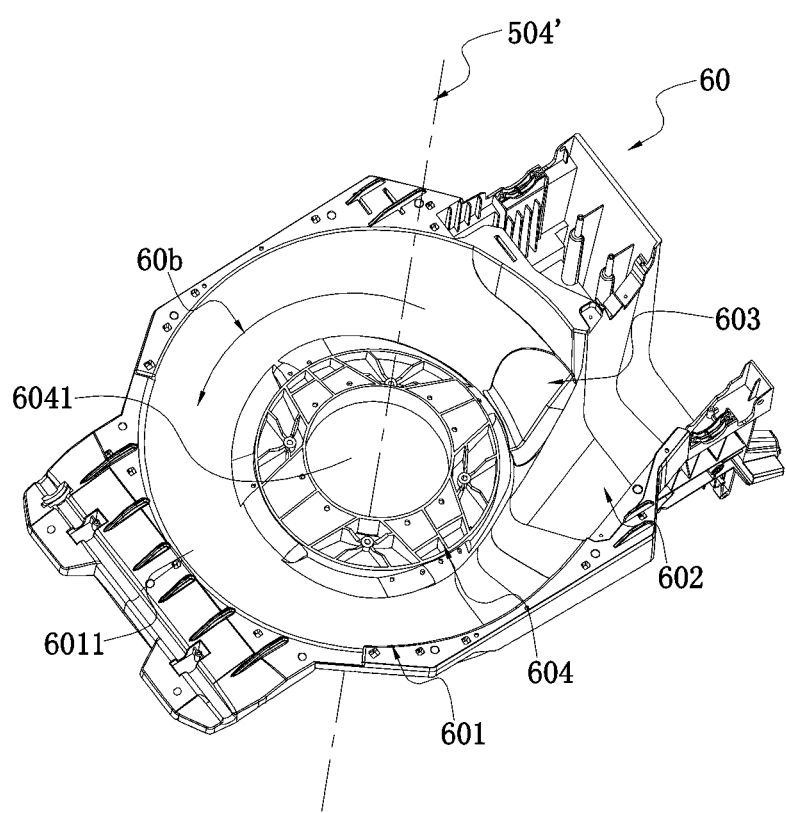
FIG. 38 is a perspective view of a deck in the lawn mower of FIG. 32.

As shown in FIGS. 32, 33, and 38, the deck 60 is formed with an accommodation space 60a covering the blade assembly 5013a. In the accommodation space 60a, the blade assembly 5013a rotates about the rotation axis 504' to perform the cutting function.

Figure 41:
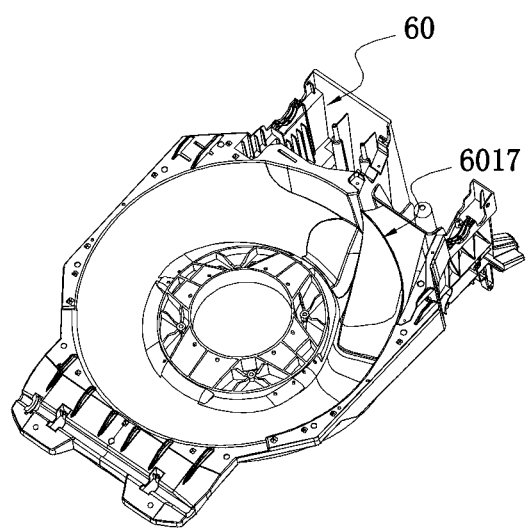
FIG. 41 is a perspective view of the deck of FIG. 38 when connected to a plug.

As shown in FIG. 38 and FIG. 41, the lawn mower 50 has a discharge mode and a mulch mode. When the lawn mower 50 is in the discharge mode, the grass clippings can be discharged out of the deck 60. When the lawn mower is in the mulch mode, the grass clippings will fall under the deck 60.

Figure 39:
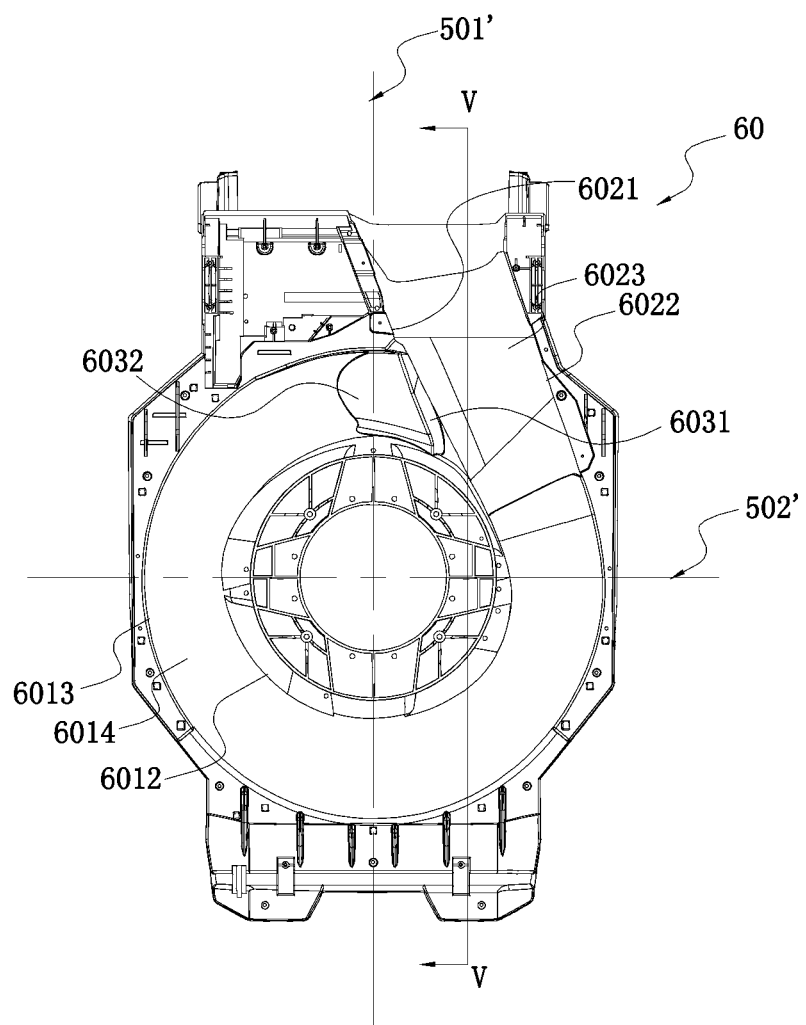
FIG. 39 is a plan view of the deck in FIG. 38.
Figure 40:
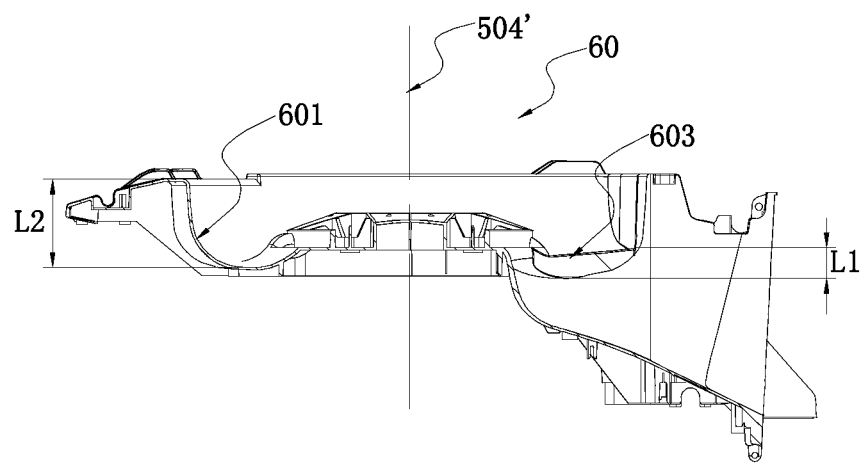
FIG. 40 is a cross-sectional view of the deck in FIG. 39 along line V-V.

As shown in FIGS. 38-40, the deck 60 includes a vortex portion 601 and a discharge portion 602. The vortex portion 601 extends around the circumferential direction of the rotation axis 504' to form a vortex in the accommodation space 60a. The vortex portion 601 forms a vortex channel 6011, and the vortex flows along a flow path 60b in the vortex channel 6011. The flow path 60b also basically extends in the circumferential direction around the rotation axis 504'. The discharge portion 602 is provided on the flow path 60b of the vortex. The discharge portion 602 extends from the vortex portion 601 in the tangential direction of the vortex, and the discharge portion 602 guides the vortex flow out in the tangential direction of the flow path 60b. Therefore, when the lawn mower 50 is in the discharge mode, the discharge portion 602 can guide the grass clippings to move along the flow path 60b of the vortex channel 6011 first, and then when the grass clippings move to the discharge portion 602, the discharge portion 602 will guide a portion of grass clippings away from the deck 60 along the tangential direction of the flow path 60b to discharge this portion of grass clippings to the outside of the lawn mower 50, or collect this portion of grass clippings into a grass basket.

As shown in FIG. 41, the lawn mower 50 further includes a plug 6017. When the plug 6017 is installed in the discharge portion 602, the discharge portion 602 is sealed, so that the lawn mower 50 is in the mulch mode. When the plug 6017 is not attached to the discharge portion 602, the discharge portion 602 is opened, and the airflow can flow out from the discharge portion 602, therefore the lawn mower 50 is in the discharge mode.

In the present example, as shown in FIG. 38 and FIG. 40, the deck 60 further comprises a stop portion 603; the stop portion 603 is configured to prevent the vortex from keeping circulating in the vortex portion 601 while flowing through the discharge portion 602, thereby increasing the flow rate of the vortex from the discharge portion 602. At least a portion of the discharge portion 602 and at least a portion of the stop portion 603 is on the same side of the first plane 501', and the first plane 501' passes through the rotation axis 504'. The stop of the vortex by the stop portion 603 can increase the flow rate of the vortex from the discharge portion 602 when the lawn mower 500 is in the discharge mode, thereby improving the grass collection efficiency of the grass clippings, and on the other hand, when the lawn mower 500 is in the mulch mode, the grass clippings can be stopped so that some of the grass clippings fall into the cutting area of the blade assembly 5013a again to be cut by the blade assembly 5013a again, thereby improving the grass chopping ability.

In one example, the deck 60 further includes a mounting portion 604; the mounting portion 604 is configured to mount the motor 5054. The mounting portion 604 is formed with a hole 6041 around the rotation axis 504' that allows the motor shaft to pass.

As shown in FIG. 39, the vortex portion 601 includes an inner ring 6012, an outer ring 6013, and a bottom surface 6014. The inner ring 6012 is formed around the rotation axis 504', and the inner ring 6012 is connected to the mounting portion 604. The outer ring 6013 is disposed around the inner ring 6012. The bottom surface 6014 connects the inner ring 6012 and the outer ring 6013. The vortex channel 6011 of the vortex portion 601 is formed between the inner ring 6012 and the outer ring 6013.

The discharge portion 602 includes a first discharge surface 6021, a second discharge surface 6022, and a discharge bottom surface 6023. The first discharge surface 6021 is connected to the inner ring 6012, and the second discharge surface 6022 is connected to the outer ring 6013. The first discharge surface 6021 extends from the inner ring 6012 substantially along a tangential direction of the inner ring 6012, and the second discharge surface 6022 extends from the outer ring 6013 substantially along a tangential direction of the outer ring 6013. The discharge bottom surface 6023 connects the first discharge surface 6021 and the second discharge surface 6022. The discharge bottom surface 6023 is also connected to the bottom surface 6014 of the vortex section 601.

The stop portion 603 includes a stop surface 6031 and a connecting surface 6032. The stop surface 6031 is configured to stop the airflow flowing in the vortex portion 601 so that the airflow flows out of the discharge portion 602. The discharge portion 602 is substantially located on the first side of the first plane 501'. In this example, if more than 90% of the discharge portion 602 is located on the first side of the first plane 501', it is considered that the discharge part 602 is substantially located on the first side of the first plane 501'. The stop surface 6031 is also located on the first side of the first plane 501', that is, the stop surface 6031 and the discharge portion 602 are located on the same side of the first plane 501'. Or, in other examples, the stop surface 6031 and a portion of the discharge portion 602 are located on the same side of the first plane 501'. Alternatively, in other examples, at least a portion of the stop surface 6031 and at least a portion of the discharge portion 602 are located on the same side of the first plane 501'.

The stop portion 603 is provided at the edge of the discharge portion 602. In an example, the stop surface 6031 is disposed at the first discharge surface 6021, and the stop surface 6031 extends from the inner ring 6012 to the outer ring 6013. The stop surface 6031 also extends from the bottom surface 6014 to the direction away from the bottom surface 6014, that is, one side of the stop surface 6031 is connected to the junction of the bottom surface 6014 and the first discharge surface 6021. The connecting surface 6032 extends from a side of the stop surface 6031 away from the bottom surface 6014 along a plane obliquely intersecting the stop surface 6031, and the connecting surface 6032 connects the stop surface 6031 and the bottom surface 6014.

In this example, the stop portion 603 is integrally formed with the vortex portion 601, and the recess of the vortex portion 601 towards the ground forms the stop portion 603. The stop portion 603 is located inside the vortex portion 601, the stop portion 603 is also located in the vortex channel 6011 formed by the vortex portion 601, and the stop portion 603 is also located on the flow path 60$b$ of the vortex.

The stop portion 603 and the discharge portion 602 are also disposed on the same side of a second plane 502' that passes through the rotation axis 504' and is perpendicular to the first plane 501'. That is to say, the stop portion 603 and the discharge portion 602 are provided at the rear of the deck 60.

In a direction perpendicular to the first plane 501', at least a portion of the stop portion 603 is also located between the discharge portion 602 and the hole 6041.

The ratio of the length L1 of the stop portion 603 in the direction of the rotation axis 504' to the depth L2 of the vortex portion 601 in the direction of the rotation axis 504' is greater than or equal to 0.1 and less than or equal to 0.5. Therefore, on the one hand, the size of the stop portion 603 is not too large, which hinders effective vortex to be generated in the vortex portion 601; on the other hand, the size of the stop portion 603 is not too small, which affects the discharge efficiency of the discharge portion 602 and the grass chopping ability of the lawn mower 50.

Example 13

Figure 42:
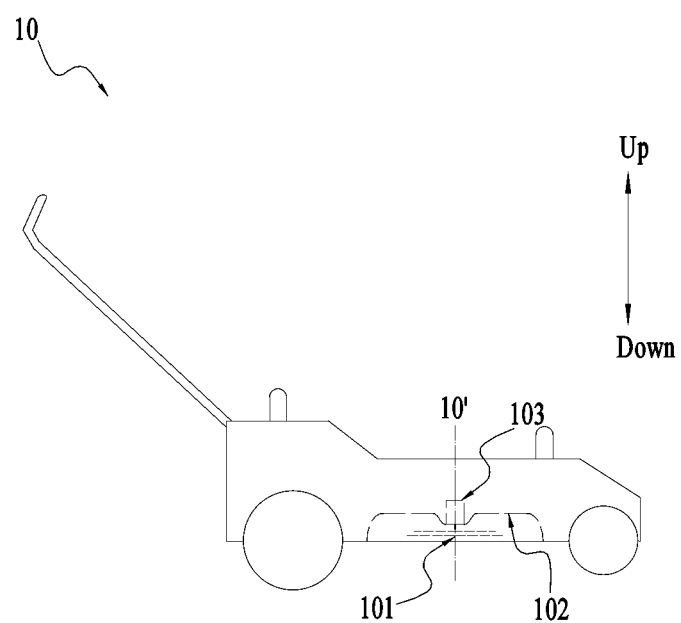
FIG. 42 is a schematic diagram of a lawn mower provided in Example 13.
Figure 43:
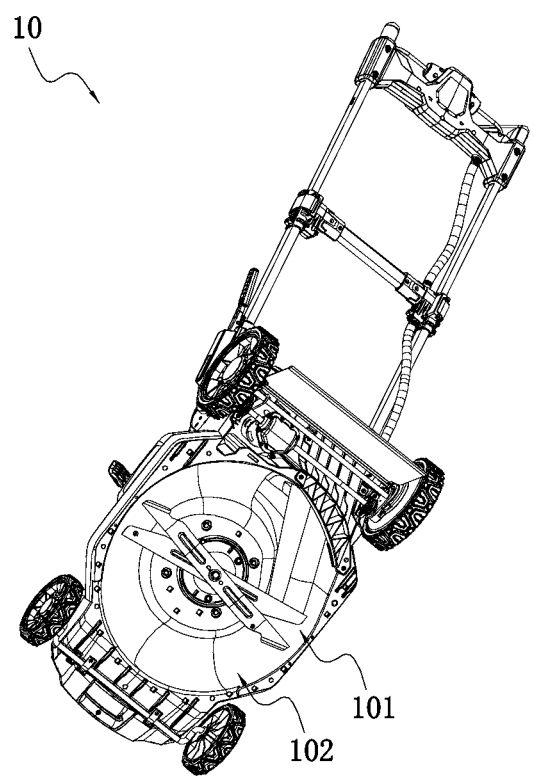
FIG. 43 is a perspective view of the lawn mower of FIG. 42.

FIG. 42 is a lawn mower 10 provided in Example 13 of the present application. Compared with Example 1, the structure of the blade assembly 101 is the main difference. As shown in FIGS. 42-46, the lawn mower 10 includes a blade assembly 101 for cutting vegetation and a deck 102 that houses the blade assembly 101, and the blade assembly 101 is located inside the deck 102. The lawn mower 10 further includes a motor 103 that drives the blade assembly 101 to rotate. The motor 103 is located above the deck 102. The motor 103 and the blade assembly 101 form a coaxial rotation about the rotation axis 10'. The motor 103 includes a motor shaft, and the blade assembly 101 includes a drive shaft 1011 (referring to FIG. 44) that drives the blade assembly 101 to rotate. The drive shaft 1011 may be a motor shaft. In an example, a transmission mechanism for transmission may also be provided between the motor 103 and the blade assembly 101, so that the shaft of the motor 103 and the drive shaft 1011 form a non-coaxial rotation.

Figure 44:
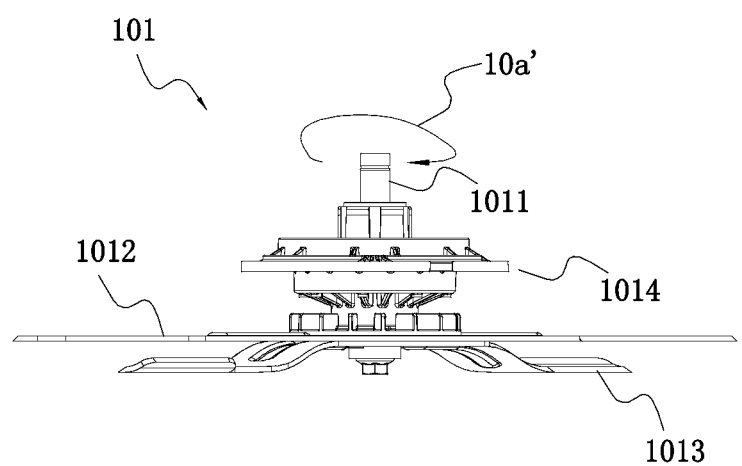
FIG. 44 is a plan view of a blade assembly of the lawn mower of FIG. 42.
Figure 45:
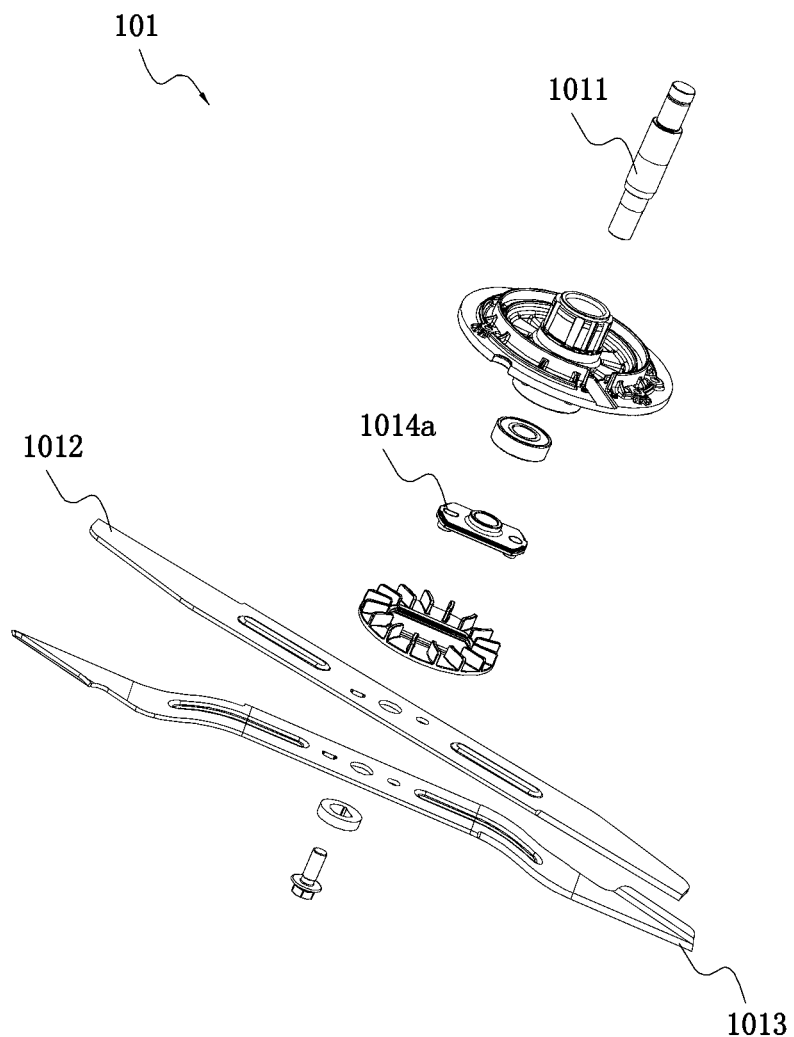
FIG. 45 is an exploded view of the blade assembly in FIG. 44.
Figure 46:
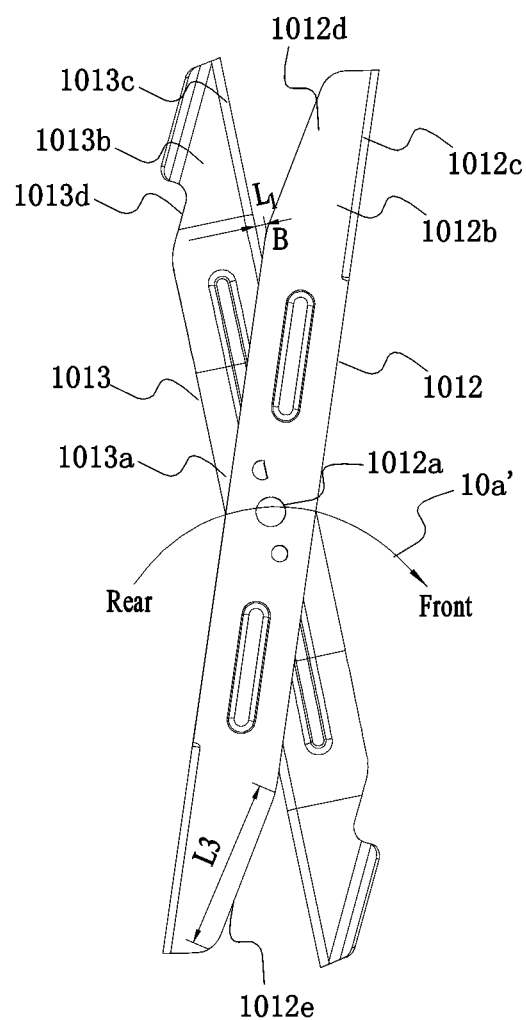
FIG. 46 is a plan view of a partial structure of the blade assembly in FIG. 45.

As shown in FIGS. 44-46, the blade assembly 101 includes a first blade 1012 and a second blade 1013. The first blade 1012 is located above the second blade 1013 relative to the ground, and the first blade 1012 and the second blade 1013 both rotate about a rotation axis 10'. The first blade 1012 and the second blade 1013 constitute a synchronous rotation. As shown in the direction of the arrow in FIG. 44, the first blade 1012 and the second blade 1013 rotate synchronously in the rotation direction 10$a'$ about the drive shaft 1011. The blade assembly 101 further includes a connecting assembly 1014. The first blade 1012 and the second blade 1013 form a fixed connection through the connecting assembly 1014. In this example, the first blade 1012 and the second blade 1013 form a detachable connection through the connecting assembly 1014. It is convenient to repair or replace the blade assembly 101 later. The connecting assembly 1014 includes a connecting piece, a nut, and the like. The connecting assembly 1014 may also connect the first blade 1012 and the second blade 1013 with other connection structures. The specific connection form between the first blade 1012 and the second blade 1013 is not limited herein. The blade assembly 101 may also include other accessories such as bearings and bearing covers.

Along the rotation direction 10$a'$, the first blade 1012 is located in front of the second blade 1013, that is to say, although the first blade 1012 and the second blade 1013 rotate synchronously when the motor 103 is started, the first blade 1012 cuts the vegetation earlier than the second blade 1013. In this example, the rotation direction 10$a'$ is a clockwise direction with the drive shaft 1011 as the axis. The first blade 1012 includes a first mounting portion 1012$a$ and a first cutting portion 1012$b$. The first mounting portion 1012$a$ is located in the middle of the first blade 1012. The first mounting portion 1012$a$ is configured to connect the first blade 1012 and the second blade 1013 and the drive shaft 1011. The first cutting portion 1012$b$ is symmetrically disposed at both ends of the first blade 1012 about the drive shaft 1011, and the first cutting portion 1012$b$ is configured to cut vegetation. Similarly, the second blade 1013 includes a second mounting portion 1013$a$ located in the middle and second cutting portions 1013$b$ symmetrically disposed at both ends. The difference is that the middle part and the two ends of the first blade 1012 are substantially on the same plane, that is to say, the first mounting part 1012$a$ and the first cutting portion 1012$b$ are on the same plane, and the entire first blade 1012 substantially expands along a plane surface; whereas the middle part and the two ends of the second blade 1013 are located on different planes. The two ends of the second blade 1013 are located below the middle part of the second blade 1013 with respect to the ground, that is, the second cutting portion 1013$b$ is located below the second mounting portion 1013$a$ with respect to the ground, and the entire second blade 1013 expands along a curved surface. In this example, the first mounting portion 1012$a$ and the second mounting portion 1013$a$ vertically overlap and intersect obliquely, the first mounting portion 1012$a$ and the second mounting portion 1013$a$ constitute a fixed connection (referring to FIGS. 45 and 46) through the connecting member 1014$a$. The connecting member 1014$a$ is provided with pins of different shapes, and the first mounting portion 1012$a$ and the second mounting portion 1013$a$ are respectively provided with holes for engaging with the pins, so as to form fixed connections with the connecting member 1014$a$. In this example, the first mounting portion 1012$a$ and the second mounting portion 1013$a$ are provided with round holes and irregular-shaped limit holes.

The first cutting portion 1012$b$ of the first blade 1012 is provided with a first cutting edge 1012$c$ for cutting vegetation. The first cutting edge 1012$c$ is disposed at the leading edge of the first cutting portion 1012$b$. The leading edge refers to the edge of the first cutting portion 1012$b$ that cut vegetation earliest when the first blade 1012 rotates along the rotation direction 10$a'$. The leading edges of the first cutting portions 1012$b$ at both ends of the first blade 1012 are symmetrically provided with the first cutting edge 1012$c$ about the drive shaft 1011. Similarly, the leading edges of the second cutting portions 1013$b$ at both ends of the second blade 1013 are also symmetrically provided with a second cutting edge 1013$c$.

The first cutting edge 1012$c$ and the second cutting edge 1013$c$ respectively include a hardened portion for cutting vegetation. The hardened portion has a higher hardness than other parts due to a hardening process. In an example, the entire first cutting edge 1012c and second cutting edge 1013c are hardened, and the hardness is higher than other parts of the first blade 1012 and the second blade 1013.

The first blade 1012 further includes a weight reduction portion 1012d; the weight reduction portion 1012d is disposed at the end of the first blade 1012, and behind the first cutting edge 1012c and in front of the second cutting edge 1013c in the rotation direction 10a', that is, the weight reduction portion 1012d is the portion of the end of the first blade 1012 opposite the first cutting edge 1012c. The weight reduction portion 1012d is disposed symmetrically on both ends of the first blade 1012, and the weight reduction portion 1012d has a recess relative to the first blade 1012. The weight reduction portion 1012d reduces the weight of the first blade 1012 and expands the space between the first blade 1012 and the second cutting edge 1013c to facilitate secondary cutting of the vegetation cut by the first cutting edge 1012c. The first blade 1012 further includes a shrinking edge 1012e inclined or curved with respect to the trailing edge of the first blade 1012, and the shrinking edge 1012e is disposed at the trailing edge of the end of the first blade 102. In this example, the shrinking edge 1012e is part of the edge of the weight reduction portion 1012d, and the shrinking edge 1012e is inclined towards the inside of the first blade 1012 with respect to the trailing edge of the first blade 1012. Along the rotation direction 10a', the shrinking edge 1012e is located in front of the second cutting edge 1013c; the projection of the shrinking edge 1012e on the ground and the projection of the second cutting edge 1013c on the ground do not intersect. That is to say, since the shrinking edge 1012e is inclined or curved forward with respect to the trailing edge of the first blade 1012, the projection of the shrinking edge 1012e and the second cutting edge 1013c has no overlapping portion in a plane parallel to the ground.

As shown in FIG. 46, the shrinking edge 1012e and the trailing edge of the first blade 1012 form a continuous curve with at least one bending point B. The projection of the bending point B on the ground is located in front of the projection of the second cutting edge 1013c on the ground in the rotation direction 10a'. That is to say, the bending point B formed by the shrinking edge 1012e and the trailing edge of the first blade 1012 is located outside the second cutting edge 1013c in a plane parallel to the second blade 1013, while the lateral distance of the projection of the bending point B in the plane of the second blade 1013 to the second cutting edge 1013c is greater than 0. In an example, the shrinking edge 1012e and the trailing edge of the first blade 1012 may form multiple bending points. In this case, the multiple bending points should also meet the above conditions, that is, the projection of the bending point on the ground is located in front of the projection of the second cutting edge 1013c on the ground along the rotation direction 10a', and the lateral distance from the bending point to the second cutting edge 1013c is greater than 0.

On the other hand, the length L3 of the shrinking edge 1012e is greater than or equal to 40 mm and less than or equal to 150 mm. In one example, the length L3 of the shrinking edge 1012e is greater than or equal to 70 mm and less than or equal to 100 mm. In this example, the length L3 of the shrinking edge 1012e is about 95 mm.

The projection of the shrinking edge 1012e on the ground and the projection of the second cutting edge 1013c on the ground do not intersect, which makes full use of the length of the second cutting edge 1013c for secondary cutting, while enlarging the space formed by the shrinking edge 1012e and the second cutting edge 1013c. Therefore, the vegetation cut by the first cutting edge 1012c rebounds and falls into the space to be cut by the second cutting edge 1013c, thereby improving the cutting efficiency of the lawn mower 10.

As the first blade 1012 and the second blade 1013 are arranged to overlap each other, the extension line of the shrinking edge 1012e and the extension line of the second cutting edge 1013c form an angle within a predetermined angle range. In an example, the angle between the extension line of the shrinking edge 1012e and the extension line of the second cutting edge 1013c is greater than or equal to 15 degrees and less than or equal to 45 degrees. In one example, the angle between the extension line of the shrinking edge 1012e and the extension line of the second cutting edge 1013c is greater than or equal to 25 degrees and less than or equal to 35 degrees. In this example, the angle is approximately 30 degrees.

The second blade 1013 further includes a tilted portion 1013d provided at both ends of the second blade 1013, and the tilted portion 1013d lifts upward and distributes symmetrically on both ends of the second blade 1013 with respect to the drive shaft 1011. After the air flow generated during the rotation of the second blade 1013 is lifted by the tilted portion 1013d, the grass clippings cut by the second blade 1013 can be brought up and thrown up, therefore, the second blade 1013 has good performance in throwing the grass clippings.

A noise reduction portion capable of reducing noise is also provided near the tilted portion 1013d, and the noise reduction portion is a noise reduction groove recessed inward.

Example 14

Figure 47:
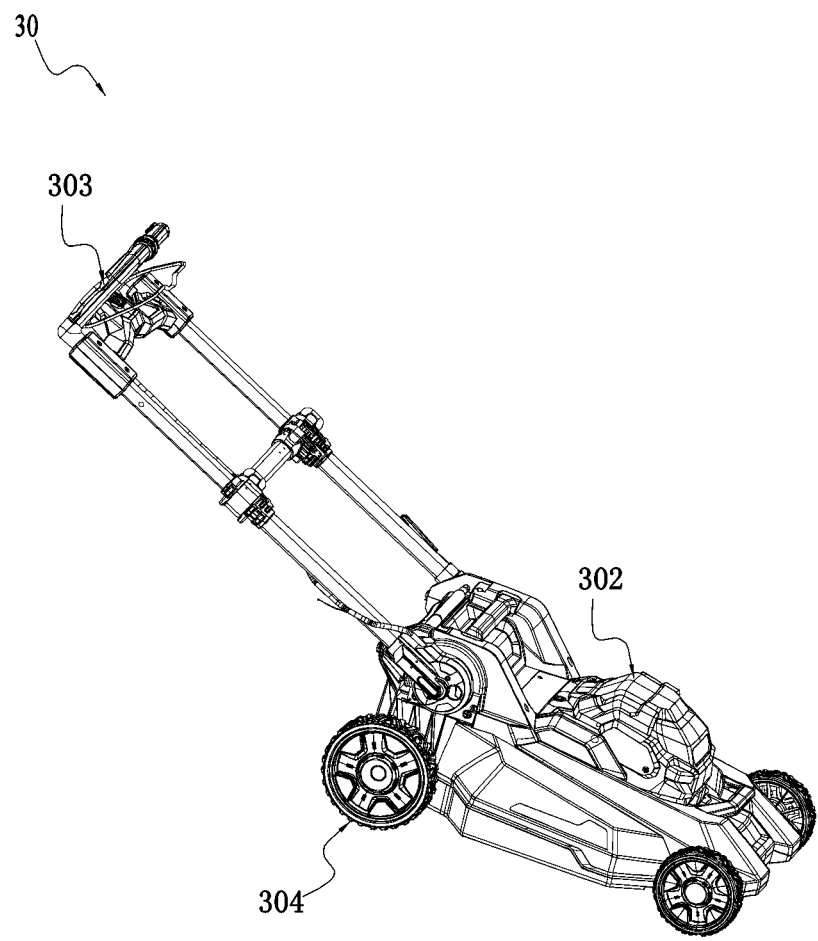
FIG. 47 is a schematic diagram of a lawn mower provided in Example 14.
Figure 48:
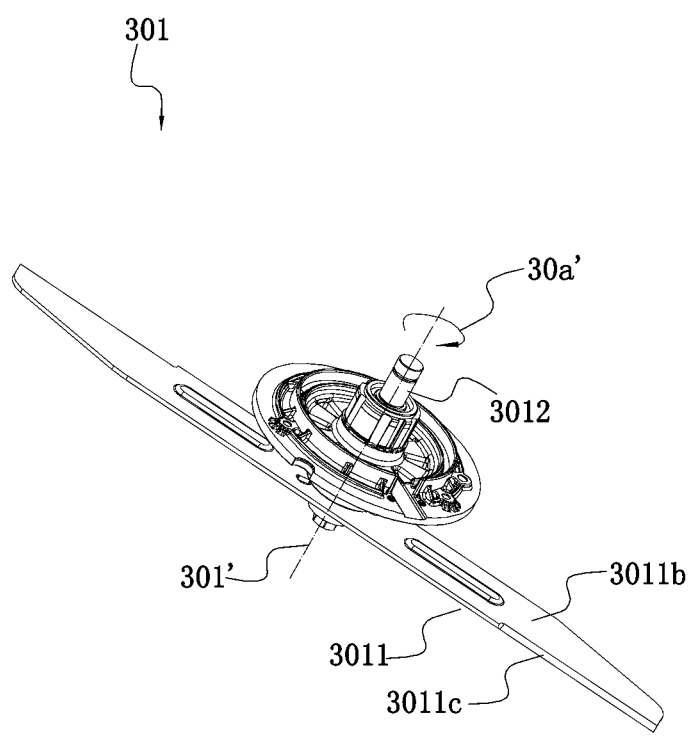
FIG. 48 is a perspective view of a blade assembly of the lawn mower of FIG. 47.

FIG. 47 and FIG. 48 are schematic diagrams of the lawn mower 30 provided in Example 14 of the present application. In this example, the lawn mower 30 may be a hand-push lawn mower or a riding lawn mower. The lawn mower 30 includes a blade assembly 301, a transmission mechanism, a motor, a housing 302, a handle 303, and wheels 304.

The motor drives the blade assembly 301 to rotate about the rotation axis 301' in the cutting direction 30a', wherein the cutting direction 30a' is the clockwise or counter clockwise direction around the rotation axis 301'. The transmission mechanism connects the blade assembly 301 and the motor, and transmits the power of the motor to the blade assembly 301. The housing 302 immobilizes or accommodates the motor. As the main frame structure of the lawn mower, the housing 302 assembles multiple parts into a whole. The lawn mower 30 also includes a battery pack that supplies power to the motor. The housing 302 includes a motor housing and a main body housing. The motor housing is configured to immobilize or accommodate the motor. The motor housing is connected to the main body housing. A circuit board to control the motor is provided in the housing 302.

The handle 303 is formed with a grip portion for the user to grip. The handle 303 may be formed by the housing 302 or may be attached to the housing 302 as a separate part. The lawn mower 30 further includes a connecting rod connecting the handle 303 and the housing 302, and the connecting rod is telescopic and rotatable relative to the housing 302. The lawn mower 30 further includes a self-propelled motor that drives the wheels 304 to rotate. The self-propelled motor and the wheels 304 transfer motion with a transmission structure. In an example, the self-propelled motor and the wheels 304 transfer motion with a transmission gear.

Figure 49:
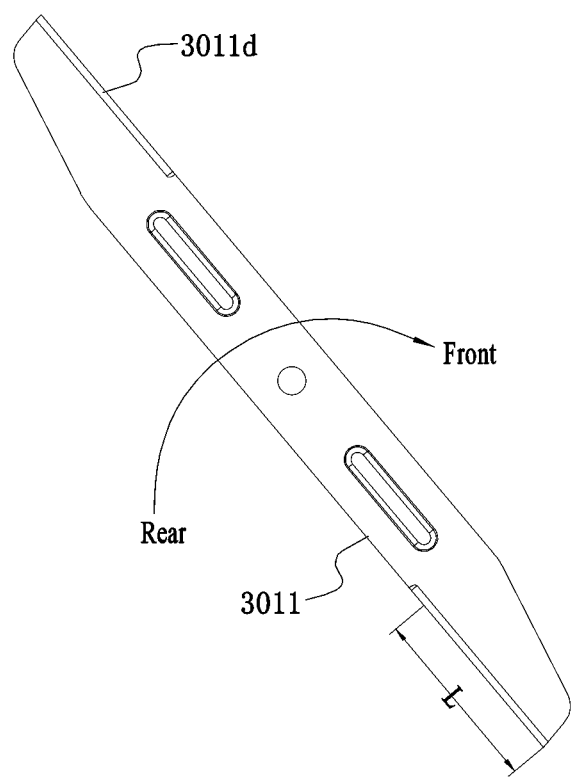
FIG. 49 is a plan view of a blade of the blade assembly of FIG. 48.
Figure 50:
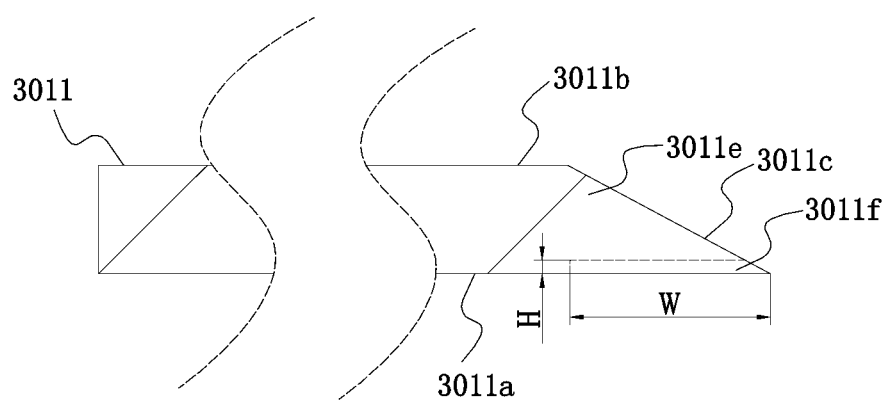
FIG. 50 is a cross-sectional view of the blade in FIG. 49.

As shown in FIGS. 48-50, the blade assembly 301 includes a blade 3011 and a rotating shaft 3012. The rotating shaft 3012 has a rotation axis 301' as a central axis, and the blade 3011 is symmetrical about the rotation axis 301'; the blade 3011 extends substantially along a straight line perpendicular to the rotation axis 301'; the blade 3011 extends substantially along a plane perpendicular to the rotation axis 301'. The blade 3011 includes a bottom surface 3011a and a top surface 3011b. The top surface 3011b is further away from the ground relative to the bottom surface 3011a. In this example, the bottom surface 3011a and the top surface 3011b are parallel to each other and are both perpendicular to the rotation axis 301'. In one example, the bottom surface 3011a is a curved surface, and at least a portion of the bottom surface 3011a is inclined with respect to the top surface 3011b; in one example, the top surface 3011b is a curved surface, and at least a portion of the top surface 3011b is inclined with respect to the bottom surface 3011a.

The blade 3011 further includes a cutting surface 3011c. The cutting surface 3011c is a plane between the bottom surface 3011a and the top surface 3011b. The plane on which the cutting surface 3011c is located intersects the plane on which the bottom surface 3011a is located and the plane on which the top surface 3011b is located obliquely. That is to say, the cutting surface 3011c connects the bottom surface 3011a and the top surface 3011b and forms a continuous curved surface. The inclination angle between the cutting surface 3011c and the bottom surface 3011a is greater than or equal to 20 degrees and less than or equal to 35 degrees. In this example, the inclination angle between the cutting surface 3011c and the bottom surface 3011a is about 28 degrees, and the inclination angle between the cutting surface 3011c and the top surface 3011b is about between 30 degrees to 52 degrees. The blade 3011 also includes a cutting portion 3011d; the cutting portion 3011d is located at one end of the blade 3011 and at the leading edge of the blade 3011 along the cutting direction 30a'. The leading edge refers to the edge that contacts the vegetation first when the blade 3011 rotates along the cutting direction 30a', and the edge that contacts the vegetation after the leading edge is the trailing edge, as shown in FIG. 49. In one example, the blade 3011 includes two cutting portions 3011d, and the two cutting portions 3011d are respectively located at both ends of the blade 3011 and at the leading edge of the blade 3011 along the cutting direction 30a'.

The cutting portion 3011d is defined by the bottom surface 3011a and the cutting surface 3011c; in this example, since the bottom surface 3011a and the cutting surface 3011c intersect obliquely, the cutting portion 3011d is formed by the bottom surface 3011a and the cutting surface 3011c, and the bottom surface 3011a and the cutting surface 3011c intersect to form the cutting edge; in one example, the plane where the cutting surface 3011c is located obliquely intersects with the bottom surface 3011a, but the cutting surface 3011c does not directly intersect with the bottom surface 3011a; in comparison, the cutting portion 3011d with the cutting edge is sharper and the cutting efficiency is also higher.

The cutting portion 3011d is composed of a body portion 3011e and a hardened portion 3011f, wherein the hardened portion 3011f extends inward along the end of the blade 3011 and extends from the bottom surface 3011a to the top surface 3011b of the blade 3011. The hardened portion 3011f is a hardened layer from laser quenching a part of the cutting portion 3011d, whereas the body portion 3011e is not laser quenched, therefore, the surface hardness of the hardened portion 3011f is greater than the surface hardness of the body portion 3011e. In one example, the ratio of the surface hardness of the hardened portion 3011f of the blade 3011 to the surface hardness of the body portion 3011e is greater than 1.1 and less than or equal to 2.4. In one example, the ratio of the surface hardness of the hardened portion 3011f to the surface hardness of the body portion 3011e is greater than 1.2 and less than or equal to 2. The surface hardness distribution of the hardened portion 3011f and the body portion 3011e makes the structure of the blade 3011 more reasonable. The hardened portion 3011f is a cutting portion 3011d near the bottom and end of the blade 3011, which is a high-frequency region for cutting vegetation. Accordingly, the hardened portion 3011f with a higher surface hardness can improve the wear resistance and cutting efficiency of the blade 3011, and also improve the reliability and service life of the blade 3011 of the lawn mower 30.

The method of manufacturing the blade 3011 includes: laser cutting and forming, laser cutting the metal sheet to obtain the blade 3011 in an unsharpened state; laser quenching, laser hardening the area where the hardened portion 3011f is located to improve the surface hardness of the area; processing the cutting portion 3011d, processing the blade 3011 in the unsharpened state to create the cutting portion 3011d; and polishing the blade 3011, polishing the blade 3011 to remove burrs generated during the processing of the blade 3011.

The area where the hardened portion 3011f is located is shown in FIGS. 49 and 50. In an example, the hardened portion 3011f has a trapezoidal cross section and a rectangular vertical section. The length L of the hardened portion 3011f is greater than or equal to 50 mm and less than or equal to 120 mm; the lateral width W of the hardened portion 3011f is greater than or equal to 2 mm and less than or equal to 8 mm; the depth H of the hardened portion 3011f is greater than 0.2 mm and less than or equal to 1 mm. In an example, the depth H of the hardened portion 3011f is greater than 0.3 mm and less than or equal to 0.6 mm. In this example, the length L of the hardened portion 3011f is approximately 100 mm; the lateral width W of the hardened portion 3011f is approximately 5 mm, which is approximately equal to the lateral width of the cutting portion 3011d; the depth H of the hardened portion 3011f is approximately 0.5 mm. The depth H of the hardened portion 3011f refers to the depth of the hardened layer obtained by laser quenching the blade 3011. The above-mentioned size setting of the hardened portion 3011f of the blade 3011 can save the manufacturing cost while ensuring the cutting strength. In addition, considering the different degrees of wear of the hardened portion 3011f and the body portion 3011e, the above size design makes the cutting portion 3011d maintain a sharp state for a long time after wear.

Further, the ratio of the surface hardness of the hardened portion 3011f to the depth of the hardened portion 3011f is greater than or equal to 1000 HV1/mm and less than or equal to 2000 HV1/mm. In one example, the ratio of the surface hardness of the hardened portion 3011f to the depth of the hardened portion 3011f is greater than or equal to 1100 HV1/mm and less than or equal to 1500 HV1/mm. In an example, the surface hardness of the body portion 3011e is greater than or equal to 350 HV1 and less than or equal to 500 HV1, and the surface hardness of the hardened portion 3011f is greater than or equal to 550 HV1 and less than or equal to 750 HV1; in one example, the surface hardness of the body portion 3011e is greater than or equal to 380 HV1 and less than or equal to 440 HV1, and the surface hardness of the hardened portion 3011f is greater than or equal to 600 HV1 and less than or equal to 700 HV.

The blade assembly 301 further includes a bearing, and a connector or a fastener, etc. configured to fix and connect the blade 3011.

Example 15

Figure 51:
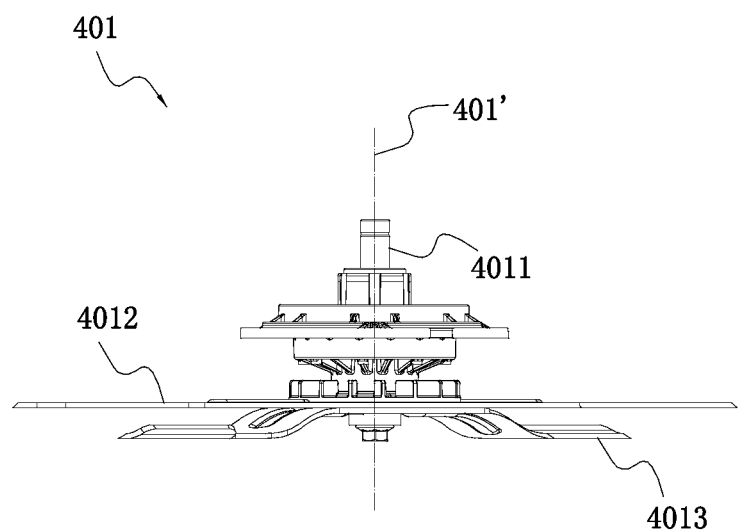
FIG. 51 is a schematic diagram of a blade assembly of a lawn mower provided in Example 15.
Figure 52:
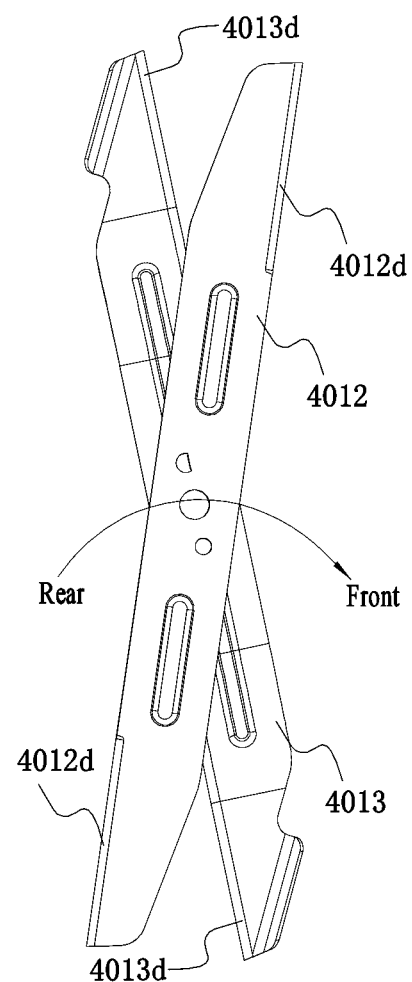
FIG. 52 is a plan view of a blade of the blade assembly of FIG. 51.

FIG. 51 and FIG. 52 respectively show a schematic diagram of a blade assembly 401 and a blade of a lawn mower provided in Example 15 of the present application. The present example differs from Example 14 in that: the blade assembly 401 comprises a shaft 4011, a first blade 4012 and a second blade 4013; the first blade 4012 and the second blade 4013 are stacked up and down together to synchronously rotate about the rotation axis 401'; in an example, the first blade 4012 and the second blade 4013 are stacked up and down together to asynchronously rotate about the rotation axis 401'; in one example, the first blade 4012 and the second blade 4013 rotate about the first axis and the second axis respectively, and the first axis and the second axis are in parallel but do not coincide.

The first blade 4012 includes a first cutting portion 4012d, and the second blade 4013 includes a second cutting portion 4013d. Structural features such as the hardened portion and the body portion in Example 14 are applicable to the first blade 4012 and the second blade 4013 in this example.

What is claimed is:

1. A lawn mower, comprising:
a blade assembly comprising a first blade and a second blade;
an electric motor configured to drive the blade assembly to rotate about a rotation axis;
a housing for supporting the electric motor;
a battery pack configured to supply power to the electric motor;
a circuit board configured to control the electric motor, wherein the second blade is disposed on a lower side of the first blade,
wherein the first blade comprises a mounting portion, the mounting portion is provided with a central circular hole mountable to the rotation axis and a positioning hole having a closed circumference, and the positioning hole is non-circular, and the second blade comprises a second mounting portion having a second central circular hole mountable to the rotation axis and a second positioning hole having a closed circumference, and the second positioning hole of the second blade is non-circular, and
wherein when the first blade and the second blade are longitudinally aligned, the central circular hole of the first blade and the second central circular hole of the second blade are vertically aligned and the positioning hole of the first blade and the second positioning hole of the second blade are circumferentially misaligned and when the central circular hole of the first blade and the second central circular hole of the second blade are vertically aligned and the positioning hole of the first blade and the second positioning hole of the second blade are circumferentially aligned, the first blade and the second blade are longitudinally skewed relative to one another; and
further comprising a connecting assembly comprising an engaging portion that engages with the positioning hole of the first blade and the second positioning hole of the second blade when the positioning hole of the first blade and the second positioning hole of the second blade are vertically aligned, the connecting assembly being mountable to at least one of the first blade or the second blade to define at least one phase angle between the first blade relative to the second blade.

2. The lawn mower of claim 1, wherein the lawn mower further comprises wheels configured to support the housing and a self-propelled motor configured to drive the wheels to rotate.

3. The lawn mower of claim 2, wherein the self-propelled motor transfers motion to the wheels through a transmission structure.

4. The lawn mower of claim 2, wherein the self-propelled motor transfers motion to the wheels through a transmission gear.

5. The lawn mower of claim 1, wherein the first blade and the second blade are stacked up and down together to synchronously rotate about the rotation axis.

6. The lawn mower of claim 1, wherein the first blade extends along a plane, and the second blade comprises an extending portion extending obliquely downward from the second mounting portion.

7. The lawn mower of claim 1, further comprising a mounting member for mounting the blade assembly to the electric motor, the connecting assembly being provided on the mounting member.

8. The lawn mower of claim 7, wherein the mounting member is a fan.

9. The lawn mower of claim 7, wherein the mounting member if a flange.

* * * * *